US011912464B2

(12) United States Patent
Yoshida et al.

(10) Patent No.: US 11,912,464 B2
(45) Date of Patent: Feb. 27, 2024

(54) CONTAINER, FOLDING CONTAINER

(71) Applicant: KYORAKU CO., LTD., Kyoto (JP)

(72) Inventors: Kouichiro Yoshida, Tokyo (JP); Yoshitaka Matsubara, Tokyo (JP); Teruhisa Hanafusa, Tokyo (JP)

(73) Assignee: KYORAKU CO., LTD., Kyoto (JP)

( * ) Notice: Subject to any disclaimer, the term of this patent is extended or adjusted under 35 U.S.C. 154(b) by 165 days.

(21) Appl. No.: 16/754,532

(22) PCT Filed: Oct. 12, 2018

(86) PCT No.: PCT/JP2018/038106
§ 371 (c)(1),
(2) Date: Apr. 8, 2020

(87) PCT Pub. No.: WO2019/074101
PCT Pub. Date: Apr. 18, 2019

(65) Prior Publication Data
US 2020/0270022 A1   Aug. 27, 2020

(30) Foreign Application Priority Data

Oct. 13, 2017   (JP) ................................ 2017-199405
Mar. 6, 2018    (JP) ................................ 2018-039505
(Continued)

(51) Int. Cl.
*B65D 21/08*    (2006.01)
*B65D 21/02*    (2006.01)
(Continued)

(52) U.S. Cl.
CPC .......... *B65D 21/086* (2013.01); *B65D 11/186* (2013.01); *B65D 11/1833* (2013.01);
(Continued)

(58) Field of Classification Search
CPC .............. B65D 21/086; B65D 21/0217; B65D 81/3813; B29C 49/0691; B29C 51/105; B29L 2031/712; E05D 3/12
(Continued)

(56) References Cited

U.S. PATENT DOCUMENTS 4,928,350 A *   5/1990   Morgan .................... E05D 5/08
                                                      16/337
5,666,694 A *   9/1997   Slow ..................... G06F 1/1618
                                                      16/342
(Continued)

FOREIGN PATENT DOCUMENTS

CN        103118954 A      5/2013
CN        203975498 U     12/2014
(Continued)

OTHER PUBLICATIONS

International Search Report dated Dec. 25, 2018 in corresponding International application No. PCT/JP2018/038106; 4 pages.
(Continued)

*Primary Examiner* — Andrew D Perreault
(74) *Attorney, Agent, or Firm* — Maier & Maier, PLLC

(57) ABSTRACT

The present disclosure provides a container with an increased movable range of an upper wall with respect to a side wall. According to the present disclosure provided is a container including a side wall, an upper hinge member, and an upper wall, wherein the upper hinge member and the side wall are connected rotatably around a first rotation axis, the upper hinge member and the upper wall are connected rotatably around a second rotation axis, and the first and second rotation axes are parallel.

4 Claims, 45 Drawing Sheets

(30) Foreign Application Priority Data

| | | |
|---|---|---|
| Mar. 6, 2018 | (JP) | 2018-039512 |
| Mar. 6, 2018 | (JP) | 2018-039519 |
| Oct. 10, 2018 | (JP) | 2018-191558 |

(51) Int. Cl.
| | |
|---|---|
| *B65D 81/38* | (2006.01) |
| *B29C 49/00* | (2006.01) |
| *B29C 51/10* | (2006.01) |
| *E05D 3/12* | (2006.01) |
| *B65D 6/18* | (2006.01) |
| *B29L 31/00* | (2006.01) |

(52) U.S. Cl.
CPC ..... *B65D 21/0217* (2013.01); *B65D 81/3813* (2013.01); *E05D 3/12* (2013.01); *B29L 2031/712* (2013.01)

(58) Field of Classification Search
USPC ........................................ 220/4.32, 6; 16/302
See application file for complete search history.

(56) References Cited

U.S. PATENT DOCUMENTS

| | | | |
|---|---|---|---|
| 7,063,223 B2 | | 6/2006 | Iwahara et al. |
| 7,832,056 B2 * | | 11/2010 | Kuwajima ........... H05K 5/0226 |
| | | | 16/354 |
| 2002/0050026 A1 * | | 5/2002 | Jacquin ................ E05D 3/127 |
| | | | 16/334 |
| 2004/0026296 A1 * | | 2/2004 | Nesting ................. B65D 19/12 |
| | | | 206/517 |

FOREIGN PATENT DOCUMENTS

| | | |
|---|---|---|
| CN | 105569437 A | 5/2016 |
| JP | S50-36125 Y2 | 10/1975 |
| JP | H07-267005 A | 10/1995 |
| JP | 2001-180670 A | 7/2001 |
| JP | 3113360 U | 9/2005 |
| JP | 2006-205684 A | 8/2006 |
| JP | 2011-037500 A | 2/2011 |
| JP | 2011-185442 A | 9/2011 |
| JP | 4939356 B2 | 5/2012 |

OTHER PUBLICATIONS

Chinese Office Action dated Jun. 29, 2021, in connection with corresponding CN Application No. 201880060966.0 (22 pp., including machine-generated English translation).

Office Action dated May 23, 2022 in corresponding Indian Patent Application No. 202047015811; 6 pages.

Office Action dated Sep. 13, 2022 in corresponding Japanese Patent Application No. 2018-191558; 7 pages including English-language translation.

* cited by examiner

Fig. 3
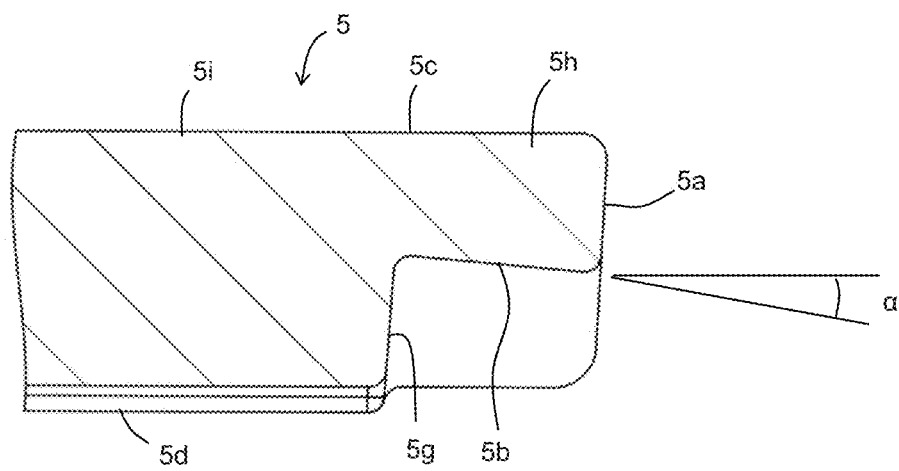
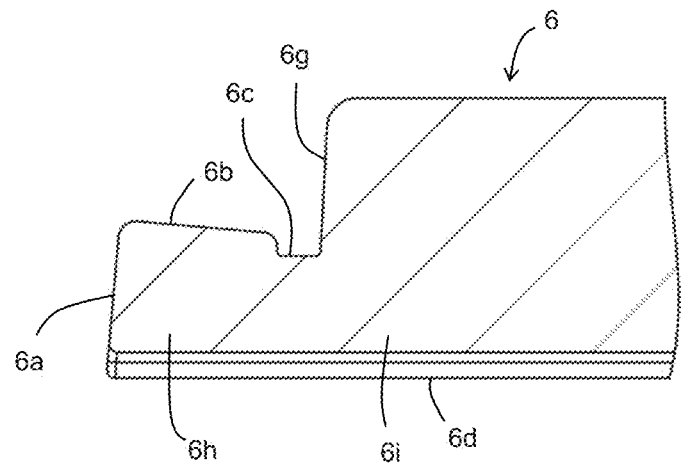

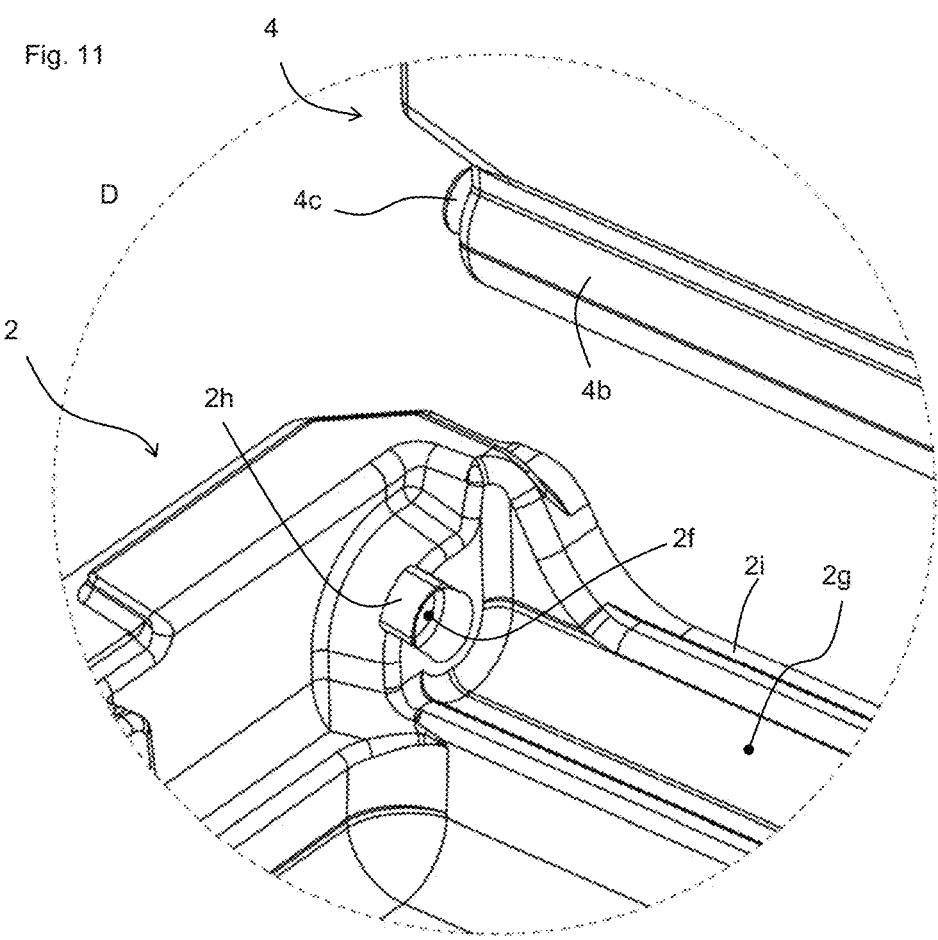

Fig. 14
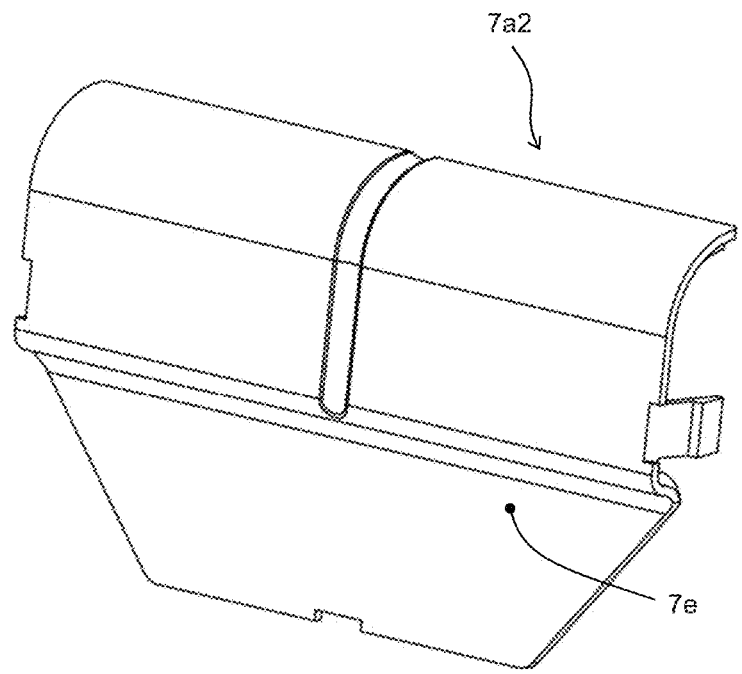
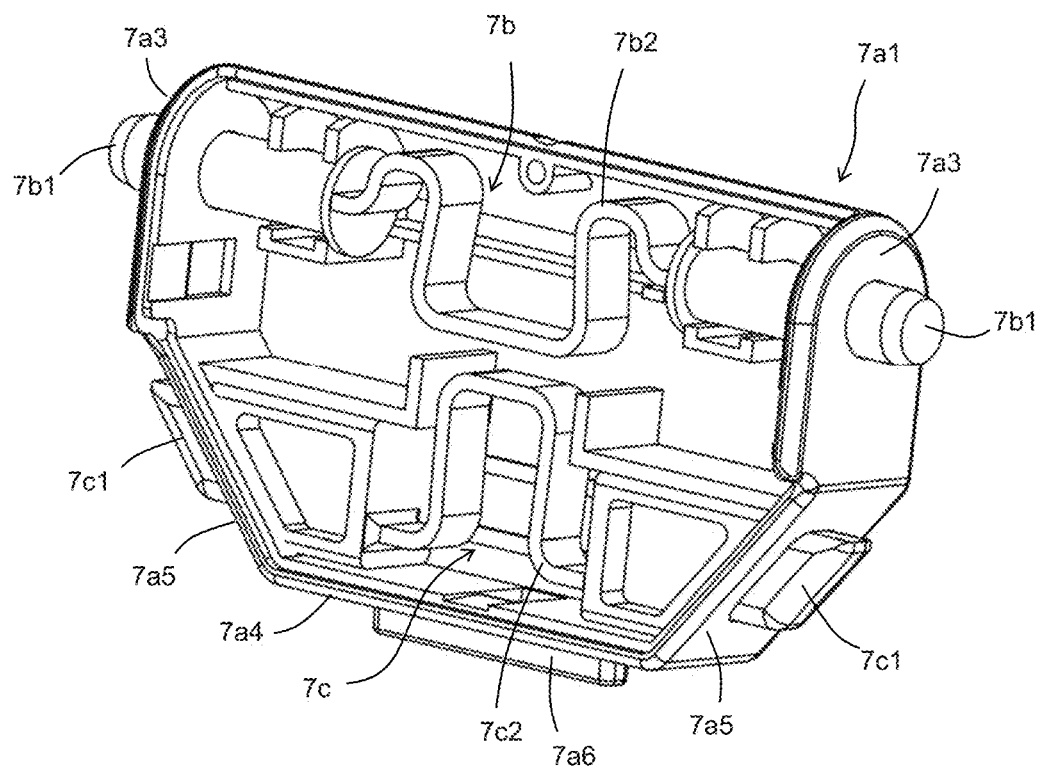

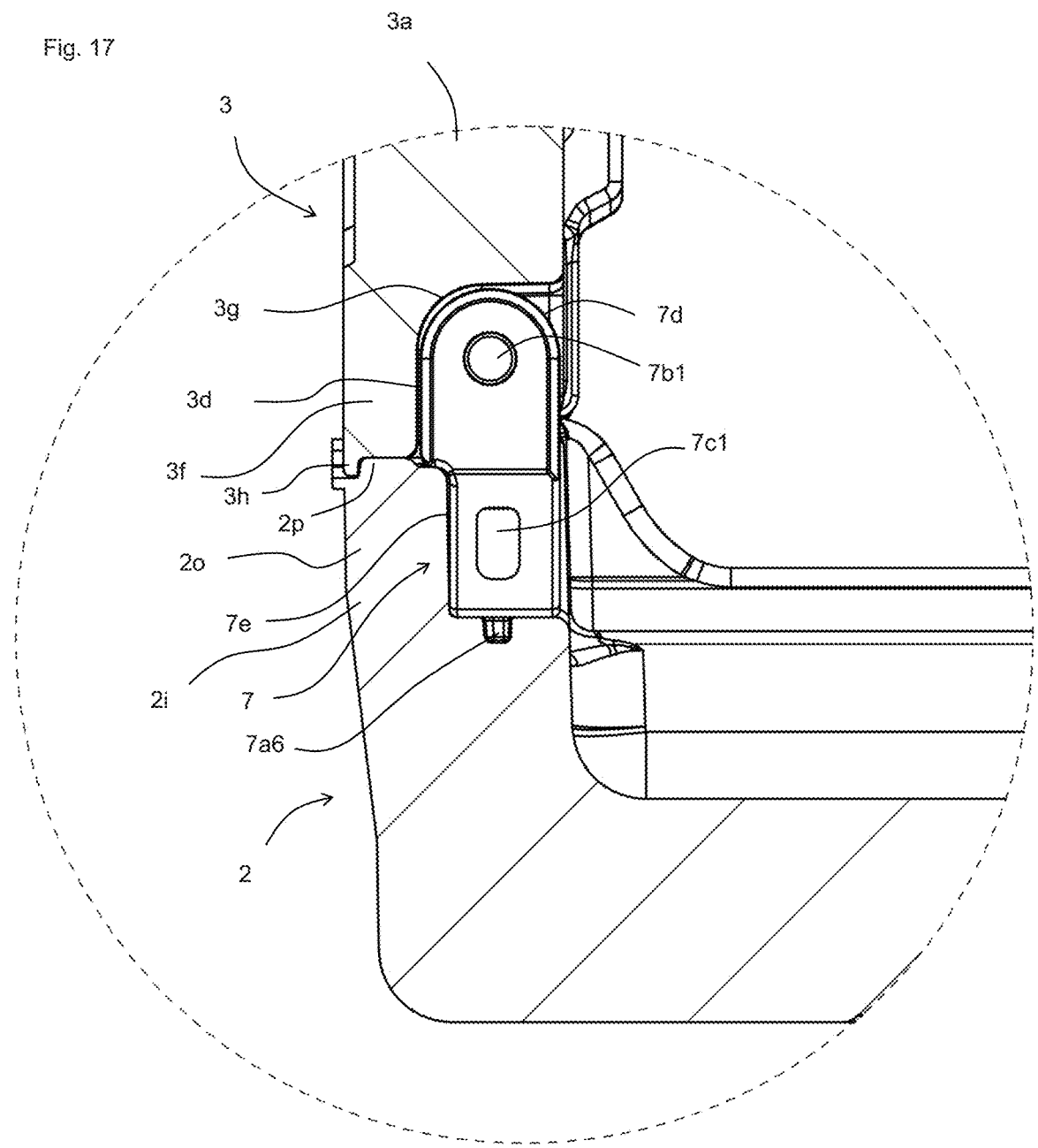

CONTAINER, FOLDING CONTAINER

TECHNICAL FIELD

The present invention relates to a container (preferably folding container), such as a knockdown container.

BACKGROUND ART (First and Third Viewpoints)
Patent Literature 1 discloses a knockdown container composed of a resin panel.
(Second Viewpoint)
Patent Literature 2 discloses a knockdown container composed of a resin panel. In Patent Literature 2, a stopper shaft provided on a side wall is fitted into a hole provided on a bottom member, so that the side wall can be folded so as to be in contact with an upper surface of the bottom member.
(Fourth Viewpoint)
Conventionally, a foldable container used for transporting goods and the like has been known. For example, Patent Literature 3 discloses a folding container composed of a resin panel.

CITATION LIST

Patent Literature

[Patent Literature 1] JP-A-2001-180670
[Patent Literature 2] JP-A-2011-185442
[Patent Literature 3] JP-A-2006-205684
[Patent Literature 4] JP-A-2011-37500

SUMMARY OF INVENTION

Technical Problem (First Viewpoint)
In Patent Literature 1, a lid is configured to be freely opened and closed by a hinge structure provided on an upper side of a side wall. In such a configuration, the lid cannot be rotated to such an extent that the lid is parallel to the side wall.
The first viewpoint of the present invention has been made in view of such circumstances and provides a container with an increased movable range of the upper wall with respect to the side wall.
(Second Viewpoint)
Meanwhile, it is troublesome to fit the stopper shaft provided on the side wall into the hole provided on the bottom member.
The second viewpoint of the present invention has been made in view of such circumstances and provides a container in which the side wall can be connected to the bottom member so as to be easily rotatable.
(Third Viewpoint)
In Patent Literature 1, the upper wall of the container includes a pair of lids. In such a configuration, a gap is likely to be formed between the pair of lids, and thus it is difficult to seal the container.
The third viewpoint of the present invention has been made in view of such circumstances and provides a container in which a gap is less likely to be formed between a pair of upper walls.
(Fourth Viewpoint)
Meanwhile, a front wall forming a container outer surface and a rear wall forming a container inner surface of the resin panel in Patent Literature 3 are both formed of resin molded by foam blow molding, and the resin panel may be not strong enough to attach a structure, for example, a handle, to the outer surface of the container.
Further, in the folding container described above, there is a problem that air leakage occurs on a contact surface between members, and sealability and heat retention performance are impaired.
The fourth viewpoint of the present invention has been made in view of such circumstances and provides a folding container with enhanced heat retention performance.

Solution to Problem (First Viewpoint)
According to the first viewpoint of the present invention, provided is a container comprising a side wall, an upper hinge member, and an upper wall, wherein the upper hinge member and the side wall are connected rotatably around a first rotation axis, the upper hinge member and the upper wall are connected rotatably around a second rotation axis, and the first and second rotation axes are parallel.
In the present invention, since the upper wall and the side wall are connected via the upper hinge member comprising the first and second rotation axes, the movable range of the upper wall with respect to the side wall can be increased.
Preferably, the container is configured such that the second rotation axis is always arranged above the first rotation axis.
Preferably, the upper hinge member comprises a rotation restricting portion configured to restrict rotation of the upper hinge member, and the rotation restricting portion is configured to abut against the side wall, so that the second rotation axis is not arranged below the first rotation axis.
Preferably, an angle of a plane passing through the first and second rotation axes with respect to an outer surface of the side wall is 91 to 135 degrees.
Preferably, the first rotation axis is arranged in a concave portion provided on an outer surface side of the side wall, and the concave portion is configured not to penetrate the side wall.
Preferably, the container comprises second to fourth side walls, a second upper wall, and a bottom member, wherein the side wall is regarded as a first side wall, while the upper wall is regarded as a first upper wall, the first and second side walls face each other, the third and fourth side walls face each other and are provided between the first and second side walls, the first to fourth side walls are configured to be rotatable with respect to the bottom member, and the second upper wall is configured to be rotatable with respect to the second side wall.
(Second Viewpoint)
According to the second viewpoint of the present invention, provided is a container comprising a side wall, a lower hinge member, and a bottom member, wherein the lower hinge member and the side wall are rotatably connected, the lower hinge member comprises a hinge inclined surface inclined such that a width of the lower hinge member decreases toward a lower end, the lower hinge member comprises a projecting portion urged in a direction projecting from the hinge inclined surface, the bottom member comprises a concave portion including a concave-portion inclined surface inclined such that a width decreases downward, the concave-portion inclined surface is provided with an inclined-surface engagement hole, the projecting portion is configured to retreat when pressed against the concave-portion inclined surface, and the projecting portion is configured to engage with the inclined-surface engagement hole.

In the present invention, the lower hinge member can be connected to the bottom member by pressing the projecting portion of the lower hinge member against the concave-portion inclined surface, thereby facilitating an assembly operation.

Preferably, a lower-surface engagement hole is provided on a lower surface of the concave portion, the lower hinge member comprises a lower projecting portion projecting toward the lower-surface engagement hole, and the lower projecting portion is configured to engage with the lower-surface engagement hole.

Preferably, the concave-portion inclined surface comprises the first and second concave-portion inclined surfaces, the first and second concave-portion inclined surfaces are provided so as to interpose the lower hinge member therebetween, the projecting portion comprises the first and second projecting portions, and the first and second projecting portions are configured to project respectively toward the first and second concave-portion inclined surfaces.

Preferably, a distal end of the projecting portion is configured to be parallel to the concave-portion inclined surface.

Preferably, the hinge inclined surface is parallel to the concave-portion inclined surface.

Preferably, the container comprises second to fourth side walls, wherein the side wall is regarded as a first side wall, the first and second side walls face each other, the third and fourth side walls face each other and are provided between the first and second side walls, and the first to fourth side walls are configured to be rotatable with respect to the bottom member.

(Third Viewpoint)

According to the third viewpoint of the present invention, provided is a container comprising first and second side walls and first and second upper walls, wherein the first and second side walls face each other, the first and second upper walls are configured to be rotatable respectively with respect to the first and second side walls, and a force in a direction in which the first upper wall approaches the second upper wall is applied to the first upper wall when the first upper wall is pressed from above.

The container of the present invention is configured such that the first upper wall is urged, in a direction in which the first upper wall approaches the second upper wall, when the first upper wall is pressed from above. Consequently, a gap is less likely to be formed between the pair of upper walls, and thus the sealability can be enhanced.

Preferably, the first upper wall comprises a first inclined surface inclined so as to become lower toward a distal end of the first upper wall.

Preferably, the first and second upper walls each comprise an overlapping portion overlapping each other, the first inclined surface is provided on the overlapping portion of the first upper wall, the second upper wall comprises, on the overlapping portion thereof, a second inclined surface inclined so as to be higher toward a distal end of the second upper wall, and the first and second inclined surfaces face each other such that the first inclined surface is arranged above the second inclined surface.

Preferably, an inclination angle of the first inclined surface with respect to an upper surface of the first upper wall is 1 to 45 degrees.

Preferably, the container comprises third and fourth side walls and a bottom member, wherein the third and fourth side walls face each other and are provided between the first and second side walls, and the first to fourth side walls are configured to be rotatable with respect to the bottom member.

(Fourth Viewpoint)

According to the fourth viewpoint of the present invention, provided is a folding container comprising a bottom wall and a side wall, wherein the side wall is connected to the bottom wall so as to be freely raised or tilted, the bottom wall and the side wall each comprise an inner wall forming an inner surface of the container, an outer wall forming an outer surface of the container, and a contact wall forming a contact surface abutting against the bottom wall or the side wall, and thermal conductivity of at least a portion of the contact wall is lower than thermal conductivity of the outer wall.

According to the present invention, the thermal conductivity of at least a portion of the contact wall forming the contact surface is lower than the thermal conductivity of the outer wall. Consequently, the heat retention performance at the contact surface can be improved.

Hereinafter, various embodiments of the present invention will be exemplified. The embodiments below can be combined with each other.

Preferably, expansion ratio of at least a portion of the contact wall is higher than expansion ratio of the outer wall.

Preferably, the contact wall is configured such that the expansion ratio of a portion corresponding to a region of 60% or more of the contact surface is higher than the expansion ratio of the outer wall.

Preferably, the at least a portion of the contact wall and the inner wall are integrally formed in each of the bottom wall and the side wall.

Preferably, the at least a portion of the contact wall and the inner wall are formed of a foam molded body.

Preferably, the outer wall is formed of a non-foamed molded body.

Preferably, each contact surface of the contact wall comprises a step and is configured to be fitted with the contact surface of another contact wall against which the contact surface abuts.

Preferably, the side wall is configured to be rotated around a rotation axis on an inner side than a center between the inner wall and the outer wall of the side wall so as to be raised or tilted with respect to the bottom wall.

Preferably, at least one of the bottom wall and the side wall comprises a heat insulating material between the inner wall and the outer wall, and at least a portion of the contact wall is formed of the heat insulating material.

BRIEF DESCRIPTION OF DRAWINGS

FIG. 3 is a cross-sectional view of a region A of FIG. 2 in which upper walls 5, 6 are shown separately from each other.

FIG. 11 is an enlarged view of a region D in FIG. 9.

FIG. 14 is an exploded view of the lower hinge member 7.

FIG. 17 is a cross-sectional view of the same cross-section as FIG. 2 (the lower hinge member 7 is in front view), showing a state after attaching the lower hinge member 7 to the bottom member 2 from the state of FIG. 16.

FIG. 21A is a plan view, FIG. 21B is a front view, and FIG. 21C is an exploded perspective view.

FIG. 40 is a schematic view showing a contact portion of the side plate 60 and the bottom plate 30 of the folding container 1a.

DESCRIPTION OF EMBODIMENTS

Figure 1:
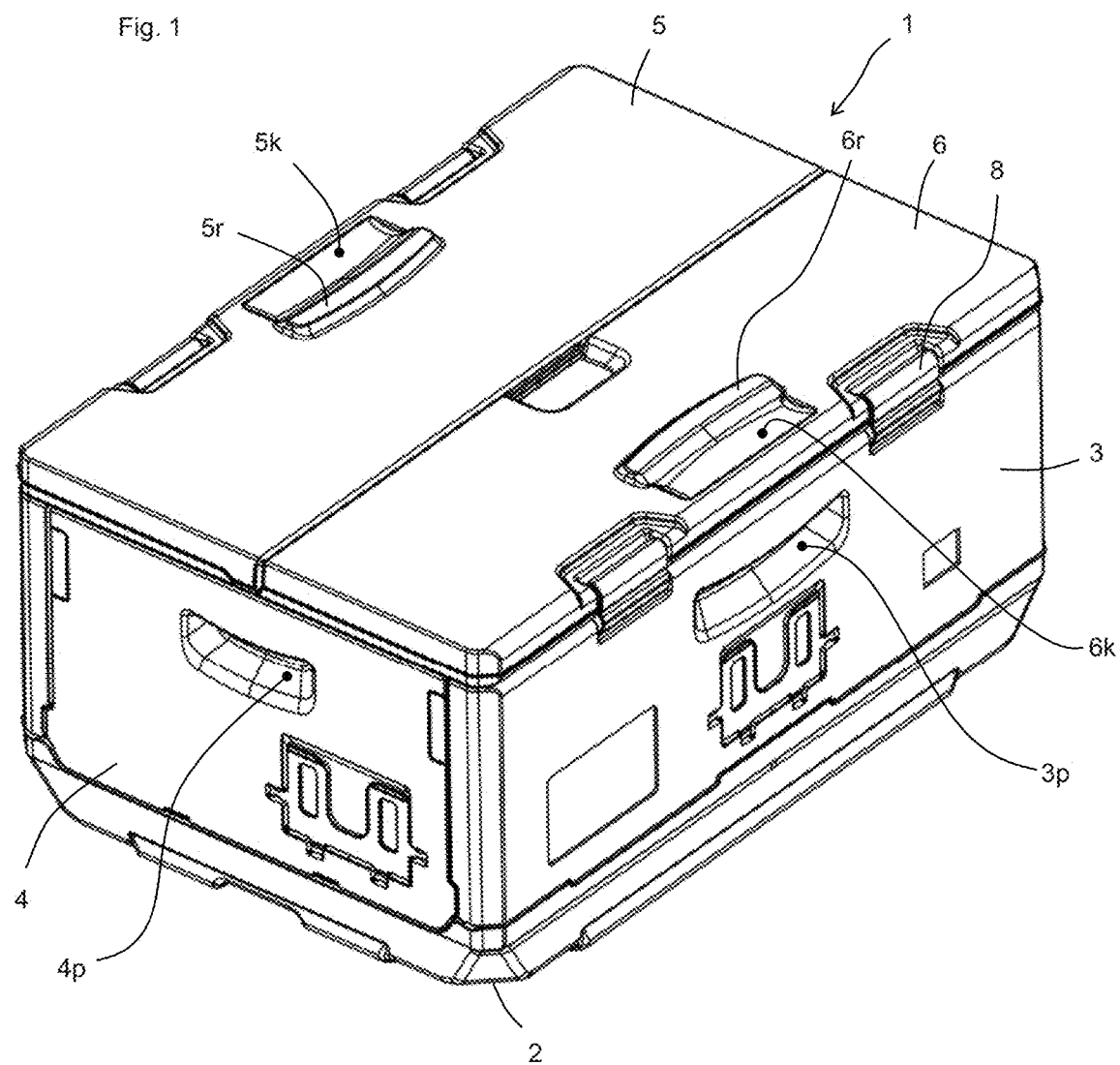
FIG. 1 is a perspective view of a container 1 in an embodiment of the first to third viewpoints of the present invention.

Hereinafter, the embodiments of the present invention will be described in detail with reference to the drawings.
(Embodiment of First to Third Viewpoints)
1. Overall Configuration As shown in FIG. 1, a container 1 of the present embodiment is a cold insulation container of knockdown type. The container 1 comprises a bottom member 2, a pair of long side walls 3 facing each other, a pair of short side walls 4 facing each other, and first and second upper walls 5, 6. While it is preferable, from the viewpoints of strength, heat insulation, lightness and the like, that these members have a sandwich structure in which a foam is sandwiched between resin sheets, they may have another configuration, such as a hollow double-walled structure or a structure comprising only a foam.

The container 1 has a substantially rectangular parallelepiped shape. The bottom member 2 and the upper walls 5, 6 are configured to face each other. The pair of short side walls 4 are arranged between the pair of long side walls 3. The pair of long side walls 3 and the pair of short side walls 4 form a side wall of the container 1. The upper walls 5, 6 form a lid of the container 1. These members are connected to each other such that no gap is formed between the members in order to enhance the sealability of the container 1.

Figure 2:
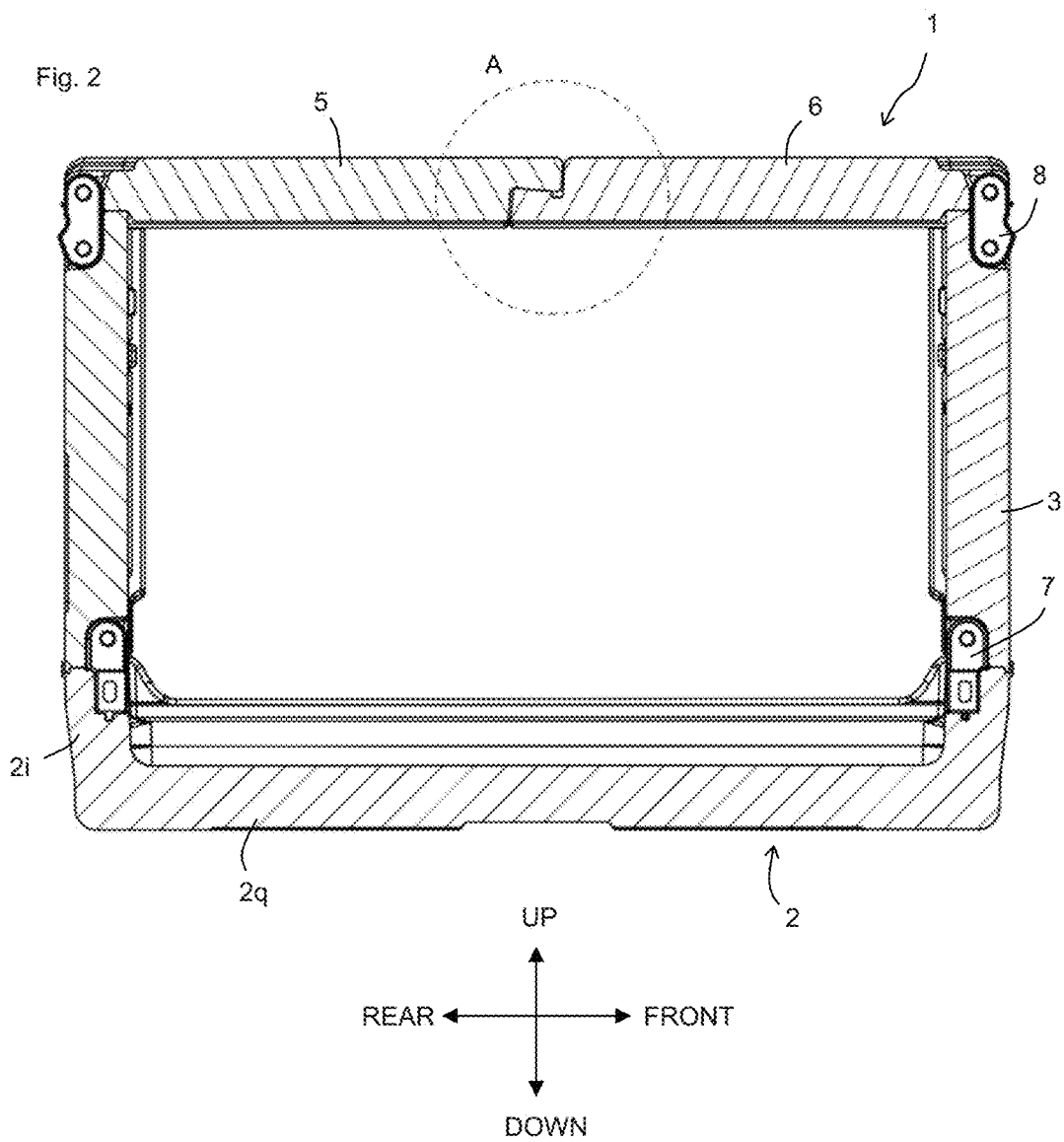
FIG. 2 is a cross-sectional view passing through an upper hinge member 8 and a lower hinge member 7 of FIG. 1 (the upper hinge member 8 and the lower hinge member 7 is in front view).

In the following description, up, down, left, right, front, and rear are defined as illustrated in FIG. 1 and FIG. 2. That is, in a direction perpendicular to the main surface of the upper wall 5, a side of the upper wall 5 is defined as "up", and a side of the bottom member 2 is defined as "down". In the direction perpendicular to the main surface of the long side wall 3, a near side is defined as "front", and a far side is defined as "rear". In the direction perpendicular to the main surface of the short side wall 4, a left side of FIG. 1 is defined as "left", and a right side is defined as "right". Directions going up and down are also expressed as "upper" and "lower" directions, respectively. Further, a configuration to "face each other" preferably refers to a configuration to face in parallel.

As shown in FIG. 2, the long side wall 3 is rotatably connected to the bottom member 2 via a lower hinge member 7. The short side wall 4 is directly and rotatably connected to the bottom member 2. The upper walls 5, 6 are each rotatably connected to the long side wall 3 via an upper hinge member 8. The long side wall 3 and the short side wall 4 are connected to each other at a connecting mechanism 9. The bottom member 2 comprises a bottom wall 2q and a peripheral wall 2i upright from around the bottom wall 2q.

The short side wall 4 is provided with a concave portion 4p serving as a handle. The container 1 can be lifted by hooking a finger on the concave portion 4p. Further, the long side wall 3 is provided with a concave portion 3p serving as a handle. In the case of a large container of about 40 L, the arms may not be long enough to lift it by hooking a finger on the concave portion 4p of the left and right short side walls 4. In such a case, the container 1 can be lifted by hooking a finger on the concave portion 3p of the long side wall 3. Further, the upper walls 5, 6 are provided with concave portions 5k, 6k. When the finger is hooked on the concave portion 3p, the slip of the thumb is suppressed by placing the thumb in the concave portions 5k, 6k, so that the container 1 can be easily lifted.

Figure 6:
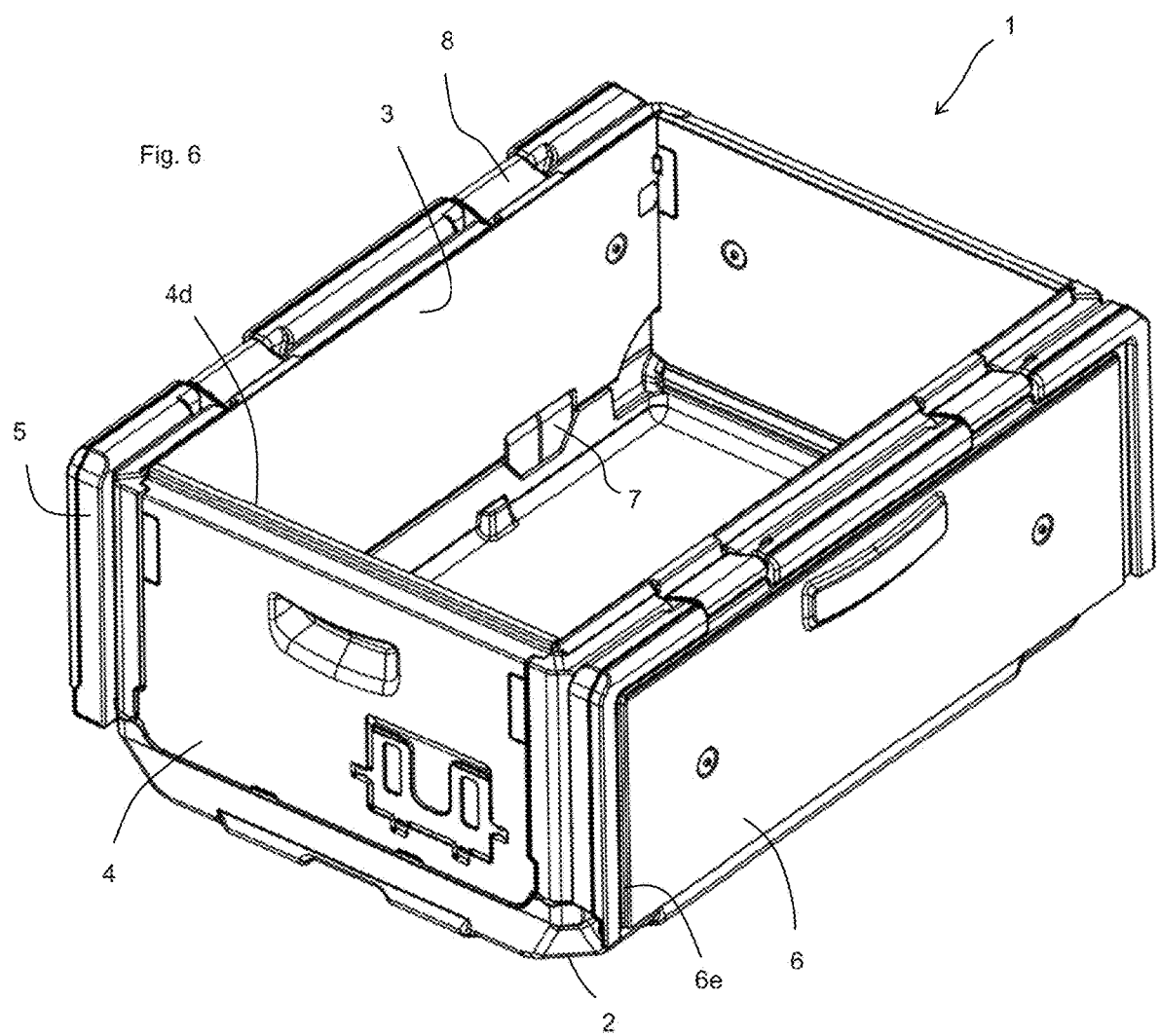
FIG. 6 is a perspective view showing a state where the upper walls 5, 6 of the container 1 of FIG. 1 are opened.
Figure 8:
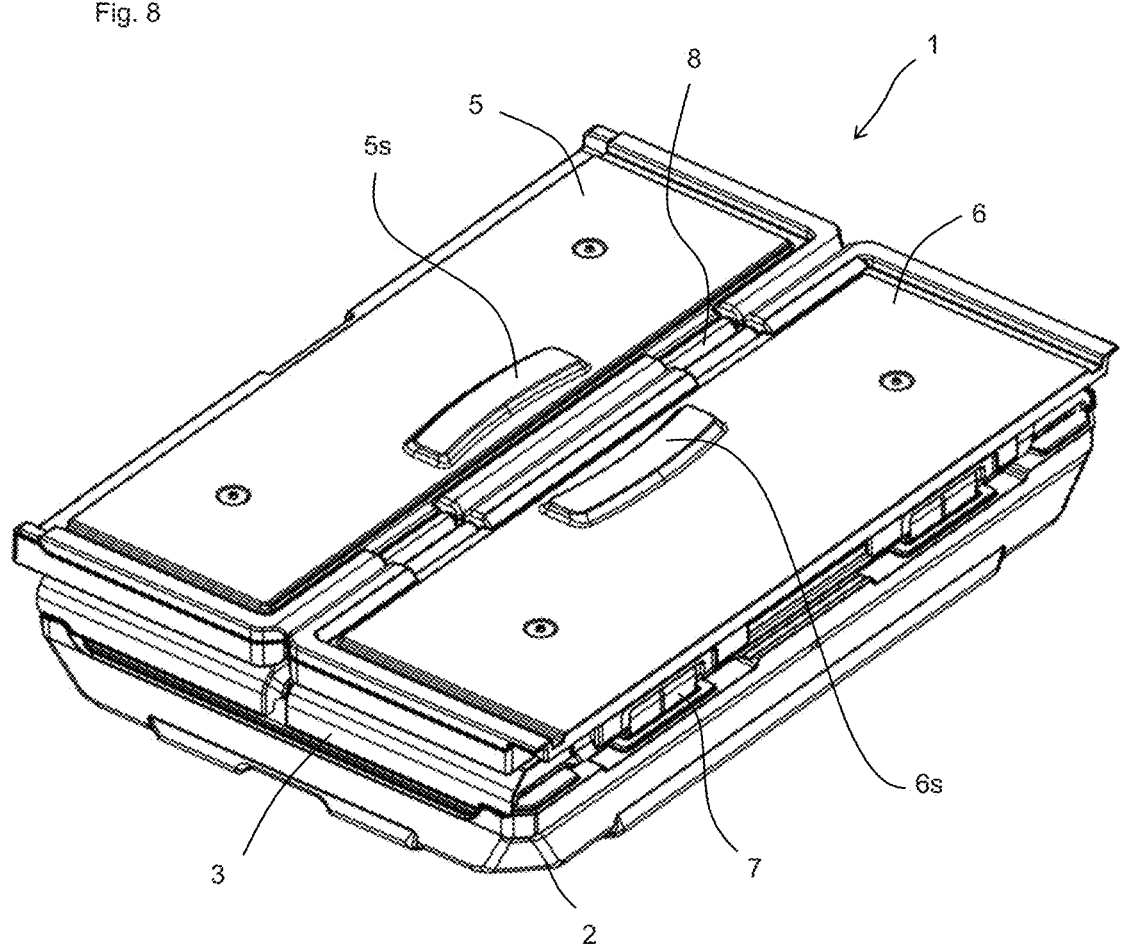
FIG. 8 is a perspective view showing a state where a long side wall 3 is tilted and laid from the state of FIG. 7.

Convex portions 5r, 6r are provided on an upper surface side of the upper walls 5, 6. The convex portions 5r, 6r are each provided at a position facing the concave portion 3p when the upper walls 5, 6 are opened as shown in FIG. 6. Further, the convex portions 5r, 6r can be fitted into the concave portion 3p. When the upper walls 5, 6 are opened, the convex portions 5r, 6r are fitted into the concave portion 3p, so that the upper walls 5, 6 are prevented from sliding with respect to the long side wall 3. For example, in a folded state as shown in FIG. 8, the upper walls 5, 6 are prevented from relatively moving toward the center of the long side wall 3 in the front-rear direction by fitting the convex portions 5r, 6r into the concave portion 3p. In this regard, the relative movement of the upper walls 5, 6 outward in the front-rear direction with respect to the long side wall 3 is suppressed by the upper hinge member 8 (see FIG. 22A).

Figure 4:
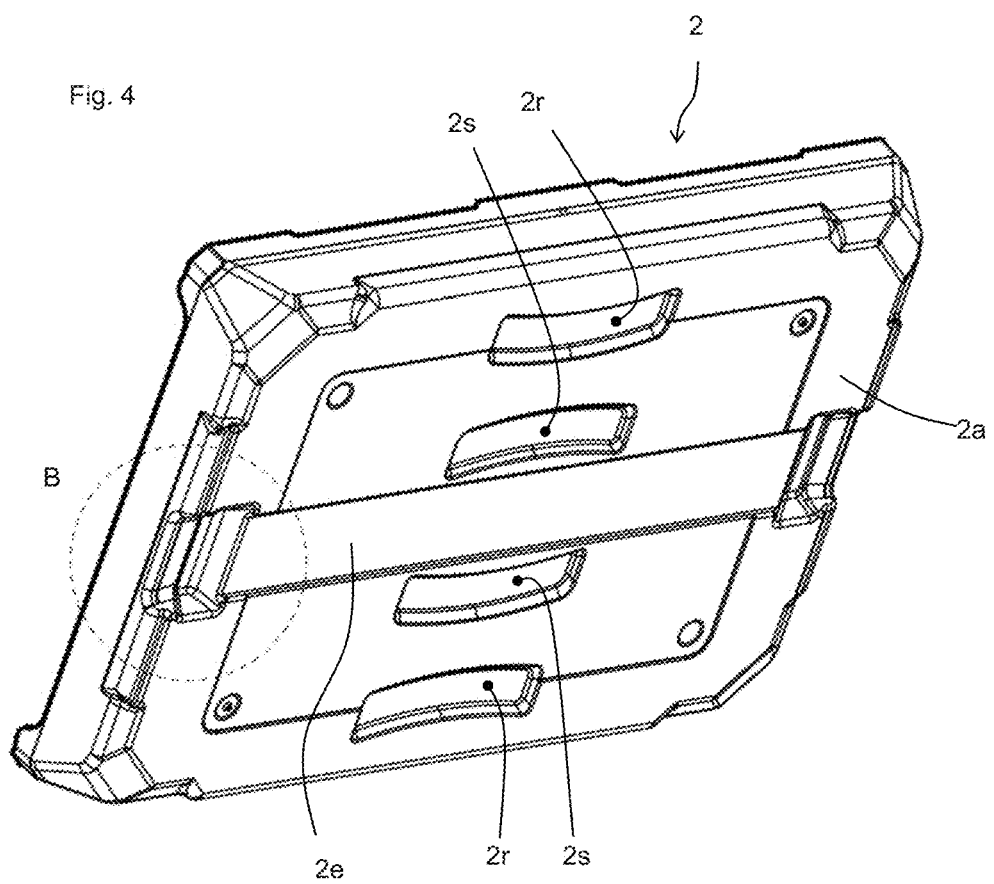
FIG. 4 is a perspective view of the bottom member 2 when viewed from below.

As shown in FIG. 4, a pair of concave portions 2r and a pair of concave portions 2s are provided on a lower surface 2a of the bottom member 2. The concave portion 2r is provided on an outer side than the concave portion 2s in the front-rear direction. The concave portion 2r is configured to be fitted into the convex portions 5r, 6r when the containers 1 are stacked in an assembled state, so that the containers 1 can be stably stacked.

As shown in FIG. 8, the upper walls 5, 6 are provided with convex portions 5s, 6s on a surface opposite to the surface provided with the convex portions 5r, 6r. The convex portions 5s, 6s are directed to an upper side of the upper walls 5, 6 when the container 1 is folded, as shown in FIG. 8. The convex portions 5s, 6s are fitted into the concave portion 2s when the folded containers 1 are stacked, so that the containers 1 can be stably stacked.

2. Configuration of Upper Walls 5, 6

As shown in FIG. 2 and FIG. 3, the upper walls 5, 6 comprise overlapping portions 5h, 6h overlapping each other. The total thickness of the upper walls 5, 6 at the overlapping portions 5h, 6h is equal to the thickness of the upper walls 5, 6 at adjacent portion 5i, 6i adjacent to the overlapping portions 5h, 6h. The upper wall 5 comprises an inclined surface 5b inclined so as to become lower toward a distal end of the overlapping portion 5h. The upper wall 6 comprises an inclined surface 6b inclined so as to become higher toward a distal end of the overlapping portion 6h. Inclination angles of the inclined surfaces 5b, 6b are preferably the same, but may be different. When the inclination angles of the inclined surfaces 5b, 6b are different, it is preferable to set to be the inclination angle of the inclined surface 5b >the inclination angle of the inclined surface 6b. The contact between the inclined surfaces 5b, 6b prevents a gap being formed between the upper walls 5, 6. Further, when the upper wall 5 is pressed from above, the inclined surface 5b slides on the inclined surface 6b, so that a force is applied in a direction in which the upper wall 5 approaches the upper wall 6. Consequently, even if the upper wall 5 is pressed from above by stacking the containers 1, a gap is hardly formed between the upper walls 5, 6.

As shown in FIG. 3, the inclination angle α of the inclined surface 5b with respect to an upper surface 5c (with respect to a horizontal plane when the container 1 is placed on the horizontal plane) is preferably 1 to 45 degrees. If this angle is too small, a gap is likely to be formed between the upper walls 5, 6. If this angle is too large, the inclined surfaces 5b, 6b may be engaged with each other, and thus the upper walls 5, 6 may be difficult to open. The inclination angle α is, for example, 1, 5, 10, 15, 20, 25, 30, 35, 40, 45 degrees, and may be within a range between any two of the values exemplified herein.

When the upper walls 5, 6 are closed, a distal end surface 5a of the overlapping portion 5h faces a distal end surface 6g of the adjacent portion 6i, and a distal end surface 6a of the overlapping portion 6h faces a distal end surface 5g of adjacent portion 5i. The distal end surfaces 5a, 5g, 6a, 6g are formed as a tapered surface inclined so as not to interfere when closing the upper walls 5, 6. A groove 6c is provided at a proximal end of the inclined surface 6b. With such a configuration, water on the upper walls 5, 6 due to dew condensation and the like can easily flow along the groove 6c toward the short side wall 4. Further, a bottom surface of the groove 6c is inclined downward from the center in the left-right direction toward the end, and thus water can flow more easily.

3. Configuration of Lower Surface 2a of Bottom Member 2

Figure 5:
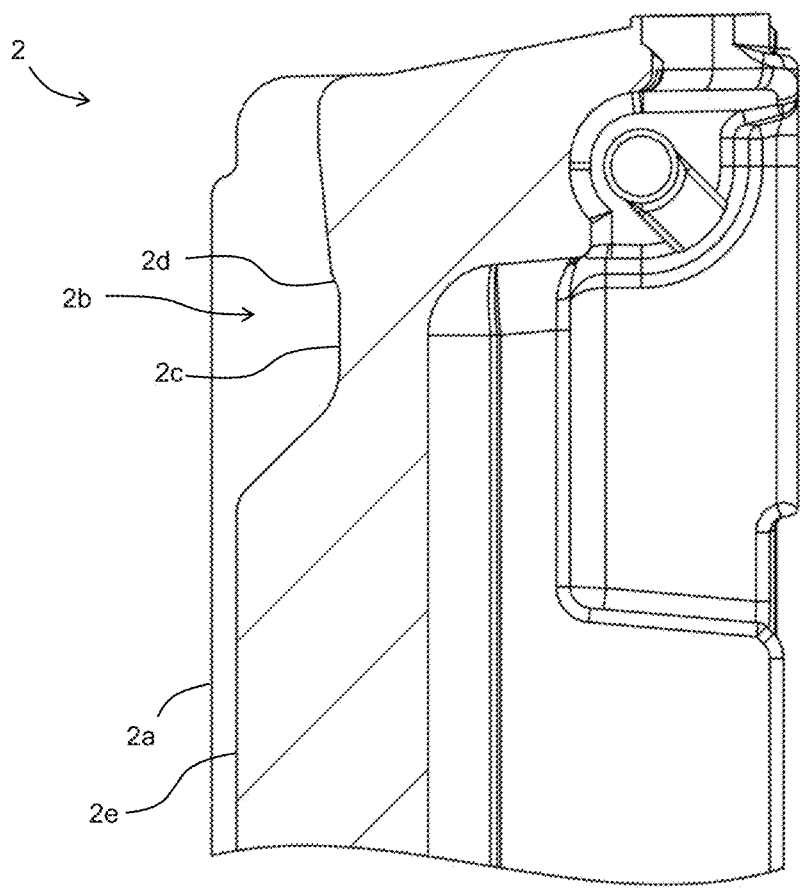
FIG. 5 is a cross-sectional view of a region B in FIG. 4 through the center of a groove 2e.

As shown in FIG. 4 and FIG. 5, a concave portion 2b is provided on the lower surface 2a of the bottom member 2 at the center in the front-rear direction and near both ends in the left-right direction. The concave portion 2b is configured to become shallower from a deepest portion 2c toward the end, and a step 2d is provided in the middle. When the container 1 is lifted, a fingertip can be placed at the deepest portion 2c so as to hook a finger on the step 2d, thereby preventing the finger from slipping and dropping the container 1. Further, A groove 2e is provided to connect the concave portions 2b near both ends. The groove 2e is formed shallower than the concave portion 2b. The container 1 can be lifted by hooking a belt on the groove 2e.

4. Method for Folding Container 1

A method for folding the container 1 is described.

First, the upper walls 5, 6 are opened from a state of FIG. 1 to a state of FIG. 6. In the state shown in FIG. 1, a ridge 4d (see FIG. 6) provided on an upper end of the short side wall 4 is engaged with a groove 6e (see FIG. 6) provided on lower surfaces 5d, 6d of the upper walls 5, 6, so that no gap is formed between the short side wall 4 and upper walls 5, 6. Therefore, the short side wall 4 cannot be rotated in this state. The ridge 4d is disengaged from the groove 6e by opening the upper walls 5, 6, and then the short side wall 4 can be rotated. Since the upper walls 5, 6 are connected to the long side wall 3 via the upper hinge member 8, the upper walls 5, 6 can be rotated to such an extent that the upper walls 5, 6 are in a position parallel to the long side wall 3.

Figure 7:
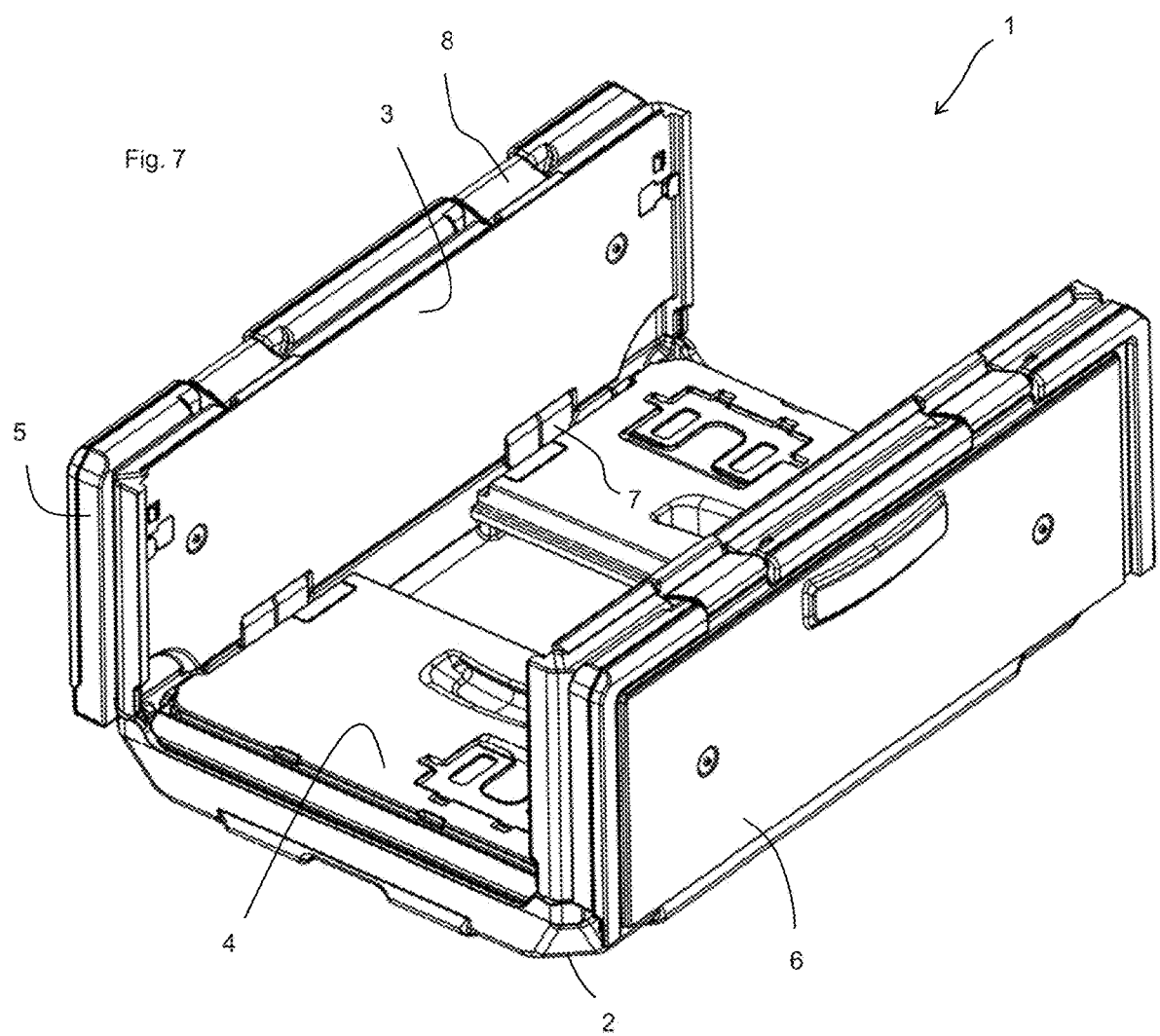
FIG. 7 is a perspective view showing a state where a short side wall 4 is tilted and laid from the state of FIG. 6.

Next, the short side wall 4 is tilted from a state of FIG. 6 to be laid as shown in FIG. 7. The short side wall 4 is rotatably connected to the bottom member 2 by engaging a projecting shaft 4c shown in FIG. 11 with a shaft receiving hole 2f of the bottom member 2. Therefore, when the short side wall 4 is pushed toward the center of the container 1, the short side wall 4 is rotated around the shaft receiving hole 2f and laid inside the container 1. Further, the connection between the long side wall 3 and the short side wall 4 by the connecting mechanism 9 is released by pushing the short side wall 4 toward the center of the container 1.

Next, the long side wall 3 is tilted from a state of FIG. 7 to be laid as shown in FIG. 8. The long side wall 3 is rotatably connected to the bottom member 2 via the lower hinge member 7. Therefore, when the long side wall 3 is pushed toward the center of the container 1, the long side wall 3 is rotated around the lower hinge member 7 and laid inside the container 1.

The container 1 can be folded into a compact form. When the container 1 is unfolded, the long side wall 3 is raised from a state of FIG. 8 to the state of FIG. 7, and then the short side wall 4 is raised to the state of FIG. 6. The long side wall 3 and the short side wall 4 are connected by the connecting mechanism 9 along with the operation of raising the short side wall 4, and thus the long side wall 3 and the short side wall 4 are maintained in an upright state.

5. Method for Assembling Container 1

A method for assembling the container 1 is described.

<Attaching Latch Structure 11 to Short Side Wall 4>

Figure 9:
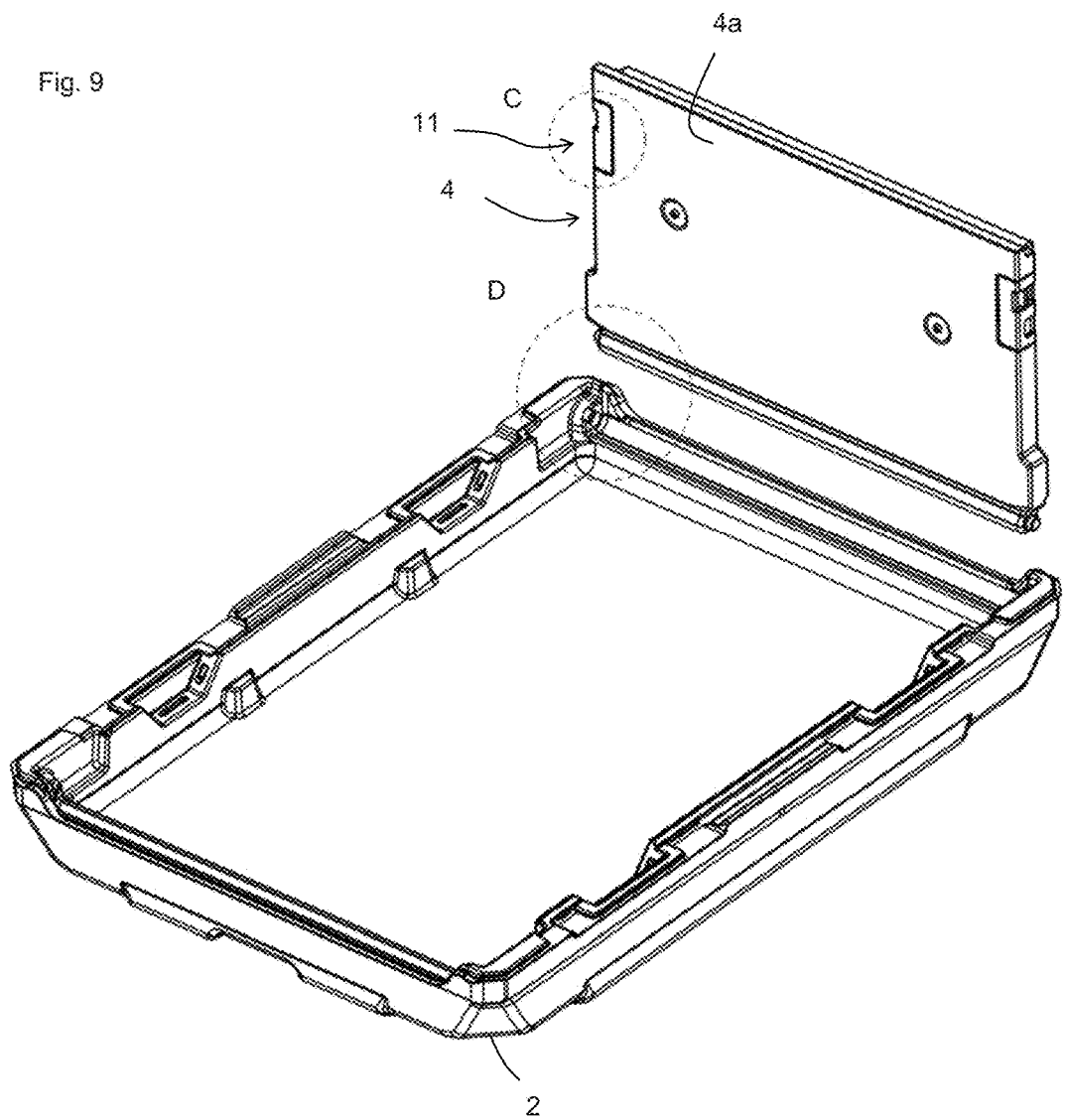
FIG. 9 is a perspective view showing a step of attaching the short side wall 4 to a bottom member 2.
Figure 10A:
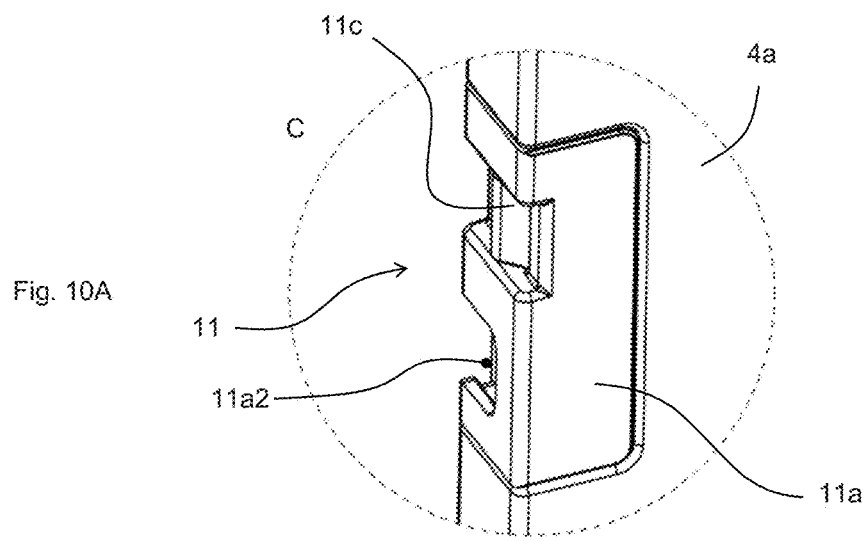
FIG. 10A is a perspective view of a region C in FIG. 9 when viewed from another angle.
Figure 10B:
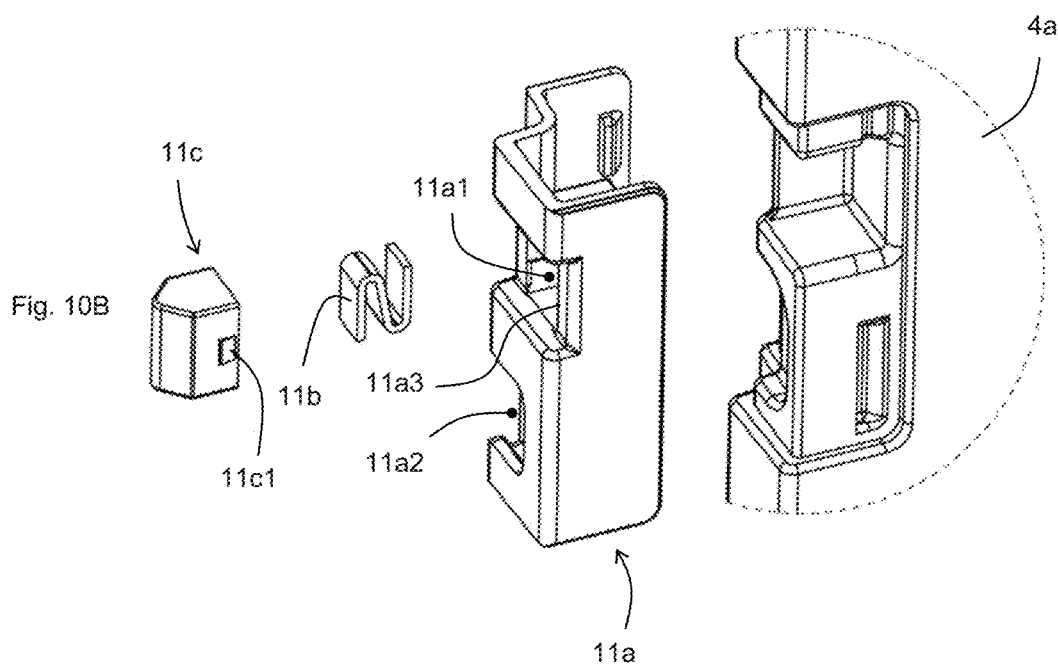
FIG. 10B is an exploded view of FIG. 10A.

First, as shown in FIG. 9, FIG. 10A, and FIG. 10B, a latch structure 11 is attached to a main body 4a of the short side wall 4. The latch structure 11 comprises a main body fitting 11a, an urging member 11b, and a projecting member 11c. The urging member 11b is, for example, a leaf spring made of resin. The main body fitting 11a comprises an accommodating concave portion 11a1 and an engaging concave portion 11a2. When the projecting member 11c is pushed into the accommodating concave portion 11a1 in a state where the urging member 11b is disposed in the accommodating concave portion 11a1, a projection 11c1 on a side surface of the projecting member 11c is arranged beyond a locking wall 11a3 of the main body fitting 11a while the projecting member 11c is elastically deformed. The urging member 11b and the projecting member 11c are then held in the accommodating concave portion 11a1, so that the latch structure 11 is obtained. Although the projecting member 11c is urged by the urging member 11b in a direction to project from an opening end of the accommodating concave portion 11a1, the projecting member 11c is held in the accommodating concave portion 11a1 by the projection 11c1 being locked by the locking wall 11a3. The latch structure 11 is pressed into a side surface of the main body 4a and fixed. Consequently, the structure shown in FIG. 10A is obtained.

<Connection between Short Side Wall 4 and Bottom Member 2>

Figure 12:
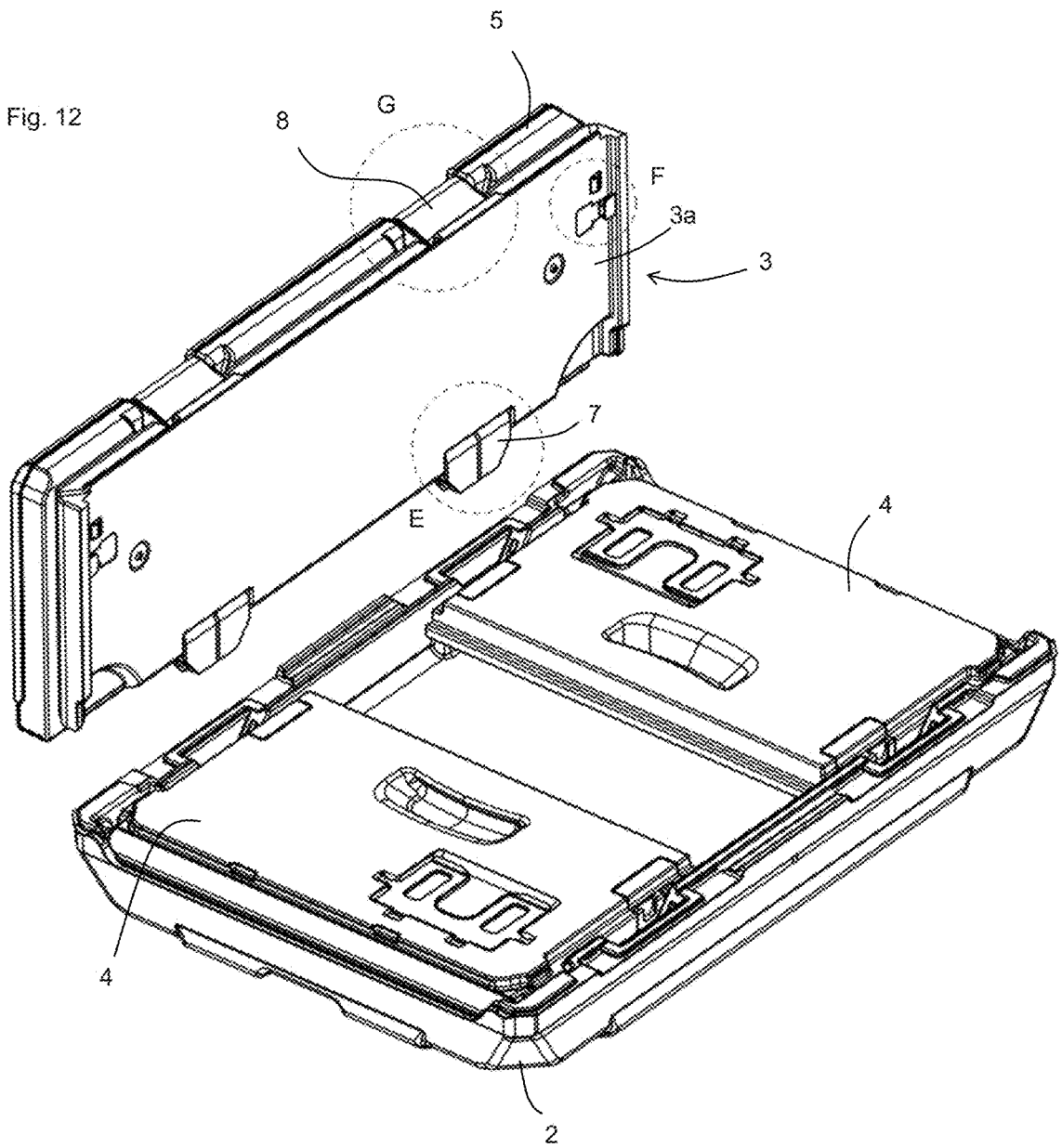
FIG. 12 is a perspective view showing a step of attaching the long side wall 3 to the bottom member 2.

As shown in FIG. 9 and FIG. 11, a ridge 4b having a substantially arc-shaped cross section is provided at a lower end of the short side wall 4. The ridge 4b extends in the front-rear direction (a width direction of the short side wall 4). The projecting shaft 4c is provided at both ends of the ridge 4b. A concave line 2g for accommodating the ridge 4b is provided at a position adjacent to a portion of the peripheral wall 2i of the bottom member 2 where the short side wall 4 is attached. The shaft receiving hole 2f is provided at both ends of the concave line 2g, and an inclined groove 2h inclined to be connected to the shaft receiving hole 2f is provided. A distal end of the projecting shaft 4c is moved while abutting against the inclined groove 2h to engage the projecting shaft 4c with the shaft receiving hole 2f. At this time, the ridge 4b is accommodated in the concave line 2g. Consequently, the short side wall 4 is connected to the bottom member 2. When the pair of short side walls 4 are attached to the bottom member 2 and are then tilted and laid, a state shown in FIG. 12 is obtained. In such a configuration, close contact between the short side wall 4 and the bottom member 2 is maintained even if the short side wall 4 is rotated with respect to the bottom member 2, and thus a gap is hardly formed between the short side wall 4 and the bottom member 2.

<Connection between Long Side Wall 3 and Lower Hinge Member 7>

Next, as shown in FIG. 12 to FIG. 17, the lower hinge member 7 is attached to a main body 3a of the long side wall 3. The lower hinge member 7 comprises a case 7a, a side wall locking member 7b, and a bottom member locking member 7c. The case 7a comprises a main body 7a1 and a lid 7a2. The main body 7a1 is configured to accommodate the side wall locking member 7b and the bottom member locking member 7c. The side wall locking member 7b comprises a pair of projecting shafts 7b1 and an urging portion 7b2 therebetween. The bottom member locking member 7c comprises a pair of projecting portion 7c1 and an urging portion 7c2 therebetween. Directions in which the projecting shaft 7b1 and the projecting portion 7c1 each protrude are parallel.

The case 7a comprises a pair of side surfaces 7a3 configured in parallel, a lower surface 7a4, and an inclined surface (hinge inclined surface) 7a5 therebetween. The projecting shaft 7b1 protrudes from the case 7a through an opening provided on the side surface 7a3. The projecting portion 7c1 protrudes from the case 7a through an opening provided on the inclined surface 7a5. The lower surface 7a4 is provided with a lower projecting portion 7a6 protruding downward.

The case 7a is provided with a guide wall 7a7 and a ridge 7a8. The projecting portion 7c1 is configured to slide along the guide wall 7a7. Further, since the projecting portion 7c1 is configured to slide while abutting against the two parallel ridges 7a8, rattling during sliding movement is suppressed. A distal end surface 7c3 of the projecting portion 7c1 is preferably configured to be substantially parallel to the inclined surface 7a5. Further, the distal end 7c5 of a lower surface 7c4 of the projecting portion 7c1 is preferably on an inner side than a surface P extending from the side surface 7a3. With such a configuration, the lower hinge member 7 can be easily attached to an accommodating concave portion 2j of the bottom member 2.

The projecting shaft 7b1 is urged by the urging portion 7b2 in a direction projecting from the case 7a. The projecting portion 7c1 is urged by the urging portion 7c2 in the direction projecting from the case 7a. The projecting shaft 7b1 and the urging portion 7b2 may be integrally formed or may be separate members. The projecting portion 7c1 and the urging portion 7c2 may be integrally formed or may be separate members.

Figure 13A:
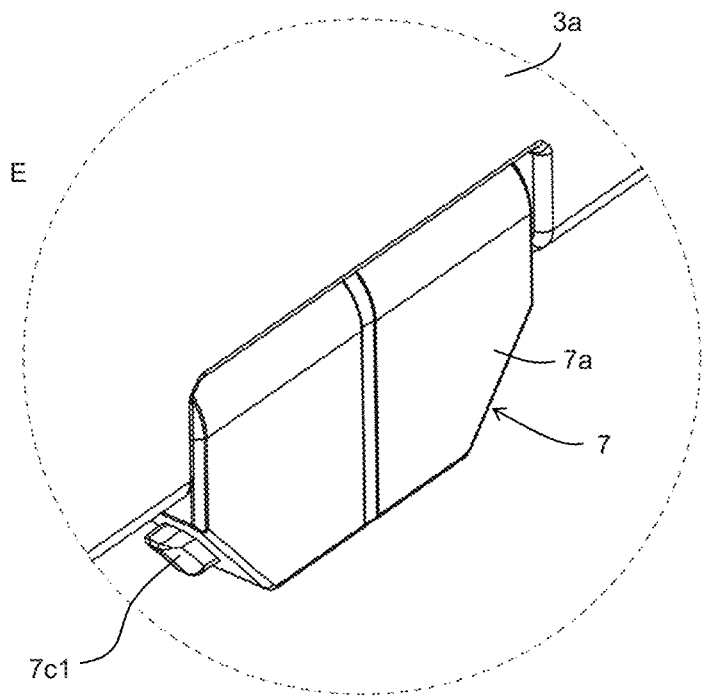
FIG. 13A is an enlarged view of a region E in FIG. 12.
Figure 13B:
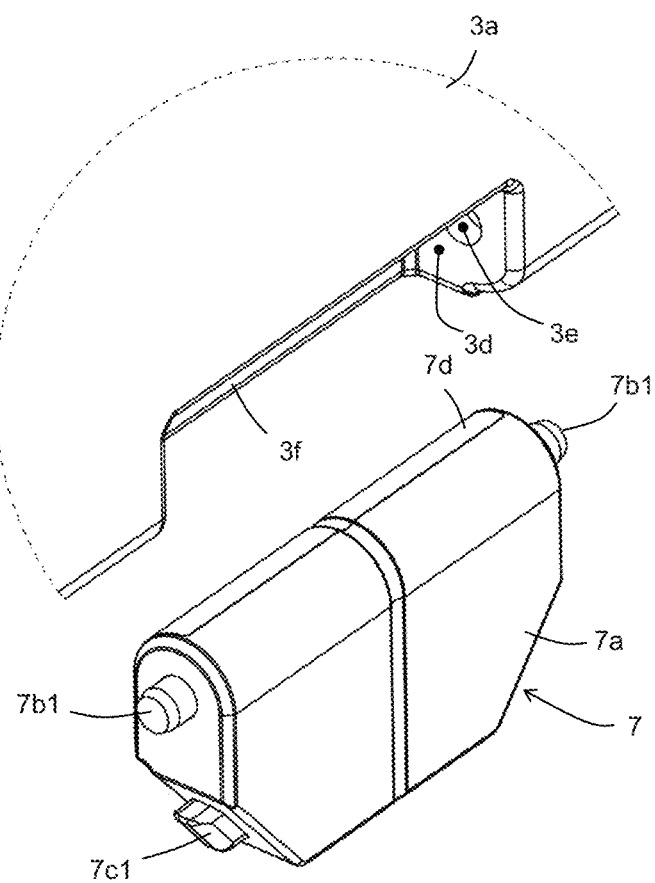
FIG. 13B is an exploded view of FIG. 13A.
Figure 15:
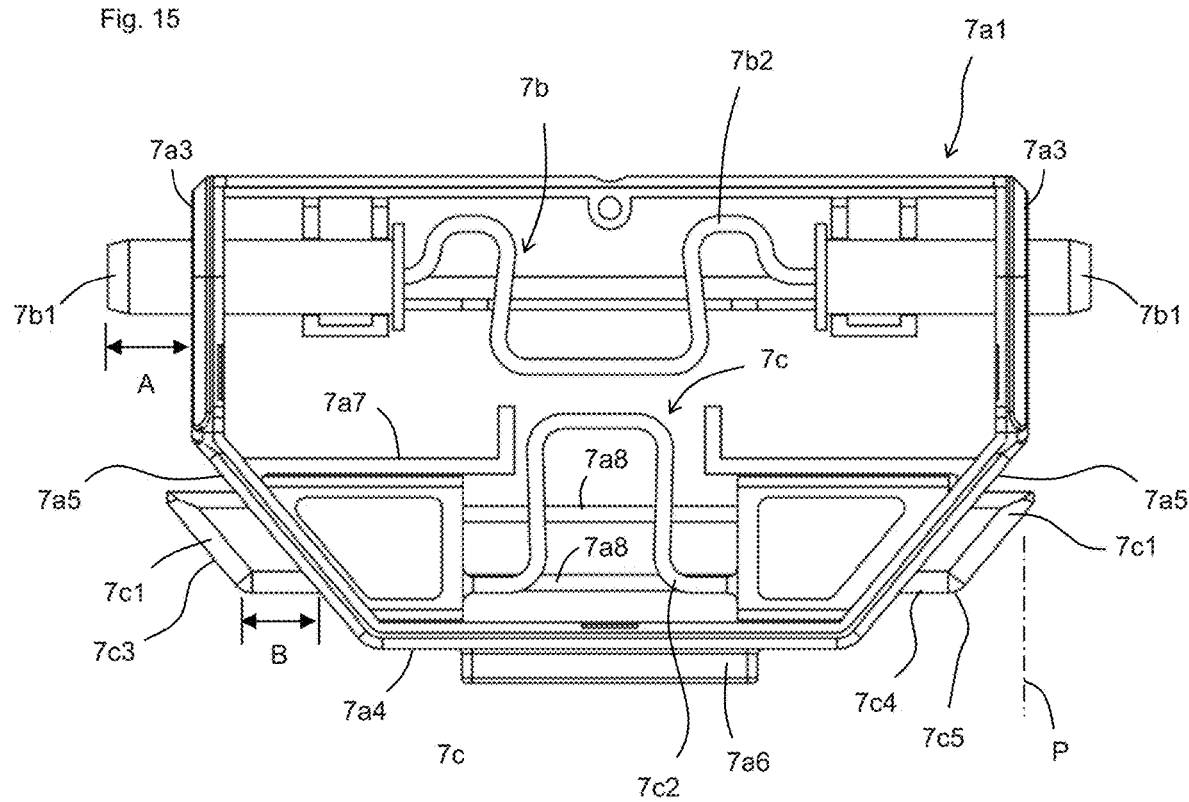
FIG. 15 is a front view of a state where a lid 7a2 is removed from the lower hinge member 7.

As shown in FIG. 13A, FIG. 13B and FIG. 17, an accommodating concave portion 3d for accommodating the lower hinge member 7 is provided on an inner surface side of a lower end of the long side wall 3. The width of the accommodating concave portion 3d is substantially the same as the width of the lower hinge member 7. a shaft receiving hole 3e for receiving the projecting shaft 7b1 is provided on both sides in a width direction of the accommodating concave portion 3d. While the projecting shaft 7b1 is pressed and retracted, the lower hinge member 7 is inserted into the accommodating concave portion 3d to engage the projecting shaft 7b1 with the shaft receiving hole 3e, so that the lower hinge member 7 is rotatably connected to the long side wall 3. The accommodating concave portion 3d does not penetrate the long side wall 3, and a wall surface 3f is provided on an outer side of the accommodating concave portion 3d in the front-rear direction. Further, an arc surface 7d whose center is the projecting shaft 7b1 is provided on an upper side of the lower hinge member 7. A portion of the accommodating concave portion 3d abutting against the arc surface 7d is formed as an arc surface 3g having the same radius of curvature as the arc surface 7d. The long side wall 3 is thus rotated with respect to the lower hinge member 7 while maintaining the contact between the arc surfaces 7d, 3g. With such a configuration, the formation of a gap between the long side wall 3 and the lower hinge member 7 is suppressed.

It is preferable that A≥B, and more preferable that A>B, wherein A represents a protrusion length of the projecting shaft 7b1, and B represents a protrusion length of the projecting portion 7c1. Since the protrusion length of the projecting shaft 7b1 is relatively large, the projecting shaft 7b1 can be stably held in the shaft receiving hole 3e.

<Connection between Lower Hinge Member 7 and Bottom Member 2>

Figure 16:
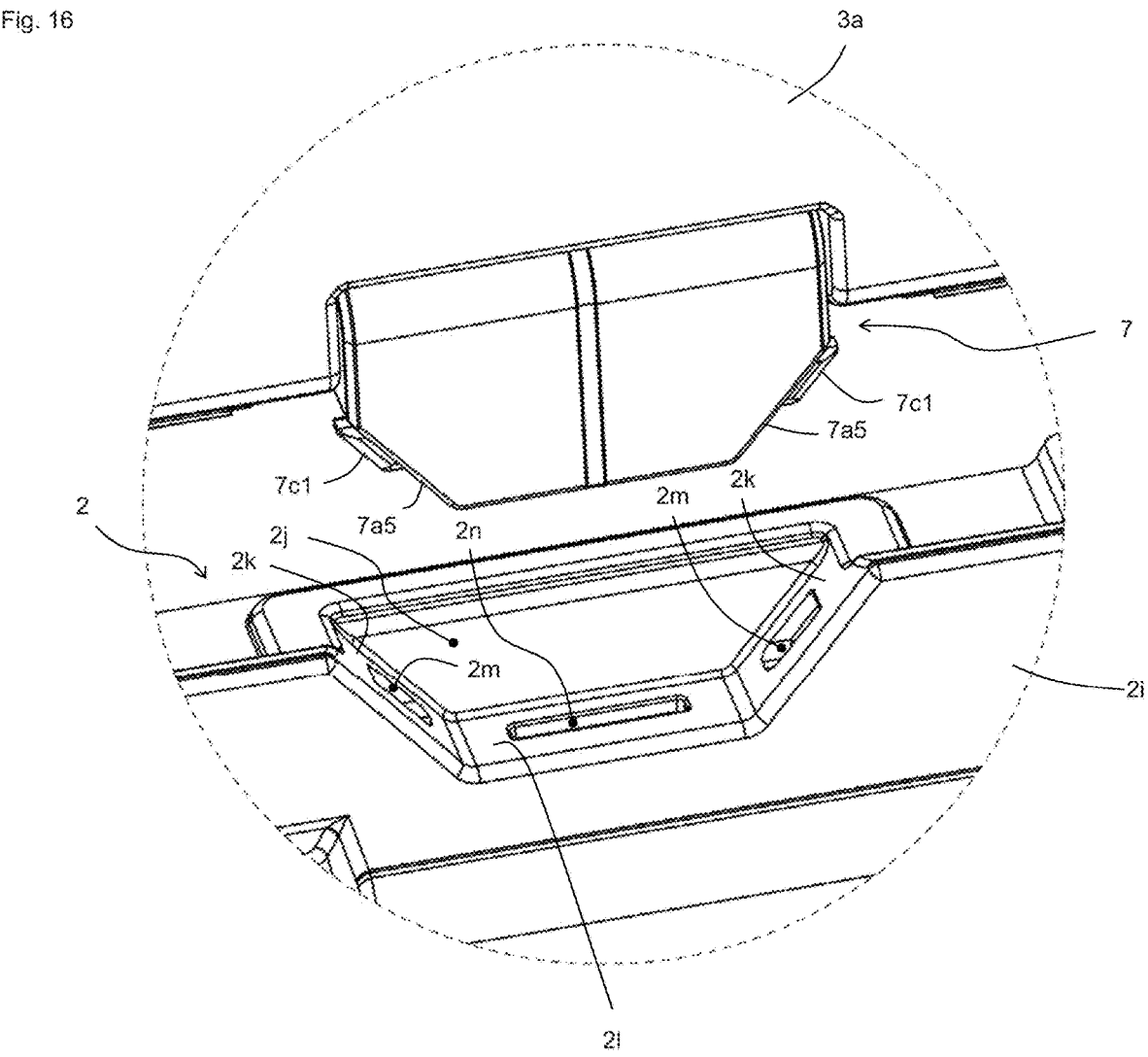
FIG. 16 is a perspective view of the vicinity of the region E in FIG. 12, showing a step of attaching the lower hinge member 7 to the bottom member 2.
Figure 18A:
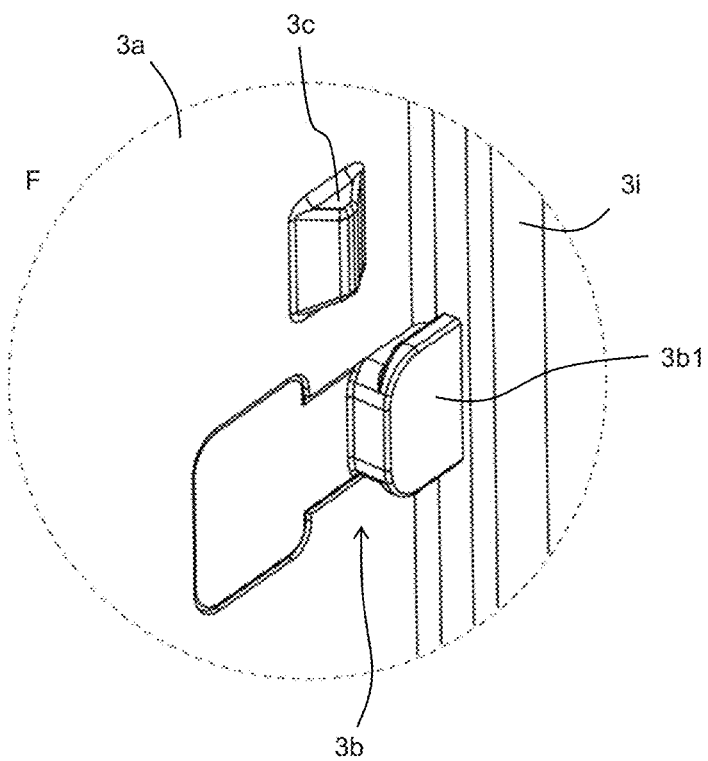
FIG. 18A is an enlarged view of a region F in FIG. 12.
Figure 18B:
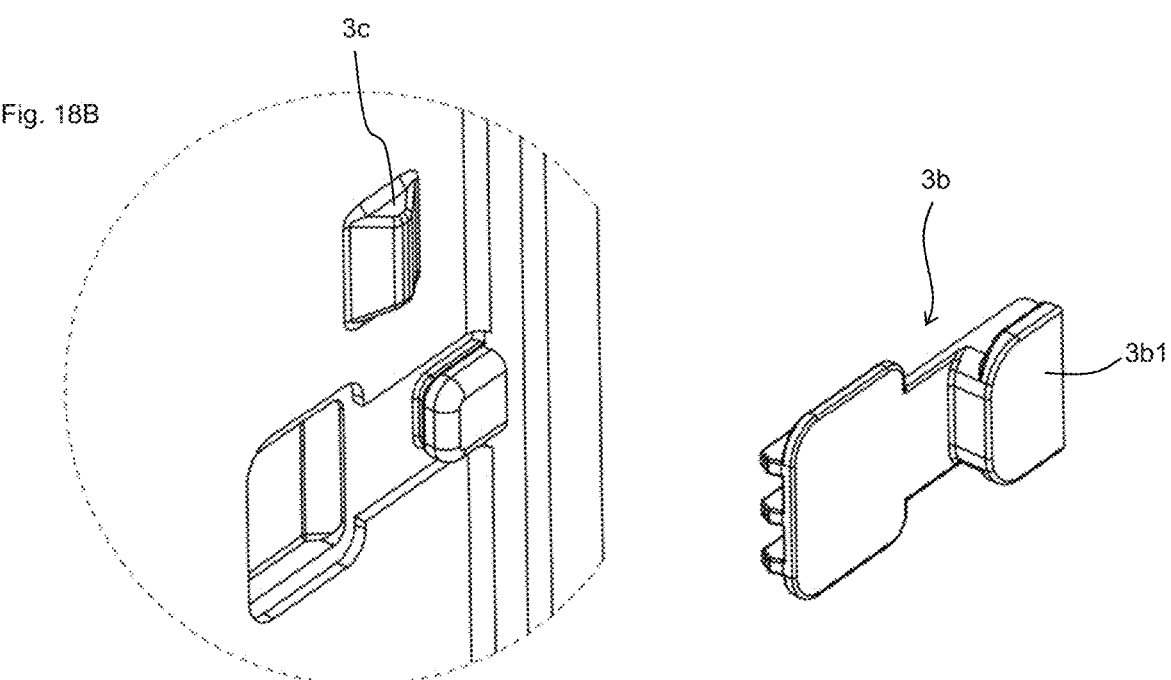
FIG. 18B is an exploded view of FIG. 18A.

Next, as shown in FIG. 12, FIG. 16, and FIG. 17, the lower hinge member 7 is connected to the bottom member 2. The lower hinge member 7 may be connected to the bottom member 2 before connecting the lower hinge member 7 to the long side wall 3. Further, the lower hinge member 7 may be connected to the bottom member 2 after connecting the long side wall 3 and the upper walls 5, 6 by means of the upper hinge member 8.

The accommodating concave portion 2j for accommodating the lower hinge member 7 is provided on an inner surface side of an upper end of the peripheral wall 2i of the bottom member 2. The accommodating concave portion 2j has the same shape as the shape formed by the inclined surface 7a5 and the lower surface 7a4 of the lower hinge member 7. The accommodating concave portion 2j comprises an inclined surface (concave-portion inclined surface) 2k and the lower surface 21. The inclined surface 2k is inclined such that the width of the accommodating concave portion 2j decreases downward. The lower surface 21 is provided between a pair of inclined surfaces 2k. The lower hinge member 7 is inserted into the accommodating concave portion 2j so as to be sandwiched between the pair of inclined surfaces 2k.

The inclined surface 2k is provided with an engagement hole (inclined-surface engagement hole) 2m engaging with the projecting portion 7c1. The lower surface 21 is provided with an engagement hole (lower-surface engagement hole) 2n engaging with the lower projecting portion 7a6. When the lower hinge member 7 is inserted into the accommodating concave portion 2j, the projecting portion 7c1 is pushed back by the inclined surface 2k until the projecting portion 7c1 reaches a position of the engagement hole 2m. When the projecting portion 7c1 reaches the position of the engagement hole 2m, the projecting portion 7c1 projects due to the urging force of the urging portion 7c2, so that the projecting portion 7c1 is engaged with the engagement hole 2m. At this time, the lower projecting portion 7a6 is engaged with the engagement hole 2n. With such a configuration, the lower hinge member 7 can be connected to the accommodating concave portion 2j simply by pressing the lower hinge member 7 against the accommodating concave portion 2j from above, and thus assembling efficiency is extremely high. Further, the accommodating concave portion 2j does not penetrate the peripheral wall 2i, and a wall surface 2o is provided on an outer side of the accommodating concave portion 2j in the front-rear direction. With such a configuration, the formation of a gap between the lower hinge member 7 and the bottom member 2 is suppressed.

As shown in FIG. 14 and FIG. 17, an outer side surface of the lower hinge member 7 is provided with a concave portion 7e at a portion abutting against the bottom member 2. The thickness of the wall surface 2o can be increased as a result of providing the concave portion 7e at this portion. If the bottom member 2 has a sandwich structure in which a foam is sandwiched between a pair of resin sheets, the bottom member 2 can be manufactured using a split mold opening and closing in a vertical direction. In this case, if the wall surface 2o is too thin, it becomes difficult to arrange a foam at a position of the wall surface 2o. Thus, the lower hinge member 7 is provided with the concave portion 7e in order to increase the thickness of the wall surface 2o. Further, a position of the projecting portion 7c1 is closer to the center of the container 1 from the projecting shaft 7b1 in order to provide the concave portion 7e.

As shown in FIG. 17, a ridge 2p is provided at an upper end of the peripheral wall 2i of the bottom member 2, and a ridge 3h is provided at a lower end of the long side wall 3. The ridge 3h is arranged on an outer side of the ridge 2p, and side surfaces of the ridge 3h and the ridge 2p are abutting against each other. With such a configuration, the formation of a gap between the bottom member 2 and the long side wall 3 can be suppressed.

<Connection of Long Side Wall 3 and Short Side Wall 4>

Next, as shown in FIG. 12, FIG. 18A, FIG. 18B, and FIG. 19, an engagement fitting 3b is attached to the main body 3a of the long side wall 3. The engagement fitting 3b can be attached by press fitting. The engagement fitting 3b is attached at a position adjacent to an engagement projection 3c projecting from an inner surface of the main body 3a. The connecting mechanism 9 is composed by the latch structure 11, the engagement fitting 3b, and the engagement projection 3c. When the short side wall 4 is raised from the state shown in FIG. 7, the projecting member 11c shown in FIG. 10A and FIG. 10B comes into contact with the engagement projection 3c, and then the projecting member 11c is arranged beyond the engagement projection 3c while retreating by being pushed back by the engagement projection 3c.

Figure 19:
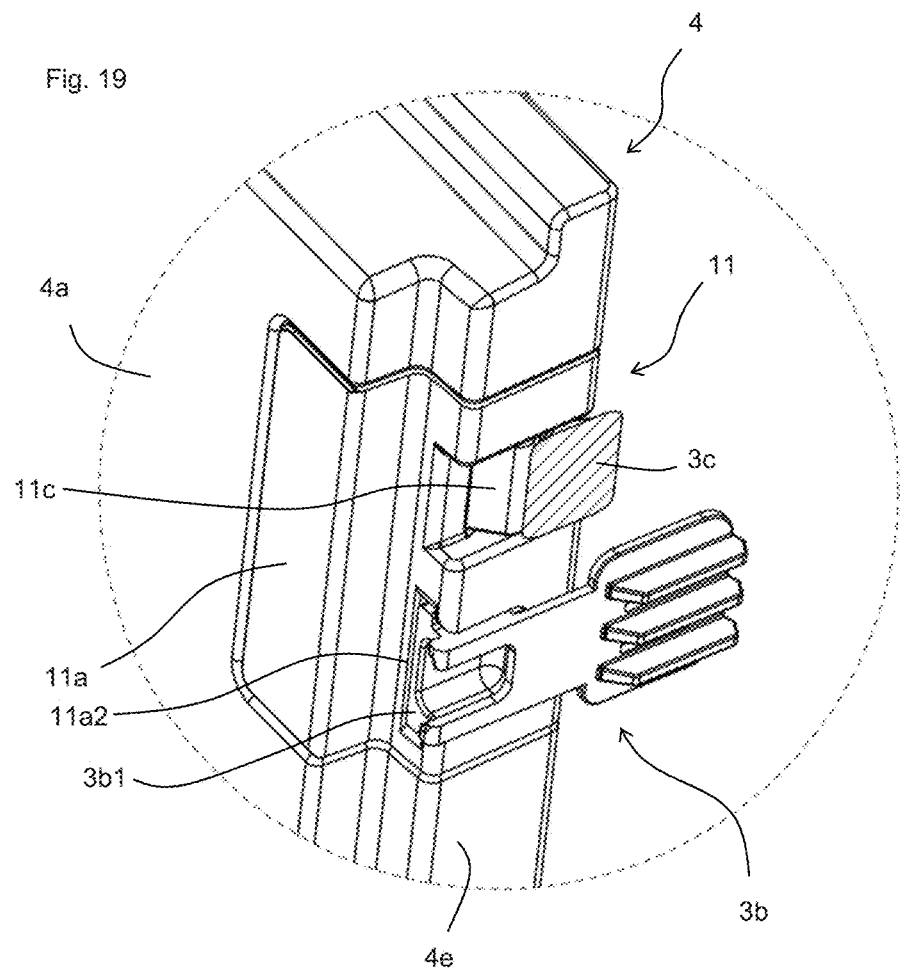
FIG. 19 is a perspective view of the vicinity of a region C in FIG. 9 with an engagement fitting 3b and an engagement projection 3c.
Figure 20A:
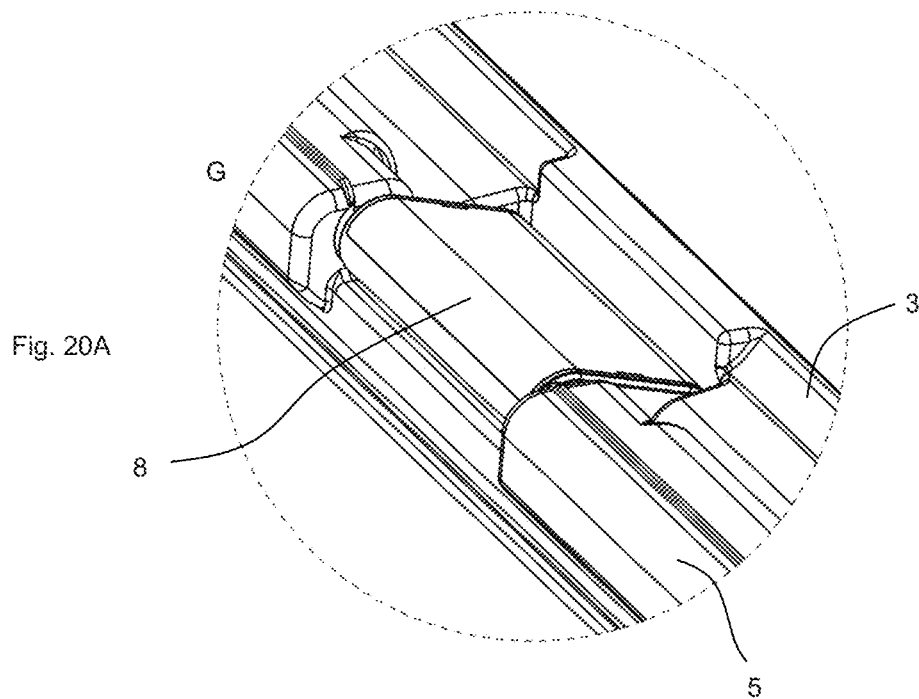
FIG. 20A is a perspective view of a region G in FIG. 12 when viewed from another angle.
Figure 20B:
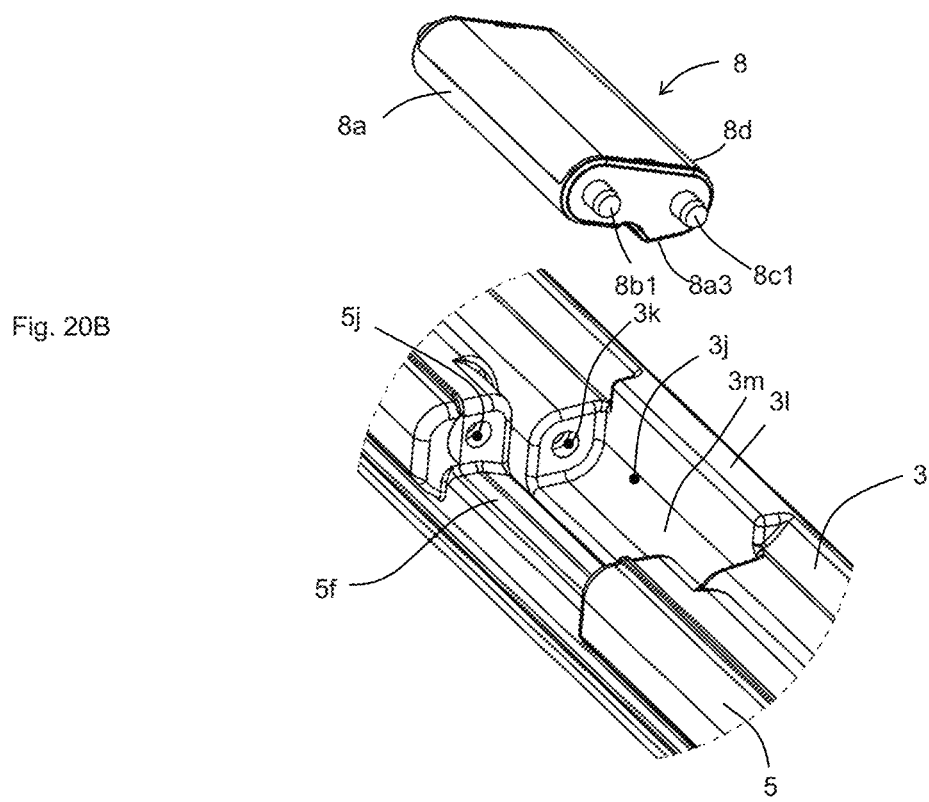
FIG. 20B is an exploded view of FIG. 20A.
Figure 21A:
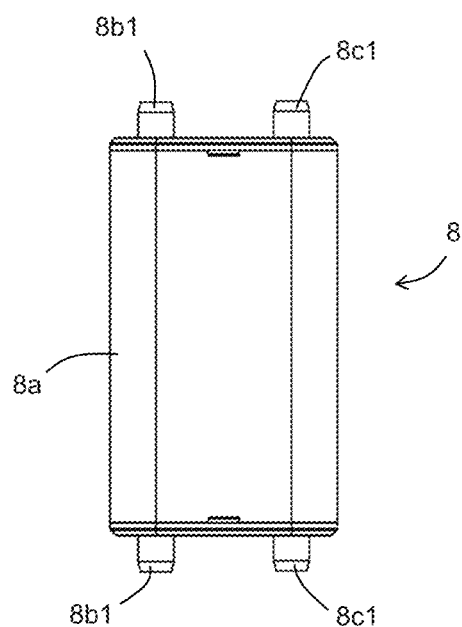
FIG. 21A to FIG. 21C show the upper hinge member 8.
Figure 21B:
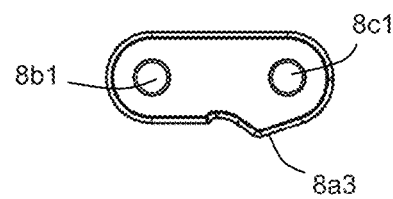
Figure 21C:
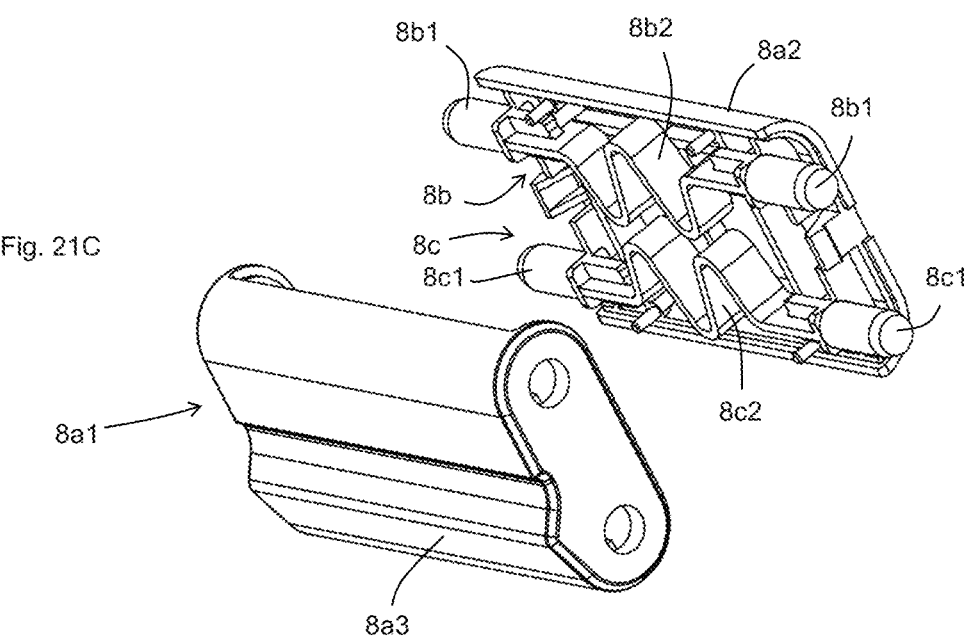

When the projecting member 11c is arranged beyond the engagement projection 3c, the projecting member 11c projects again, so that the long side wall 3 and the short side wall 4 are connected by the connecting mechanism 9, as shown in FIG. 19. When connected by such a method, misalignment hardly occurs during the assembly of the container. Further, in this state, when the short side wall 4 is tilted, the projecting member 11c comes into contact with the engagement projection 3c, and thus the short side wall 4 is prevented from being tilted. Further, an engagement protrusion 3b1 of the engagement fitting 3b enters the engaging concave portion 11a2 of the main body fitting 11a at this time, and the engagement protrusion 3b1 abuts against the main body fitting 11a. Consequently, the short side wall 4 is not further opened. Such a mechanism makes it possible to maintain the short side wall 4 in the upright state. Further, a ridge 3i of the long side wall 3 (Shown in FIG. 18A and FIG. 18B) is arranged on an outer side from the ridge 4e of the short side wall 4 (Shown in FIG. 19) in this state, and side surfaces of the ridge 3i and the ridge 4e abut against each other. With such a configuration, the formation of a gap between the long side wall 3 and the short side wall 4 can be suppressed.

If a container is not provided with the latch structure 11, the upper walls 5, 6 may be closed in a state where the short side wall 4 is not completely upright. When the upper walls 5, 6 are closed in such a state, the ridge 4d of the short side wall 4 and the groove 6e of the upper walls 5, 6 may interfere with each other and may be scraped, resulting in reduced sealability. On the other hand, in the present embodiment, since the latch structure 11 is provided, the upper walls 5, 6 can be closed when the short side wall 4 is completely upright, and thus the interference between the ridge 4d and the groove 6e can be suppressed. The container 1 of the present embodiment is premised to be repeatedly opened and closed or folded. Since the scraping due to the interference between the ridge 4d and the groove 6e is likely to occur in such a case, it is technically significant to provide the latch structure 11.

When the short side wall 4 is tilted, the projecting member 11c is retracted and arranged beyond the engagement projection 3c by applying a strong force in a direction of tilting the short side wall 4. Consequently, the connection by the connecting mechanism 9 is released, and the short side wall 4 can be tilted.

<Connection of Long Side Wall 3 and Upper Walls 5, 6>

Next, as shown in FIG. 12, and FIG. 20A to FIG. 22C, the long side walls 3 are connected to the upper walls 5, 6. One long side wall 3 is connected to the upper wall 5, and the other long side wall 3 is connected to the upper wall 6. The connecting structure between the long side wall 3 and the upper wall 6 is the same as the connecting structure between the long side wall 3 and the upper wall 5, and thus the connection between the long side wall 3 and the upper wall 5 is described herein as an example.

The long side wall 3 and the upper wall 5 are connected via the upper hinge member 8. The upper hinge member 8 comprises a case 8a, an upper wall locking member 8b, and a side wall locking member 8c. The case 8a comprises a main body 8a1 and a lid 8a2. The main body 8a1 is configured to accommodate the upper wall locking member 8b and the side wall locking member 8c. The upper wall locking member 8b comprises a pair of projecting shafts 8b1 and an urging portion 8b2 therebetween. The side wall locking member 8c comprises a pair of projecting shafts 8c1 and an urging portion 8c2 therebetween. Projecting shafts 8b1, 8c1 project from the case 8a through an opening provided on a side surface of the case 8a. The projecting shafts 8b1, 8c1 extend in parallel. The projecting shafts 8b1, 8c1 are urged by the urging portion 8b2, 8c2 in a direction projecting from the case 8a. The projecting shaft 8b1 and the urging portion 8b2 may be integrally formed or may be separate members. The projecting shaft 8c1 and the urging portion 8c2 may be integrally formed or may be separate members. The case 8a is provided with a rotation restricting portion 8a3 for restricting the rotation of the upper hinge member 8.

As shown in FIG. 20B and FIG. 22A to FIG. 22C, an accommodating concave portion 3j for accommodating the upper hinge member 8 is provided on an outer surface side of an upper end of the long side wall 3. The width of the accommodating concave portion 3j is the same as the width of the upper hinge member 8. A shaft receiving hole 3k for receiving the projecting shaft 8c1 is provided on both sides in a width direction of the accommodating concave portion 3j. While the projecting shaft 8c1 is pressed and retracted, the upper hinge member 8 is inserted into the accommodating concave portion 3j to engage the projecting shaft 8c1 with the shaft receiving hole 3k. Consequently, the upper hinge member 8 is rotatably connected to the long side wall 3. The accommodating concave portion 3j does not penetrate the long side wall 3, and a wall surface 31 is arranged on an inner side along the front-rear direction of the accommodating concave portion 3j. Further, the upper hinge member 8 is provided with an arc surface 8d whose center is the projecting shaft 8c1. A portion of the accommodating concave portion 3j abutting against the arc surface 8d is formed as an arc surface 3m having the same radius of curvature as the arc surface 8d. The upper hinge member 8 is thus rotated with respect to the long side wall 3 while maintaining the contact between the arc surfaces 8d, 3m. With such a configuration, the formation of a gap between the upper hinge member 8 and the long side wall 3 can be suppressed.

As shown in FIG. 20B and FIG. 22A to FIG. 22C, an accommodating concave portion 5f for accommodating the upper hinge member 8 is provided at a proximal end of the upper wall 5. The width of the accommodating concave portion 5f is substantially the same as the width of the upper hinge member 8. A shaft receiving hole 5j for receiving the projecting shaft 8b1 are provided on both sides in a width direction of the accommodating concave portion 5f. While the projecting shaft 8b1 is pressed and retracted, the upper hinge member 8 is inserted into the accommodating concave portion 5f to engage the projecting shaft 8b1 with the shaft receiving hole 5j. Consequently, the upper hinge member 8 is rotatably connected to the upper wall 5.

Through the steps described above, the long side wall 3 and the upper walls 5, 6 are connected, and the container 1 assembled as shown in FIG. 6 is obtained.

6. Closing Method of Upper Walls 5, 6

Figure 22A:
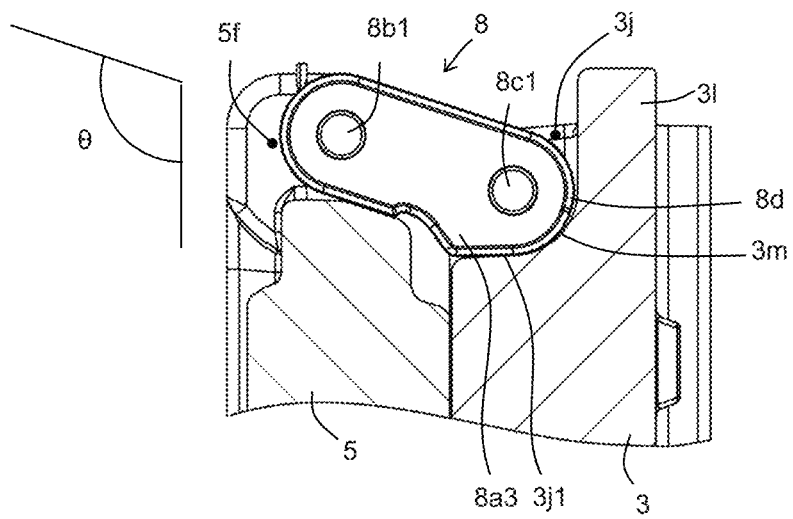
FIG. 22A is a cross-sectional view of the region G in FIG. 12 (the upper hinge member 8 is in front view)
Figure 22B:
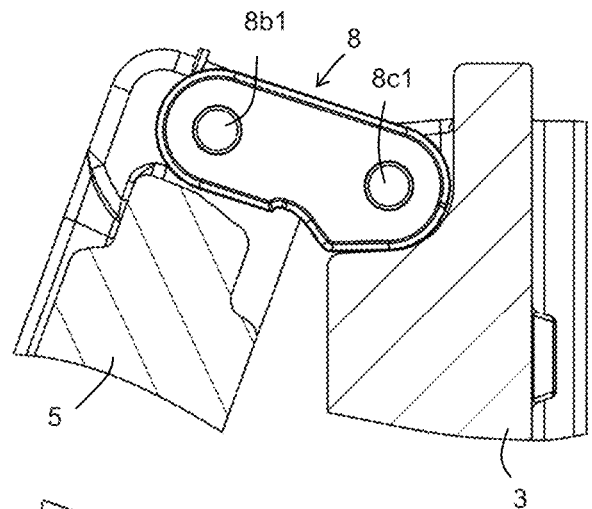
FIG. 22B and FIG. 22C show a state where the upper wall 5 is rotated.
Figure 22C:
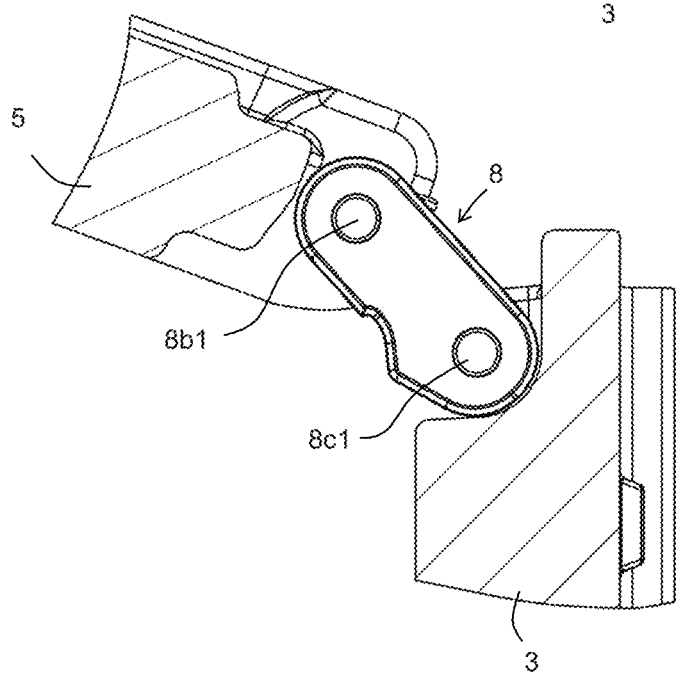

As shown in FIG. 22A to FIG. 22C, the upper wall 5 can be closed by rotating the upper hinge member 8 around the projecting shaft 8c1 while rotating the upper wall 5 around the projecting shaft 8b1. The projecting shafts 8b1, 8c1 serve as a rotation axis. The same applies to the upper wall 6.

In the present embodiment, the upper hinge member 8 is provided with the rotation restricting portion 8a3 below the projecting shaft 8c1, and the rotation restricting portion 8a3 is configured to abut against a lower surface 3j1 of the accommodating concave portion 3j to prevent the upper hinge member 8 from further rotating. Therefore, a position of the projecting shaft 8b1 is always higher than a position of the projecting shaft 8c1. As shown in FIG. 22B and FIG. 22C, when the upper wall 5 is gripped and rotated, the upper hinge member 8 can be easily rotated around the projecting shaft 8c1, and thus the upper hinge member 8 can be smoothly rotated to smoothly close the upper wall 5.

An angle β of a plane passing through the projecting shafts 8b1, 8c1 with respect to an outer surface 3o of the long side wall 3 is preferably 91 to 135 degrees, more preferably 100 to 120 degrees, specifically, for example, 91, 95, 100, 105, 110, 115, 120, 125, 130, 135 degrees, and may be within a range between any two of the values exemplified herein.

Figure 23A:
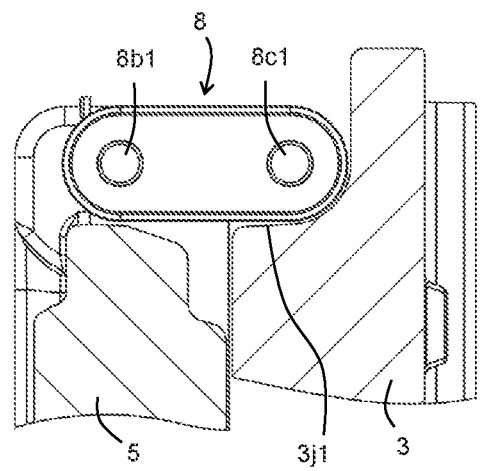
FIG. 23A to FIG. 23C are diagrams corresponding to FIG. 22A to FIG. 22C without a rotation restricting portion 8a3.
Figure 23B:
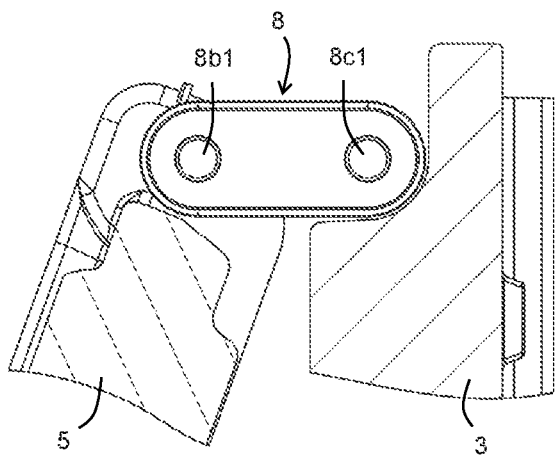
Figure 23C:
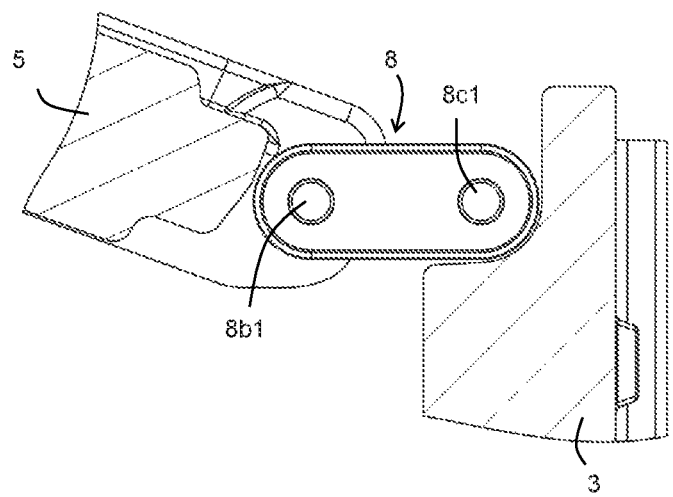

If the upper hinge member 8 is not provided with the rotation restricting portion, as shown in FIG. 23A to FIG. 23C, the upper hinge member 8 comes into contact with the lower surface 3j1 when the projecting shaft 8b1 is at the same height as the projecting shaft 8c1 or at a lower position than the projecting shaft 8c1, and the upper hinge member 8 is prevented from further rotating. In this state, when the upper wall 5 is gripped and rotated, it is difficult to rotate the upper hinge member 8 around the projecting shaft 8c1, and a state shown in FIG. 23C may occur. In such a state, the upper wall 5 cannot be closed unless the upper hinge member 8 is rotated by directly applying a force thereto, which is troublesome.

Embodiment of Fourth Viewpoint

Figure 24:
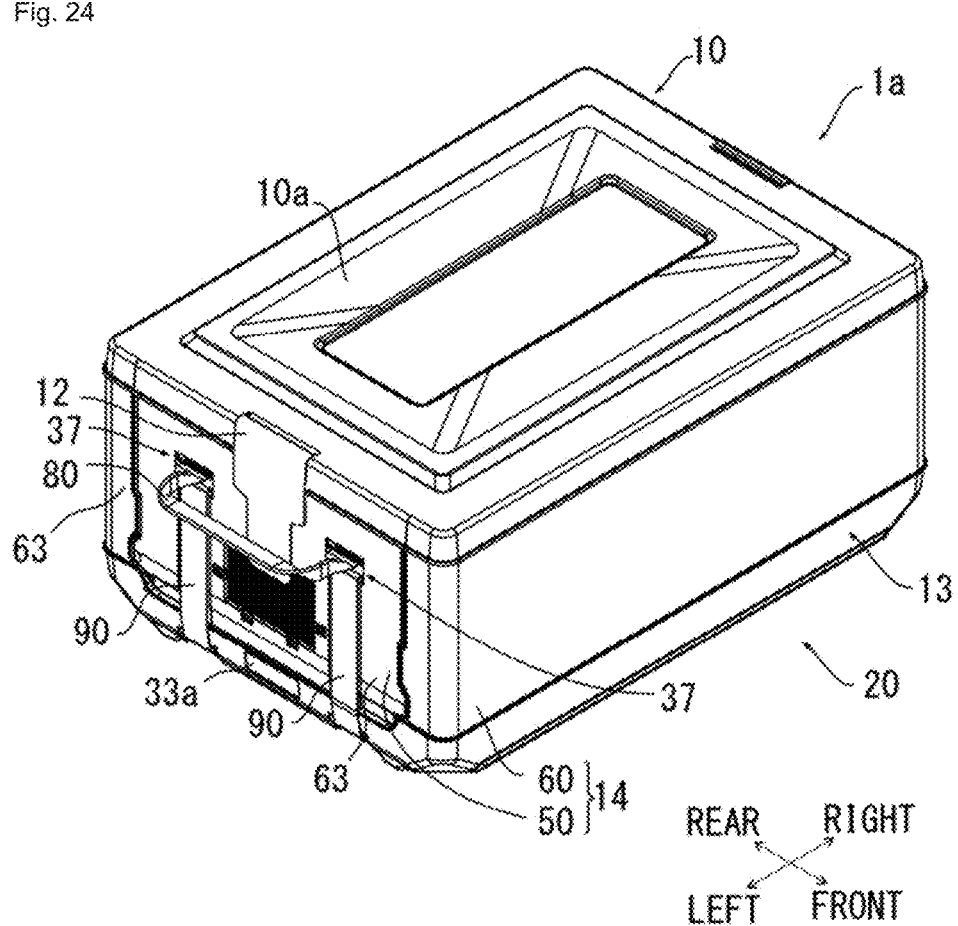
FIG. 24 is an external perspective view of a folding container 1a according to an embodiment of the fourth viewpoint of the present invention.
Figure 25:
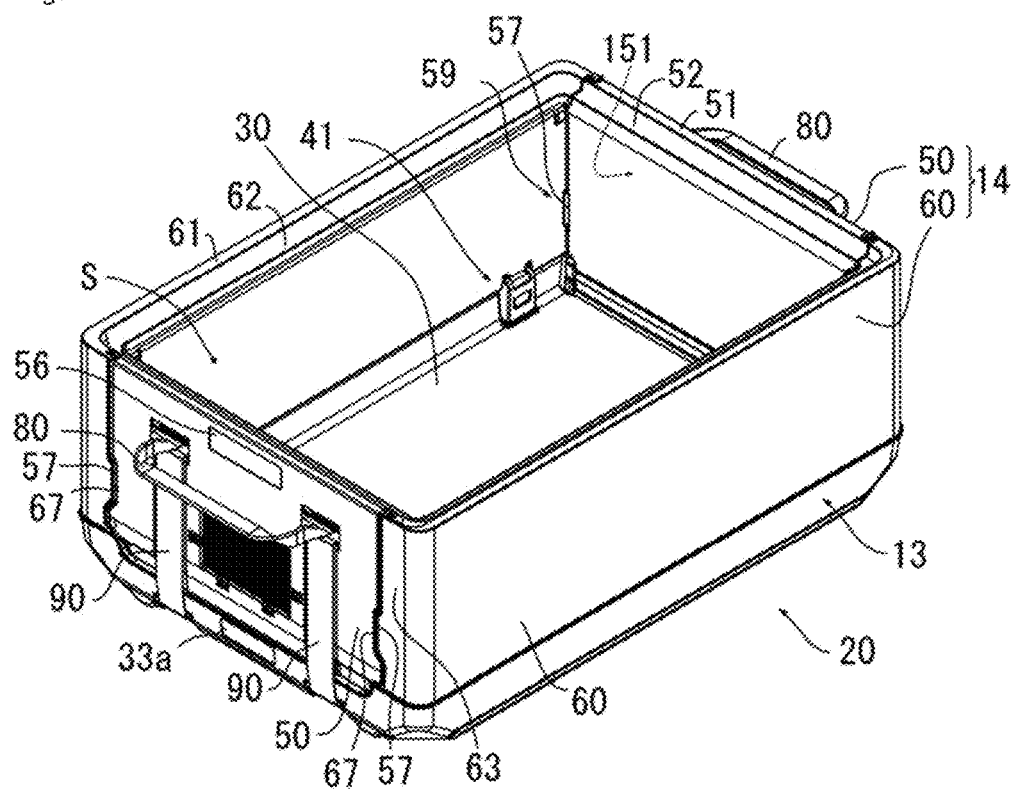
FIG. 25 is an external perspective view of a container body 20 of the folding container 1a of FIG. 24 when viewed from an upper surface side.
Figure 26:
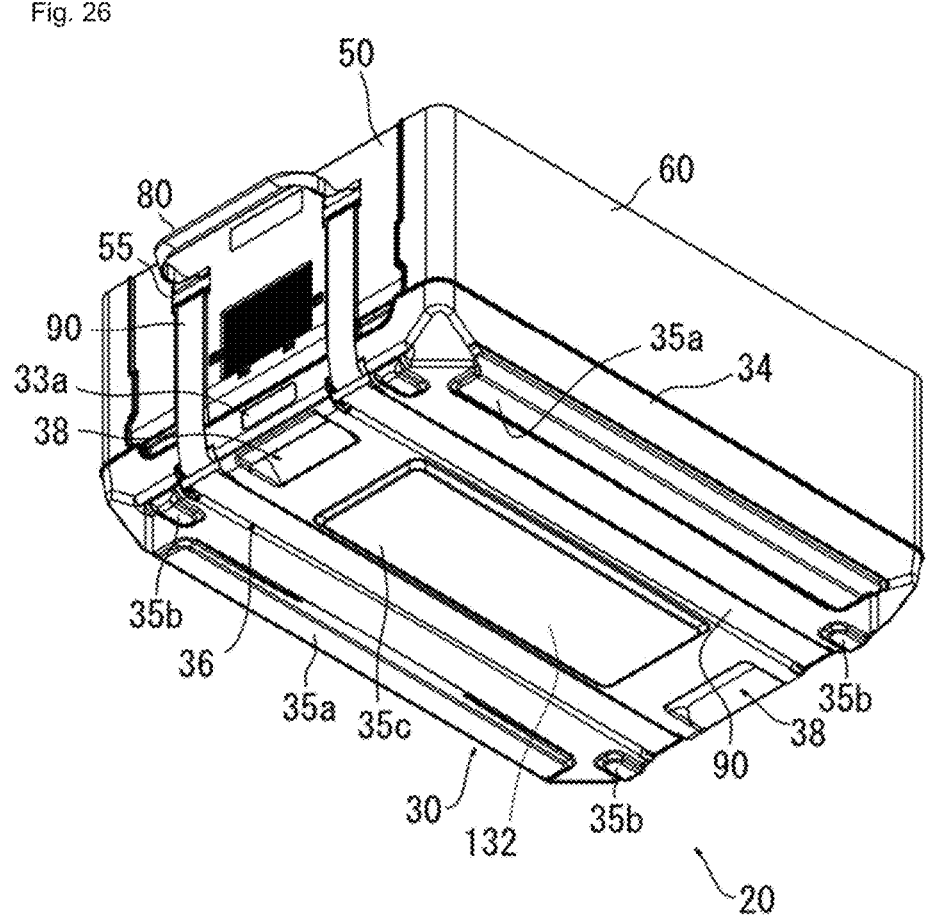
FIG. 26 is an external perspective view of the container body 20 of the folding container 1a of FIG. 24 when viewed from a lower surface side.

A folding container 1a of the present embodiment comprises a rectangular parallelepiped container body 20 including a bottom wall 13 and a side wall 14, and a lid 10 for closing an accommodation space S (see FIG. 25) of the container body 20, as shown in FIG. 24 and FIG. 25. Further, the folding container 1a comprises a pair of left and right handles 80 arranged at opposing positions on side walls and two belts 90 respectively arranged on front and rear sides connecting the pair of handles 80, as shown in FIG. 25 and FIG. 26. In the following description, a direction perpendicular to the main surface of the side wall 14 (front and rear side plates 60) on which the handle 80 is provided is defined as a left-right direction, a direction perpendicular to the main surface of the side wall 14 (left and right-side plates 50) without the handle 80 is defined as a front-rear direction, a side of the accommodation space S is defined as inside (inner side), and the opposite side is defined as outside (outer side). Here, the folding container 1a of the present embodiment is a folding container in which each of the side walls 14 is connected to the bottom wall 13 such that the side wall 14 can be tilted and laid with respect to the bottom wall 13. Further, the folding container 1a of the present embodiment is configured as a cold insulation container (or a heat insulation container).

Figure 27A:
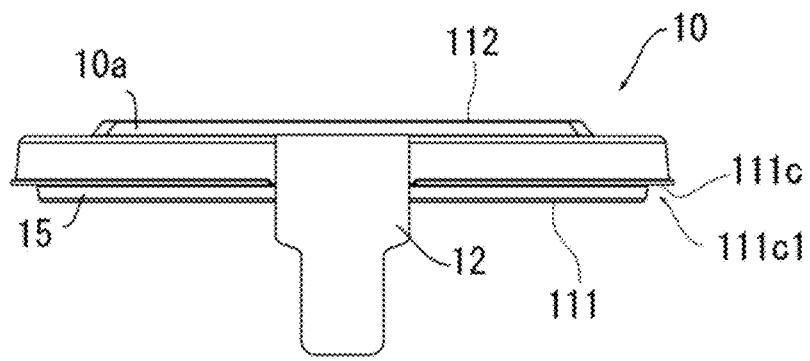
FIG. 27A is a front view of a lid 10 of the container viewed from a side of a shorter side.

The lid 10 is a member having a rectangular shape in plan view and having a predetermined thickness, as shown in FIG. 24 and FIG. 27A. An annular convex portion 10a having an annular rectangular shape and having a recessed central portion is formed on an upper surface of the lid 10, and a fastening member 12 for fastening the lid 10 and the container body 20 is provided at a central portion of each short side of the lid 10. Further, as shown in FIG. 27A, a lower convex portion 15 having a contour slightly smaller than the contour of the lid 10 is formed on a lower surface of the lid 10.

As shown in FIG. 25, the container body 20 comprises a bottom plate 30, which has a rectangular shape in plan view and is a part of the bottom wall 13, and a pair of the left and right side plates 50 and a pair of the front and rear side plates 60, which form the side wall 14. Here, the left and right side plates 50 have the same configuration, and the front and rear side plates 60 have the same configuration. In this regard, the width of the left and right side plates 50 in the front-rear direction is smaller than the width of the front and rear side plates 60 in the left-right direction in the present embodiment. Further, the left and right side plates 50 and the front and rear side plates 60 are connected to the bottom plate 30 so as to be freely raised or tilted and are configured to be foldable. In the present embodiment, the lid 10, the bottom plate 30, the left and right side plates 50, and the front and rear side plates 60 described above are each formed of a resin panel obtained by blow molding. The specific configuration of the resin panel will be described later.

Figure 28:
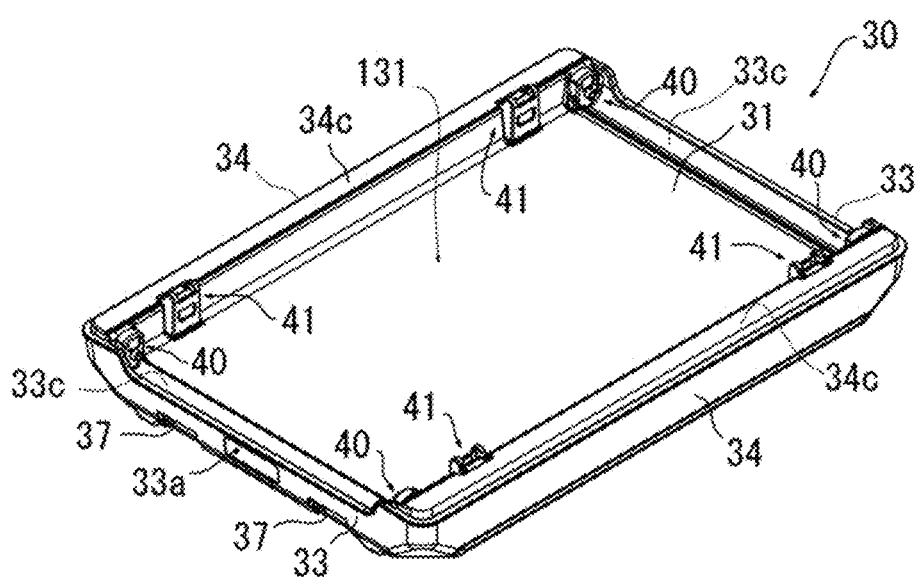
FIG. 28 is an external perspective view of a bottom plate 30 of the container body 20 of the folding container 1a in FIG. 24.

As shown in FIG. 28, the bottom plate 30 comprises a bottom wall portion 31 having a rectangular shape in plan view, and a pair of left- and right-side peripheral wall portions 33 and a pair of front- and rear-side peripheral wall portions 34 respectively facing each other and configured to be upright from the periphery of an upper surface of the bottom wall portion 31. A connecting member 40 for connecting the left and right side plates 50 so as to be freely raised or tilted is provided at both ends of each of the left- and right-side peripheral wall portions 33, and a connecting member 41 for connecting the front and rear side plates 60 so as to be freely raised or tilted is provided in the vicinity of both ends of each of the front- and rear-side peripheral wall portions 34. Rotation axes of the left and right side plates 50 and the front and rear side plates 60 are restricted by the connecting member 40 and the connecting member 41, and the left and right side plates 50 and the front and rear side plates 60 are configured to rotate around the rotation axis to be raised and tilted. The specific configuration of the connecting member 40 and the connecting member 41 may be any known configuration, and a detailed description thereof is omitted herein. Further, the height of the left- and right-side peripheral wall portions 33 is smaller than the height of the front- and rear-side peripheral wall portions 34. Such a configuration is adopted because, in folding the container body 20, the left and right side plates 50 are folded first, and then the front and rear side plates 60 are folded over the folded left and right side plates 50 (see FIG. 33 and FIG. 34). In this regard, a locking portion 33a for locking the fastening member 12 of the lid 10 when folding is formed in a central portion of an outer surface of the left- and right-side peripheral wall portions 33. As the configuration of the locking portion 33a, a simple configuration, such as a hook-and-loop fastener, a magnet, concave and convex locking, and concave and convex fitting, can be used.

As shown in FIG. 26, the bottom plate 30 comprises, on a lower surface thereof, a pair of front and rear convex portions 35a extending along a longitudinal direction in the vicinity of the front- and rear-side peripheral wall portions 34, four corner projections 35b formed in the vicinity of a connection portion between a long side and short side, and a central convex portion 35c formed in a central portion. The front and rear convex portions 35a, the corner projections 35b, and the central convex portion 35c contribute to fitting with the annular convex portion 10a formed on the upper surface of the lid 10 and having the concave central portion when the folding containers 1a are stacked, so that the folding containers 1a are stably stacked.

Figure 27B:
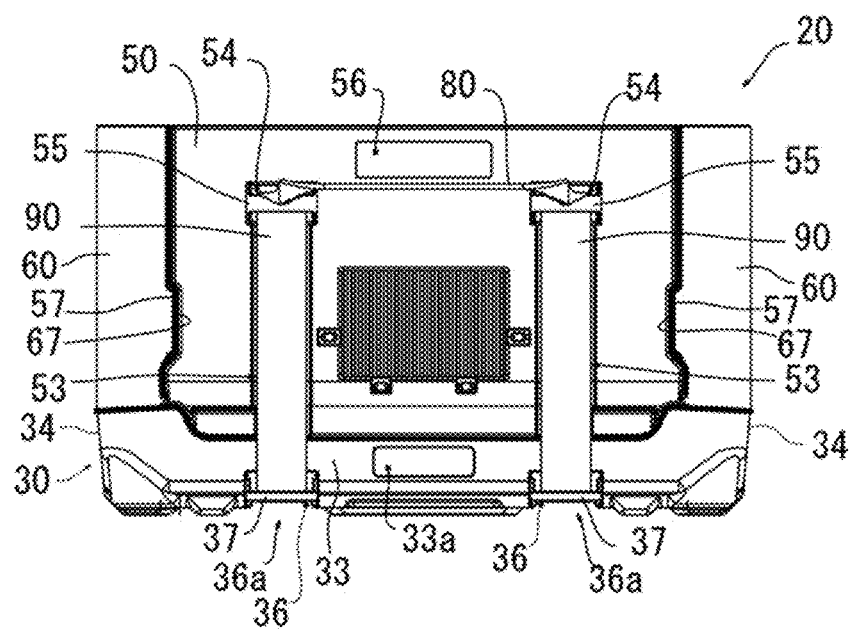
FIG. 27B is a front view of the container body 20 viewed from a side of left and right side plates 50.

In addition, two grooves 36 extending to both ends along a longitudinal direction are formed on the lower surface of the bottom plate 30, as shown in FIG. 26 and FIG. 27B, and the groove 36 is configured to accommodate the belt 90 described later. Further, both ends of the groove 36 are provided with a notch 36a inclined toward the left- and right-side peripheral wall portions 33, and a rod-shaped holding portion 37 is arranged across the notch 36a in order to guide and hold the belt 90. In addition, in a central portion of the vicinity of a boundary between the lower surface of the bottom plate 30 and the left- and right-side peripheral wall portions 33, a concave portion 38 is formed so that a fingertip can be inserted when the folding container 1a is carried in a folded state.

As shown in FIG. 25 to FIG. 27B, the left and right side plates 50 are members having a substantially rectangular shape in plan view and are configured to be folded inward of the folding container 1a by the connecting member 40. The width of the left and right side plates 50 in front view is shorter than the width of the left- and right-side peripheral wall portions 33 of the bottom plate 30 by twice the thickness of the front and rear side plates 60. This is to avoid interference between the side plates in folding due to the thickness of the left and right side plates 50 and the front and rear side plates 60. Further, as shown in FIG. 25 and FIG. 27B, a concave portion 57 is formed at both ends of the left and right side plates 50 so as to engage with a convex portion 67 of an overhanging portion 63 of the front and rear side plates 60, which will be described later. The concave portion 57 prevents the left and right side plates 50 from interfering with the connecting member 41 when the left and right side plates 50 are folded (see FIG. 25 and FIG. 33). In this regard, a lower surface 57a of the concave portion 57 has a curved shape corresponding to the rotation of folding.

As shown in FIG. 27B, two grooves 53 for accommodating the belt 90 are formed on an outer surface of the left and right side plates 50 and extend upward from a lower end so as to be continuous with the groove 36 and the notch 36a of the bottom plate 30. Further, a concave portion 54 deeper than the groove 53 (but not penetrating the container) is formed at an upper end of the groove 53 and at a substantially intermediate position between a central portion and the upper end in a height direction, and a rod-shaped holding portion 55 is arranged across the concave portion 54 in order to guide hold the belt 90. In addition, a locking portion 56 for locking the fastening member 12 of the lid 10 is formed in a central portion near an upper end of the outer surface of the left and right side plates 50. As the configuration of the locking portion 56, a simple configuration, such as a hook-and-loop fastener, a magnet, concave and convex locking, and concave and convex fitting, can be used.

The front and rear side plates 60 are members having a substantially rectangular shape in plan view and are configured to be folded inward of the folding container 1a by the connecting member 41. The width of the front and rear side plates 60 in the left-right direction is equal to the length of the front- and rear-side peripheral wall portions 34 of the bottom plate 30. Further, as shown in FIG. 25, FIG. 29, FIG. 31A, and FIG. 31C, the overhanging portion 63 slightly overhanging along the left- and right-side peripheral wall portions 33 of the bottom plate 30 is formed at both side ends of the front and rear side plates 60, and the convex portion 67 is formed on a part of an end surface of the overhanging portion 63. When the left and right side plates 50 and the front and rear side plates 60 are upright, the end surface of the overhanging portion 63 is engaged with an end surface of the left and right side plates 50, and the convex portion 67 of the overhanging portion 63 is engaged with the concave portion 57 of the left and right side plates 50. Further, although a detailed description thereof is omitted herein, the container body 20 is provided, near positions where the concave portion 57 and the convex portion 67 are formed (see FIG. 25), with a locking mechanisms 59 for fixing, at the corners of the container body 20, the left and right side plates 50 and the front and rear side plates 60 in the upright state.

The belt 90 is a belt-shaped member made of a material (cloth, rubber, string, or the like) having a strength capable of supporting the folding container 1a including the contents thereof. As shown in FIG. 25 and FIG. 26, the belt 90 is provided from the outer surface of one of the left and right side plates 50 to the outer surface of the other of the left and right side plates 50 through the lower surface of the bottom plate 30. In the present embodiment, two belts 90 are arranged side by side in the front-rear direction and are accommodated in the grooves 53 and the groove 36 on the lower surface of the bottom plate 30 and the outer surface of the left and right side plates 50. As shown in FIG. 26 and FIG. 27B, one end and the other end of the two belts 90 are each passed through the holding portion 37 on the lower surface of the bottom plate 30, are then pulled out from the holding portion 55 provided on the left and right side plates 50, and are connected to an end of the handle 80. In this regard, the belt 90 has an appropriate length to be pulled out by a predetermined length from the holding portion 55 and connected with the handle 80 while the left and right side plates 50 are in the upright state. In the present embodiment, the predetermined length of the belt 90 pulled out from the holding portion 55 is equal to or more than half the thickness of the left and right side plates 50. The predetermined length is appropriately set in consideration of the thickness of the left and right side plates 50 and the configuration of the connecting member 40 (position of the rotation axis, and the like).

The handle 80 is for carrying the folding container 1a in the assembled state and is arranged on an outer side of the left and right side plates 50, as shown in FIG. 24 and the like. In the present embodiment, the handle 80 is formed by bending a material having the same width as the belt 90 in half along a longitudinal direction and has both ends (front and rear ends) connected to the two belts 90. In other words, the two belts 90 pulled out from the holding portion 55 are connected by the handle 80, thereby preventing the belts 90 from being pulled out from the holding portion 55. In this regard, the configuration of the handle 80 made of the cloth material is not limited to the two-folded configuration described above, and a folding method, such as folding in three, may be adopted. Further, a cover may be attached to the handle 80, and the handle 80 may be made of a material different from the belt 90.

The lid 10, the bottom plate 30, the left and right side plates 50, and the front and rear side plates 60 of the present embodiment are each formed of a resin panel molded by blow molding. Although the structure of the front and rear side plates 60 will be described below as a representative, the structures of the other members, that is, the lid 10, the bottom plate 30, and the left and right side plates 50 are basically similar to the structure of the front and rear side plates 60.

Figure 29:
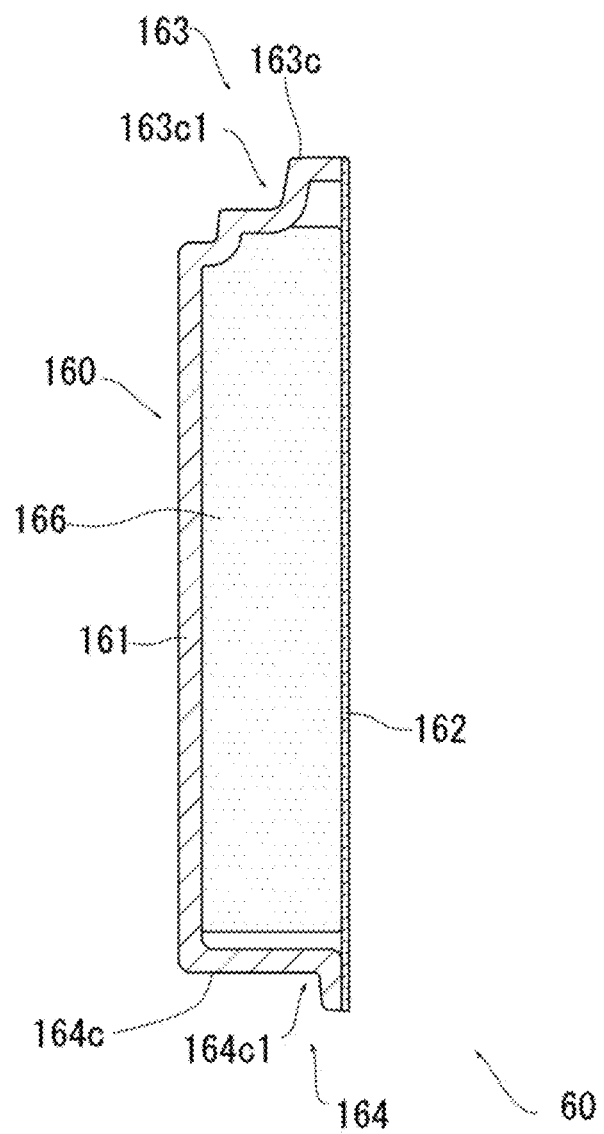
FIG. 29 is an end view when a resin panel forming the left and right side plates 50 of the present embodiment is cut along a plane perpendicular to a left-right direction.
Figure 31A:
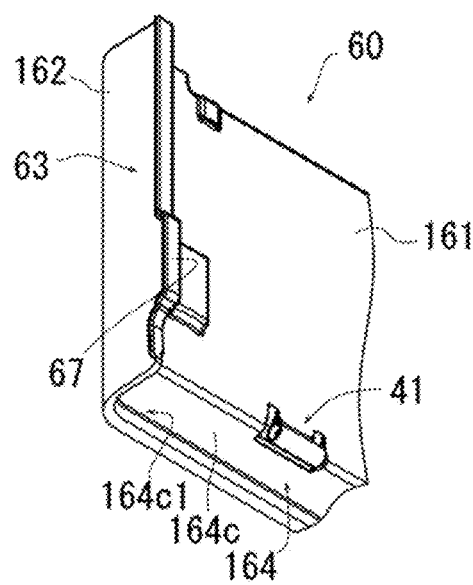
FIG. 31A is a perspective view of left and right ends of the front and rear side plates 60 when viewed from the inside and below.
Figure 31B:
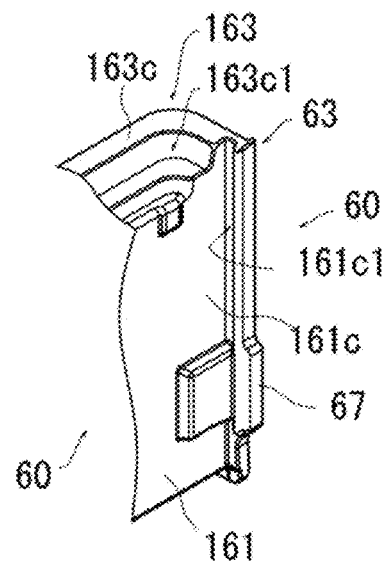
FIG. 31B is a perspective view of the left and right ends of the front and rear side plates 60 when viewed from the outside and above.

As shown in FIG. 29, FIG. 31A, and FIG. 31B, the front and rear side plates 60 comprise, in a cross-sectional view, an inner wall 161 forming an inner surface of the folding container 1a, an outer wall 162 forming an outer surface of the folding container 1a, a lid-side contact wall 163 abutting against the lid 10, and a bottom contact wall 164 abutting against the front- and rear-side peripheral wall portions 34 of the bottom plate 30. A heat insulating material 166 is preferably provided inside a hollow portion formed by these components. Here, an outer surface of the heat insulating material 166 does not need to be entirely welded to the inner wall 161, the outer wall 162, the lid-side contact wall 163, and the bottom contact wall 164, and there may be a gap therebetween. As the heat insulating material 166, a material formed of any types of material, such as foam, glass wool, silica aerogel, and vacuum heat insulating material, can be used, and various materials may be used in combination. As to the foam, a thermoplastic resin, such as polyolefin resin, polystyrene, polycarbonate, ABS resin and the like, a mixture thereof, and a thermosetting resin, such as phenol resin, melamine resin, epoxy resin, polyurethane and the like, can be used. The expansion ratio or the thickness of the foam can be determined from the viewpoint of heat insulation performance and soundproofing or sound absorption performance required for the intended application, and for example, the expansion ratio of about 5 to 50 times, and the thickness of about 10 to 100 mm are preferable.

The overhanging portion 63 is formed at each of left and right ends of the front and rear side plates 60 in the present embodiment. In this regard, an outer surface of the overhanging portion 63 is included in the outer wall 162, and an end surface and an inner surface of the overhanging portion 63 is included in the inner wall 161 in this description. On the other hand, the "main surface of the inner wall" described later indicates an inner surface of a portion excluding the end surface and the inner surface of the overhanging portion 63. Further, a step 163c1 is formed on a contact surface 163c of the lid-side contact wall 163, a step 164c1 is formed on a contact surface 164c of the bottom contact wall 164, and a step 161c1 is formed on a contact surface 161c abutting against the left and right side plates 50 of the inner wall 161 (see FIG. 31A and FIG. 31B).

Hereinafter, the inner wall 161, the lid-side contact wall 163, and the bottom contact wall 164 are collectively referred to as an "inside wall 160". In the present embodiment, the expansion ratio of the inside wall 160 is higher than the expansion ratio of the outer wall 162. Consequently, the thermal conductivity of the inside wall 160 is lower than the thermal conductivity of the outer wall 162. The inside wall 160 is a foam molded body, and the expansion ratio thereof is, for example, 1.1 to 6 times, specifically, for example, 1.1, 1.5, 2, 2.5, 3, 3.5, 4, 4.5, 5, 5.5, 6, and may be within a range between any two of the values exemplified herein. The expansion ratio of the outer wall 162 is, for example, 1 to 4 times, specifically, for example, 1, 1.5, 2, 2.5, 3, 3.5, 4, and may be within a range between any two of the values exemplified herein. The outer wall 162 preferably has an expansion ratio of 1, that is, a non-foamed molded body. The difference between the expansion ratio of the inside wall 160 and the expansion ratio of the outer wall 162 is preferably 0.5 to 5 times, specifically, for example, 0.5, 1, 1.5, 2, 2.5, 3, 3.5, 4, 4.5, 5, and may be within a range between any two of the values exemplified herein. Further, although the thickness of the inside wall 160 and the outer wall 162 is not particularly limited, the ratio of the thickness of the inside wall 160 to the thickness of the outer wall 162 is preferably 1 to 5, more preferably 1.2 to 3, specifically, for example, 1, 1.2, 1.5, 2, 2.5, 3, 3.5, 4, 4.5, 5, and may be within a range between any two of the values exemplified herein.

Figure 30:
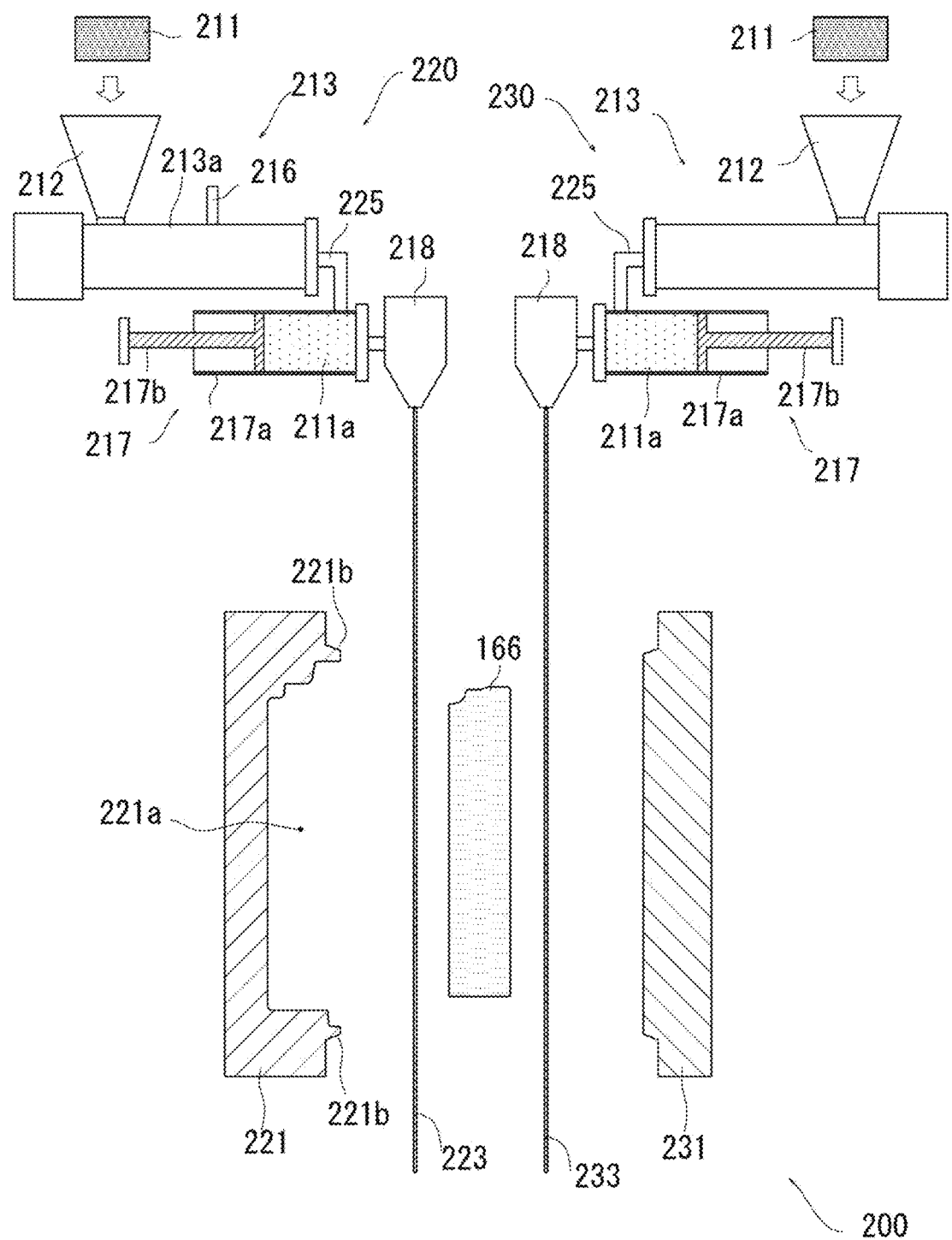
FIG. 30 is a configuration diagram of a foam molding machine 200 for manufacturing a resin panel forming front and rear side plates 60 (molds 221, 231 and members in the vicinity thereof are in cross-sectional view along the vertical direction).

The front and rear side plates 60 configured as described above are molded by a foam molding machine 200 shown in FIG. 30. The foam molding machine 200 comprises a pair of resin-sheet forming devices 220, 230 and a pair of split molds 221, 231. The resin-sheet forming devices 220, 230 comprise the hopper 212, an extruder 213, the injector 216, an accumulator 217, and a T-die 218. The extruder 213 and the accumulator 217 are connected via a connecting tube 225. The accumulator 217 and the T-die 218 are connected via a connecting tube 227. Hereinafter, each configuration will be described.

The hopper 212 is used for charging the raw resin 211 into the cylinder 213a of the extruder 213. The form of the raw resin 211 is not particularly limited but is typically in a pellet form. The raw material resin is, for example, a thermoplastic resin, such as polyolefin. Examples of the polyolefin include low-density polyethylene, linear low-density polyethylene, high-density polyethylene, polypropylene, ethylene-propylene copolymer, and a mixture thereof. The raw resin 211 is charged into the cylinder 213a from the hopper 212 and then heated and melted in the cylinder 213a to become molten resin. Further, the molten resin is conveyed toward a distal end of the cylinder 213a by rotation of a screw arranged in the cylinder 213a. The screw is arranged in the cylinder 213a and kneads and conveys the molten resin by the rotation thereof.

A cylinder 213a is provided with an injector 216 for injecting a foaming agent into the cylinder 213a. If raw resin 211 is not foamed, the foaming agent is not injected. The foaming agent injected from the injector 216 is, for example, a physical foaming agent, a chemical foaming agent, and a mixture thereof, and is preferably a physical foaming agent. As the physical foaming agent, an inorganic physical foaming agent, such as air, carbon dioxide gas, nitrogen gas, water and the like, an organic physical foaming agent, such as butane, pentane, hexane, dichloromethane, and dichloroethane and the like, and a supercritical fluid thereof can be used. As the supercritical fluid, it is preferable to use carbon dioxide, nitrogen, or the like. The supercritical fluid can be obtained under the critical temperature of $-149.1°$ C. and the critical pressure of 3.4 MPa or more in the case of nitrogen, while under the critical temperature of $31°$ C. and the critical pressure of 7.4 MPa or more in the case of carbon dioxide. Examples of the chemical foaming agent include those which generate carbon dioxide gas by a chemical reaction between an acid (e.g., citric acid or a salt thereof) and a base (e.g., sodium bicarbonate). Instead of being injected from the injector 216, the chemical foaming agent may be supplied from the hopper 212.

The molten resin 211a to which the foaming agent is added or not added is extruded from a resin extrusion port of the cylinder 213a and injected into the accumulator 217 through the connecting tube 225. The accumulator 217 comprises a cylinder 217a and a piston 217b slidable therein and is configured to store the molten resin 211a in the cylinder 217a. The piston 217b is moved after storing a predetermined amount of the molten resin 211a in the cylinder 217a, so that the molten resin 211a is extruded from a slit provided in the T-die 218 through the connecting tube 227 and hangs down to form resin sheets 223, 233. The expansion ratio of the resin sheets 223, 233 is appropriately set so as to achieve the desired expansion ratio of the inside wall 160 and the outer wall 162.

The resin sheets 223, 233 are guided between a pair of split molds 221, 231. Further, the heat insulating material 166 is arranged between the resin sheets 223, 233. A mold 221 comprises a cavity 221a shaped to form the inside wall 160 of the front and rear side plates 60 and a pinch-off portion 221b. On the other hand, a mold 231 only forms the outer wall 162 and is shaped in a substantially planar shape. The front and rear side plates 60 shown in FIG. 29 is obtained by molding the resin sheets 223, 233 using the pair of split molds 221, 231. As a method of installing the heat insulating material 166, an aforementioned method of sandwiching the heat insulating material 166 may be adopted. Alternatively, a hollow body may be formed and then filled with the heat insulating material. When the heat insulating material 166 is a foam, the hollow body may be filled with foamable beads, and the beads may be then foamed.

Here, when the front and rear side plates 60 are formed by the split molds 221, 231 having the shape as described above, the lid-side contact wall 163 abutting against the lid 10 and the bottom contact wall 164 abutting against the front- and rear-side peripheral wall portions 34 of the bottom plate 30 are all formed of the resin sheet 223. Alternatively, a portion of the contact surface may be formed of the resin sheet 233 by changing a position of a parting line.

A molding method using the split molds 221, 231 is not particularly limited. Blow molding by blowing air in the cavity of the split molds 221, 231 may be adopted, vacuum molding by decompressing the inside of the cavity of the split molds 221, 231 to mold the resin sheets 223, 233 may be adopted, or a combination thereof may be adopted.

By means of the same method as the manufacturing method of the front and rear side plates 60 described above, the left and right side plates 50 are configured by integrally molding, with the resin sheet 223, an inner wall 151 (see FIG. 25) forming an inner surface, a lid-side contact wall 153 abutting against the lid 10, a bottom contact wall 154 abutting against the left- and right-side peripheral wall portions 33 of the bottom plate 30, and a front and rear contact walls 155 (see FIG. 31C) abutting against the front and rear side plates 60. Further, an outer wall 152 forming the outer surface is molded with the resin sheet 233. The bottom plate 30 is configured by integrally molding, with the resin sheet 233, an inner wall 131 forming an inner surface of the bottom wall portion 31 and the peripheral walls 33, 34, side plate contact walls 133, 134 (see FIG. 28 and FIG. 31D) forming contact surfaces 133c, 134c of the peripheral walls 33, 34 abutting against the side plates 50, 60. Further, an outer wall 132 (see FIG. 26) forming the outer surface (lower and side surfaces) is molded with the resin sheet 233. As to the lid 10, An inner wall 111 forming the lower surface is molded with the resin sheet 223, and an outer wall 112 forming the upper surface and the side surface is molded with the resin sheet 233, as shown in FIG. 27A and FIG. 27B. In this regard, the heat insulating material is also provided inside hollow portions of the lid 10, the bottom plate 30, and the left and right side plates 50.

Next, the operation of folding and assembling the folding container 1a configured composed of the resin panel (the lid 10, the bottom plate 30, the left and right side plates 50, and the front and rear side plates 60) molded as described above is described with reference to FIG. 33 to FIG. 36.

Figure 33:
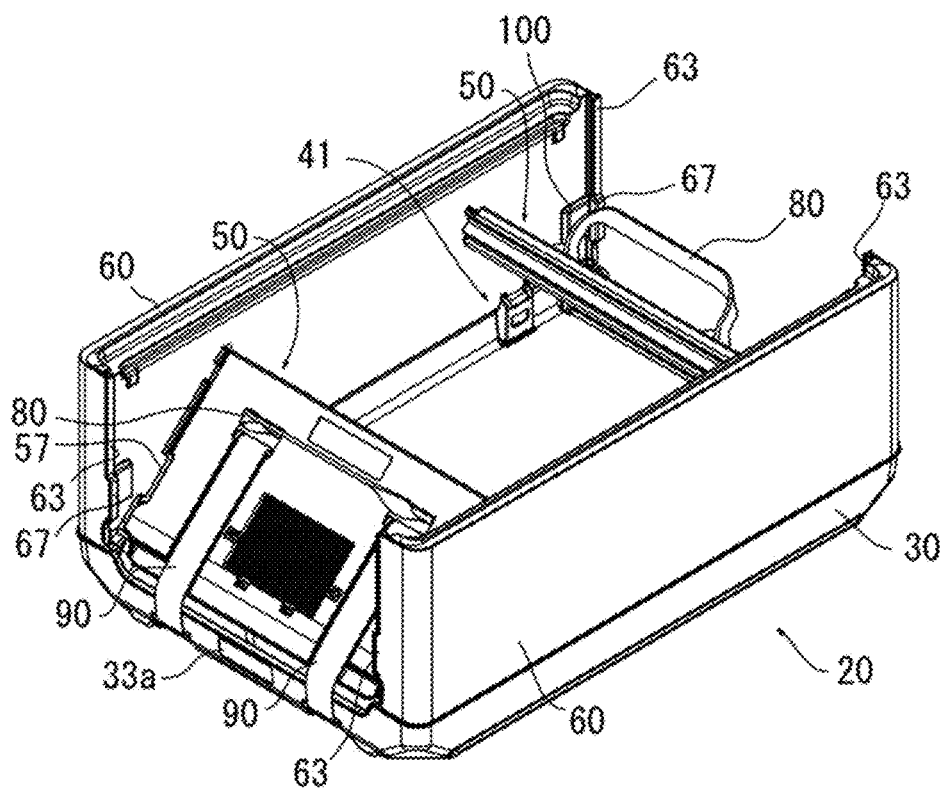
FIG. 33 is an external perspective view showing a state where the left and right side plates 50 of the container body 20 of the folding container 1a are tilted.

When folding the folding container 1a, the locking of the left and right side plates 50 and the front and rear side plates 60 by the locking mechanism 59 is released, as shown in FIG. 33, while the lid 10 is removed. The left and right side plates 50 are then rotated with respect to the bottom plate 30 (the connecting member 40) to be tilted and laid. Since the belt 90 of the present embodiment is connected to the handle 80 with an allowance from the holding portion 55, the belt 90 can be pulled back with the rotation of the left and right side plates 50, so that the left and right side plates 50 are completely tilted and laid.

Figure 34:
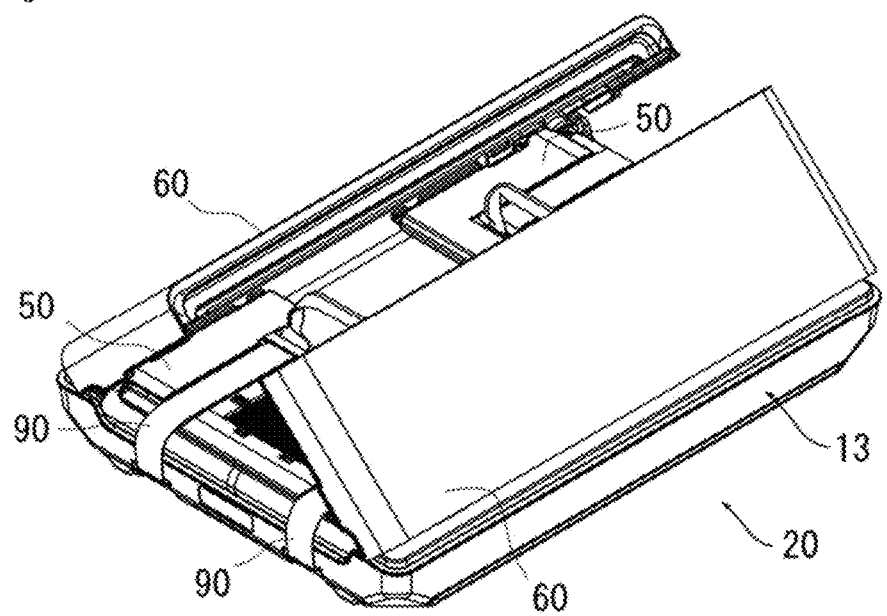
FIG. 34 is an external perspective view showing a state where the front and rear side plates 60 are being tilted after tilting and laying the left and right side plates 50 of the container body 20 of the folding container 1a in FIG. 24.
Figure 35:
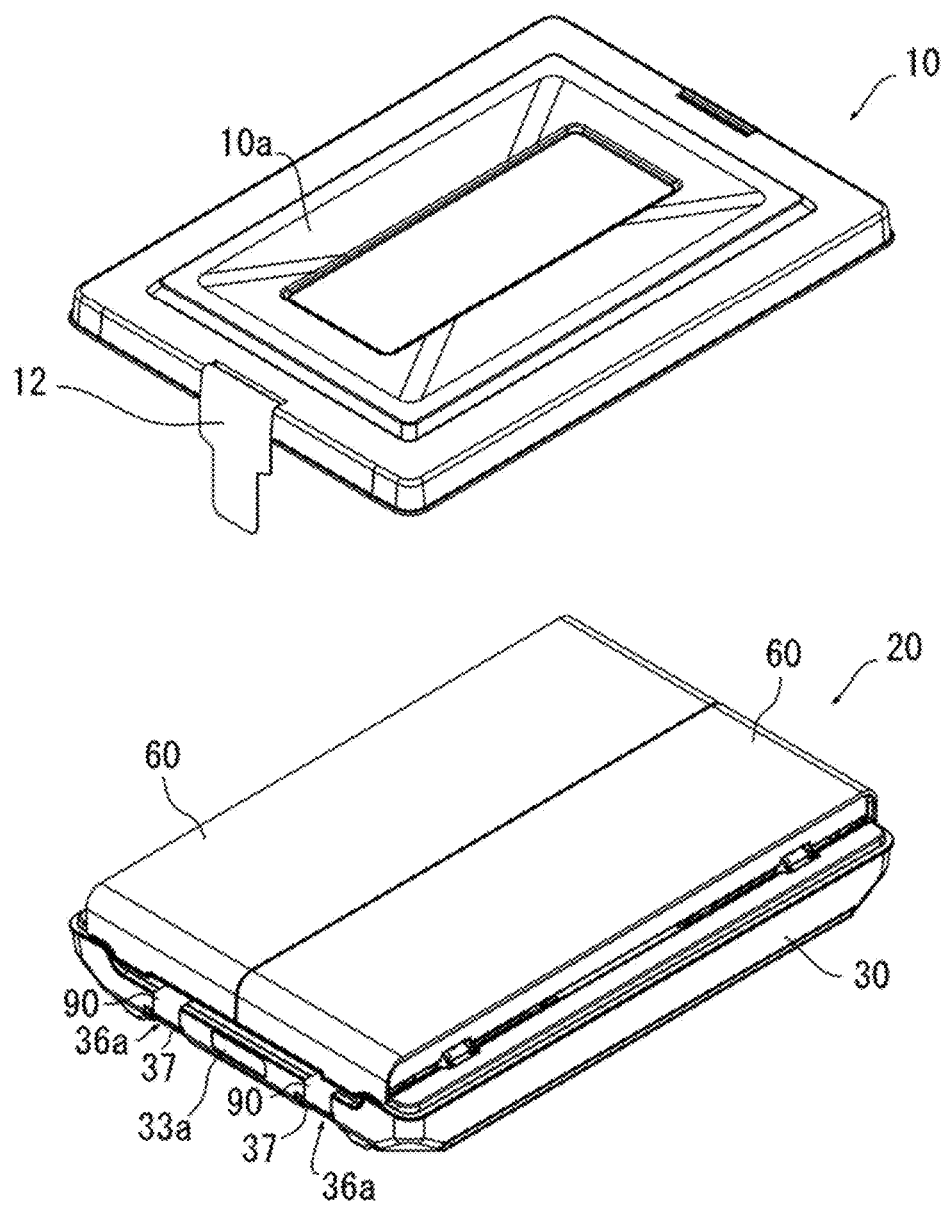
FIG. 35 is an external perspective view showing a state where the left and right side plates 50 and the front and rear side plates 60 of the container body 20 of the folding container 1a in FIG. 24 are both laid.
Figure 36:
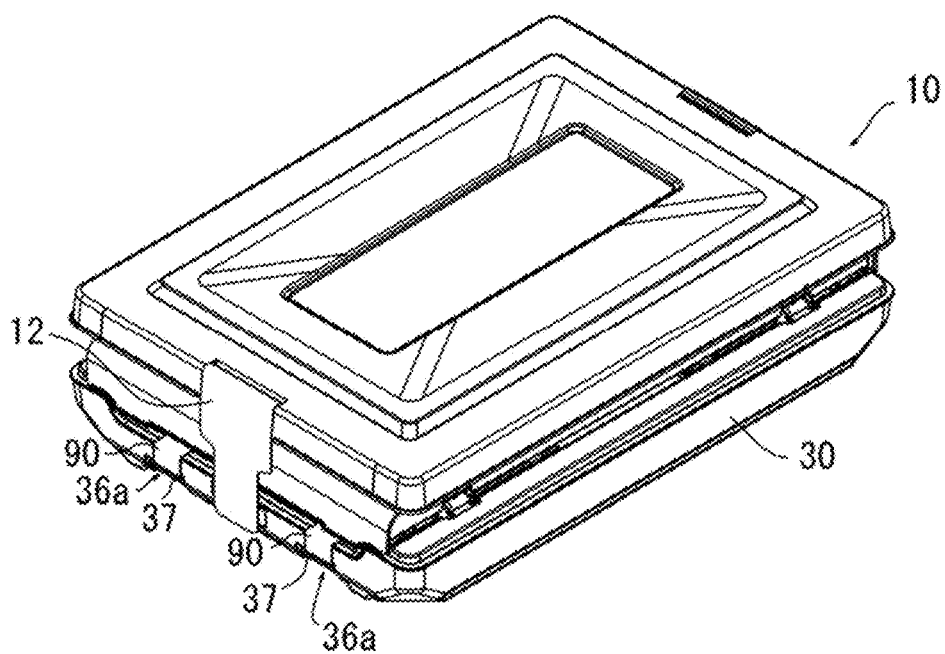
FIG. 36 is an external perspective view showing the folding container 1a of FIG. 24 in a folded state.

After the left and right side plates 50 are completely tilted and laid, the front and rear side plates 60 are then rotated with respect to the bottom plate 30 (the connecting member 41) to be tilted and laid (see FIG. 34). At this time, since the height of the front- and rear-side peripheral wall portions 34 is larger than the height of the left- and right-side peripheral wall portions 33, the front and rear side plates 60 can be folded on the left and right side plates 50 already folded. When the front and rear side plates 60 are completely tilted and laid, the left and right side plates 50 and the handle 80 are covered with the front and rear side plates 60, as shown in FIG. 35. Finally, the lid 10 is placed on the folded front and rear side plates 60, the fastening member 12 is locked to the locking portion 33a of the left- and right-side peripheral wall portions 33, and the folding operation is completed (see FIG. 36).

When assembling the folding container 1a, the reverse procedure is performed. The lid 10 is removed, the front and rear side plates 60 are raised, the left and right side plates 50 are raised, and the left and right side plates 50 and the front and rear side plates 60 are fixed by the locking mechanism 59 to complete the folding container 1a (see FIG. 25 and FIG. 32).

Figure 40:
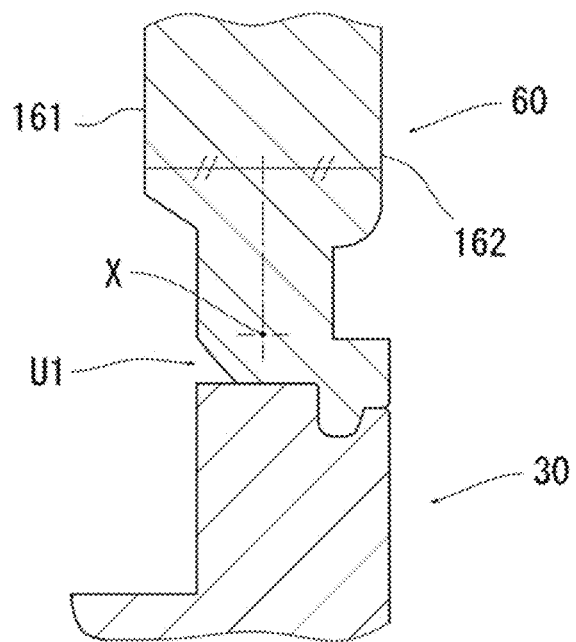

Patent Literature 4 discloses a container in which a step is formed on an upper surface of the bottom plate 30 and is configured to engage with a lower protrusion formed on a lower end surface of the side plate 60 in order to enhance the sealability, as shown in FIG. 40. In this container, a rotation axis X of the side plate 60 is arranged between the inner wall 161 and the outer wall 162, more specifically at the center between the inner wall 161 and the outer wall 162. Consequently, when folding the side plate 60, an inner surface of a lower end of the inner wall 161 of the side plate 60 may interfere with an upper end of an inner surface of the peripheral wall 34 of the bottom plate 30. For this reason, a non-contact portion U1, which is a gap formed by cutting out a corner inside the container, is formed on a contact surface of the side plate 60 and/or the bottom plate 30 (only on the side plate 60 in FIG. 40) in order to prevent such interference when folding the side plate 60.

However, if such a non-contact portion U1 is provided, the area where the side plate 60 and the bottom plate 30 abut against each other is reduced, resulting in insufficient sealability. Consequently, air leakage may occur, and heat retention performance may be reduced.

Figure 41:
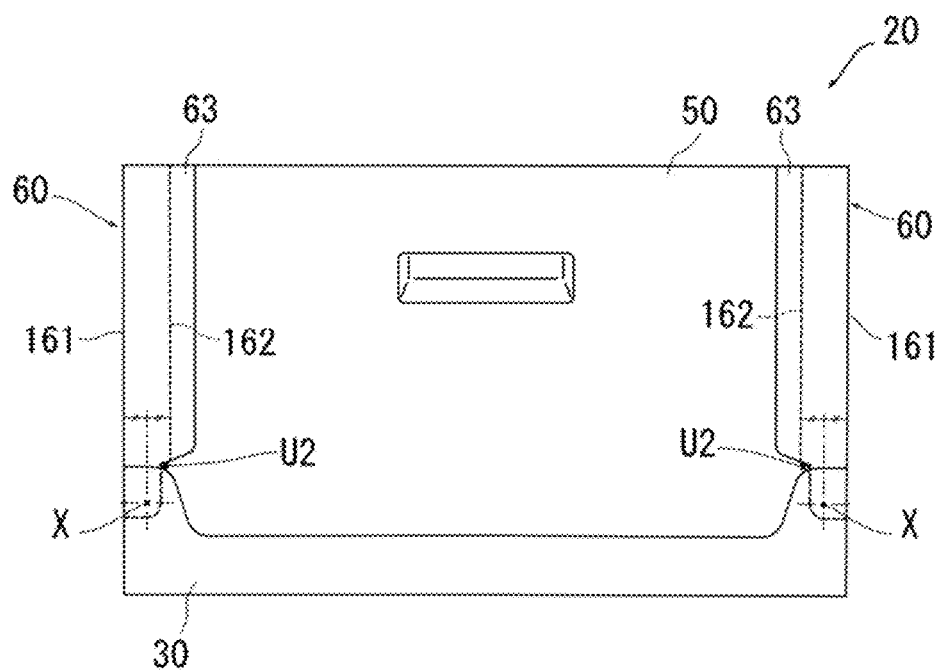
FIG. 41 is a schematic view showing the container body 20 of a conventional folding container 1a when viewed from the front.

Further, when the rotation axis X of the side plate 60 is arranged between the inner wall 161 and the outer wall 162, more specifically, at the center between the inner wall 161 and the outer wall 162, as shown in FIG. 40, a non-contact portion U2 needs to be further provided, as shown in FIG. 41, on the inner side of the container at a lower end of the overhanging portion 63 in order to prevent interference with the front- and rear-side peripheral wall portions 34. In addition, since the overhanging portion 63 is located closer to the inner surface side of the container with respect to the rotation axis X, the non-contact portion U2 needs to be cut out more deeply than the non-contact portion U1.

Figure 32:
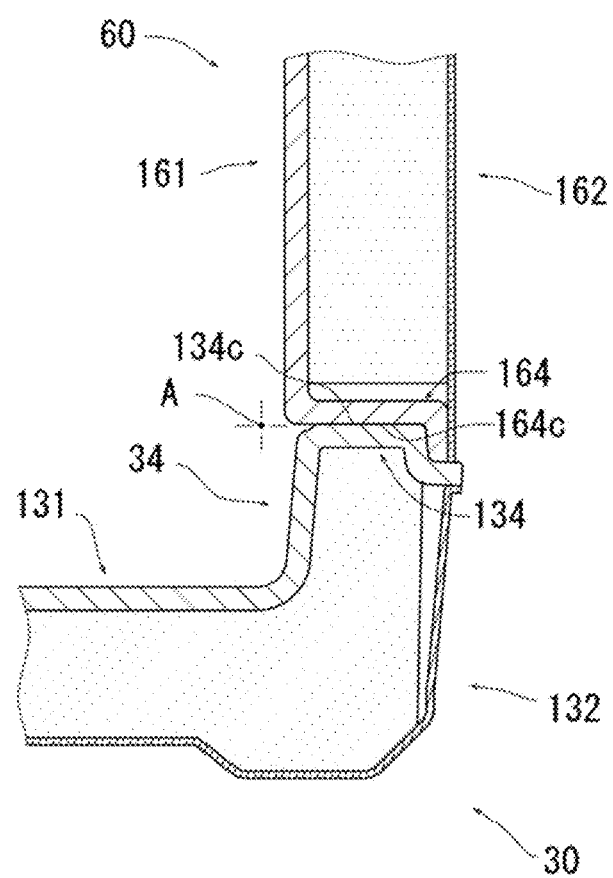
FIG. 32 is an end view of a state where the front and rear side plates 60 are raised with respect to the bottom plate 30.

On the other hand, in the present invention, the rotation axis of the front and rear side plates 60 rotatably attached to the front- and rear-side peripheral wall portions 34 of the bottom plate 30 by the connecting member 41 (see FIG. 25), as shown in FIG. 25 and FIG. 32 (schematically illustrated with a reference sign A), is arranged on an inner side than the center between the inner wall 161 and the outer wall 162 inside the container 1, specifically in the configuration of the present embodiment, on an inner side than the main surface of the inner wall 161 (the inner surface of the container in a cross-sectional view of FIG. 32) inside the container 1. With such a configuration, it is not necessary to provide a gap (the non-contact portion U1, see FIG. 40) at an inner corner of each member in order to avoid the interference between the front and rear side plates 60 and the front- and rear-side peripheral wall portions 34 of the bottom plate 30. Consequently, the front and rear side plates 60 can abut against the bottom plate 30 over the entire thickness thereof, thereby improving the sealability.

Further, since a rotation axis A is arranged on an inner side than the inner wall 161 inside the container 1, it is not necessary to provide the non-contact portion U2 (see FIG. 41) on the inner surface side of the container at the lower end of the overhanging portion 63, as shown in FIG. 27A and FIG. 27B. Consequently, the lower end of the overhanging portion 63 can abut against the bottom plate 30 along the front-rear direction.

Further, when the front and rear side plates 60 is upright, the contact surface 164c of the bottom contact wall 164 of the front and rear side plates 60 abuts against a contact surface 134c of a side-plate contact wall 134 of the front- and rear-side peripheral wall portions 34 of the bottom plate 30, as shown in FIG. 32. Here, the step 164c1 is formed on the contact surface 164c of the front and rear side plates 60, as shown in FIG. 31A and FIG. 32, and is engaged with a step 134c1 (see FIG. 31D and FIG. 32) formed on the contact surface 134c of the side-plate contact wall 134 of the bottom plate 30. Consequently, the bottom contact wall 164 and the side-plate contact wall 134 are in close contact with each other, and air flow between the contact surfaces 164c, 134c (that is, air flow between the front and rear side plates 60 and the bottom plate 30) can be suppressed. Further, in the present embodiment, the bottom contact wall 164 forming the contact surface 164c and the side-plate contact wall 134 forming the contact surface 134c are both foam molded bodies, and thus the contact surfaces can be slightly compressed, serving as a cushion. Consequently, the air flow can be further suppressed as compared with the case where the contact surfaces 164c, 134c are formed of non-foamed resin. In this regard, when the contact walls 134, 164 are made of a non-foamed material, the temperature of the inner surface is easily increased due to the heat transmission from the outside air to the resin (heat bridge). Since the contact walls 134, 164 are formed as foam molded bodies in the present invention, heat is less likely to be transmitted.

Similarly, a step 155c1 (see FIG. 31C) is formed on a contact surface 155c of the front and rear contact walls 155 of the left and right side plates 50, and the step 161c1 (see FIG. 31B) is formed on the contact surface 161c of the inner wall 161 of the front and rear side plates 60. Further, the bottom contact wall 164 forming the contact surface 164c and the side-plate contact wall 134 forming the contact surface 134c are both foam molded bodies. Therefore, it is possible to effectively suppress the air flow between the left and right side plates 50 and the front and rear side plates 60.

In addition, the step 163c1 (see FIG. 31B) is formed on the contact surface 163c of the lid-side contact wall 163 of the left and right side plates 50, a step 153c1 (see FIG. 31C) is formed on a contact surface 153c of the lid-side contact wall 153 of the front and rear side plates 60, and the step 153c1 (see FIG. 27A) is formed on a contact surface 111c of the inner wall 111 of the lid 10. Further, the lid-side contact wall 163 forming the contact surface 163c and the lid-side contact wall 153 forming the contact surface 153c, and the inner wall 111 forming the contact surface 111c are foam molded bodies. Consequently, it is possible to effectively suppress the air flow between the left and right side plates 50 and the front and rear side plates 60 and the lid 10.

Figure 31C:
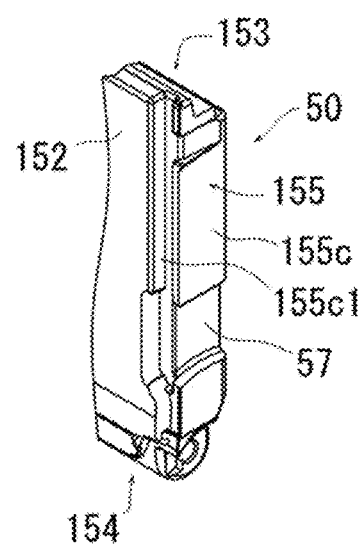
FIG. 31C is a perspective view of front and rear ends of the left and right side plates 50 when viewed from the outside and above.
Figure 31D:
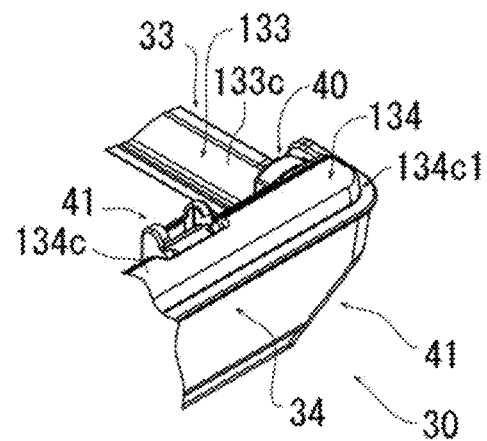
FIG. 31D is a perspective view of corners of the bottom plate 30 when viewed from the outside and above.
Figure 37:
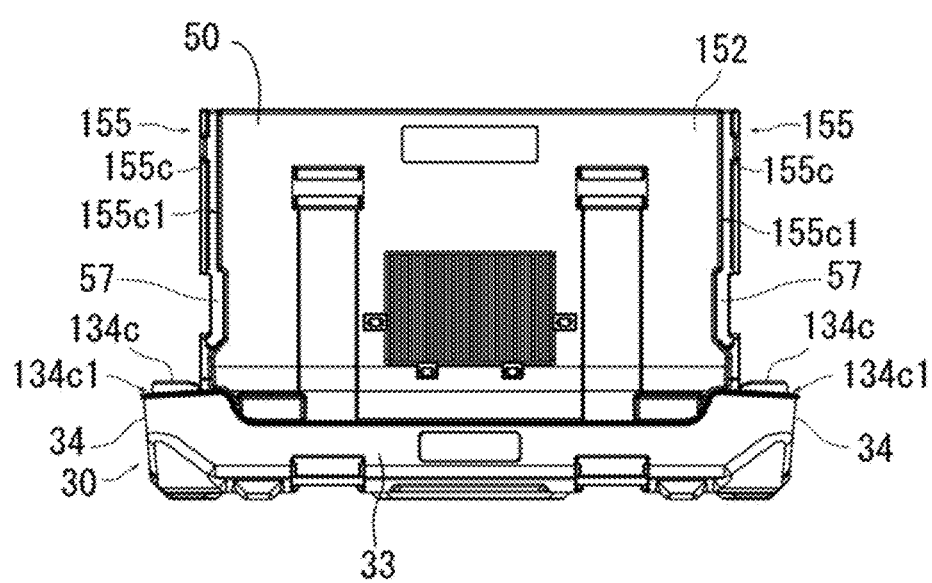
FIG. 37 is a front view showing a state where the front and rear side plates 60 are removed from the front view of FIG. 27B.

Further, since it is not necessary to provide the non-contact portion U2 (see FIG. 41) between the front and rear side plates 60 and the front- and rear-side peripheral wall portions 34 in the present embodiment, the step 155c1 (see FIG. 31C and FIG. 37) of the contact surface 155c of the front and rear contact walls 155 of the left and right side plates 50 and the step 161c1 (FIG. 31B) of the contact surface 161c of the front and rear side plates 60 can be formed along a longitudinal direction (the vertical direction) up to an end (especially, up to a lower end). Consequently, at a point where the left and right side plates 50 and the front and rear side plates 60 are in contact with each other and with the bottom wall 13, that is, at a point where the bottom plate 30, the left and right side plates 50, and the front and rear side plates 60 are in contact, the left and right side plates 50 and the front and rear side plates 60 overlap along a direction from the inside to the outside of the container, so that contact area can be increased to enhance the sealability. In the present embodiment, the rotation axis of the left and right side plates 50 is provided, as shown in FIG. 28 and FIG. 31C, between the inner wall 161 and the outer wall 162 of the left and right side plates 50.

In the present embodiment, the outer wall 132 of the bottom plate 30, the outer wall 152 of the left and right side plates 50, the outer wall 162 of the front and rear side plates 60, and the outer wall 112 of the lid 10, which form the outer surface of the folding container 1a, each have a low expansion ratio. Therefore, it is possible to improve the appearance and cleanability of the container 1. Further, since the expansion ratio of the outer wall 112 is low, structures, such as the holding portion 37, the holding portion 55 supporting the belt 90 and the like, can be attached to the outer wall by welding or the like.

On the other hand, since the inner wall 131 of the bottom plate 30, the inner wall 151 of the left and right side plates 50, the inner wall 161 of the front and rear side plates 60, and the inner wall 111 of the lid 10, which form the outer surface of the folding container 1a, are foam molded bodies, the heat insulation can be enhanced.

The present embodiment can be implemented also in the following aspects.

Figure 38:
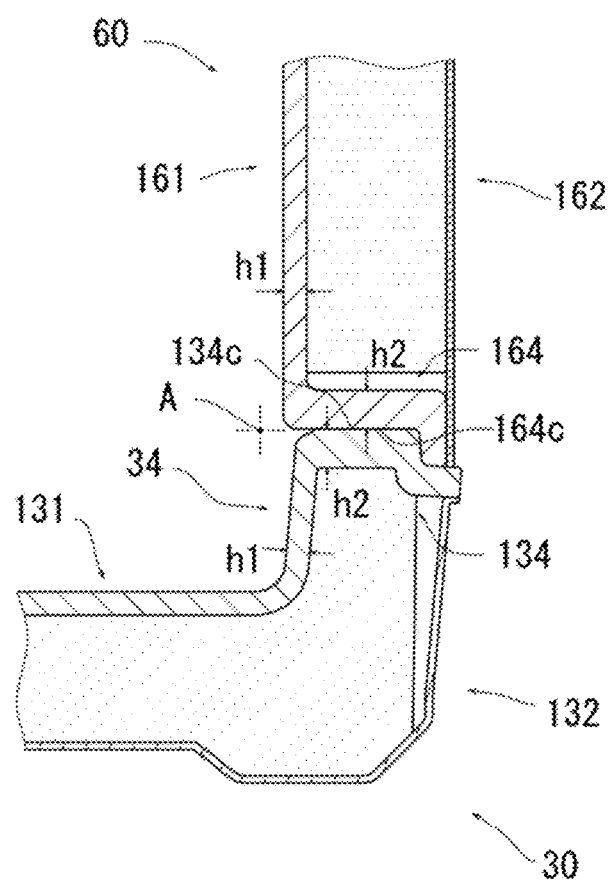
FIG. 38 is an end view of the bottom plate 30 and the front and rear side plates 60 according to a modified embodiment of the present invention, corresponding to FIG. 32.

In the embodiment described above, the inner wall 131 and the side-plate contact wall 134 of the bottom plate 30, and the inner wall 161 and the bottom contact wall 164 of the front and rear side plates 60 are each integrally molded with the same thickness, as shown in FIG. 32. Alternatively, it is also preferable, as shown in FIG. 38, to set the thickness h2 of engaging portions of the side-plate contact wall 134 of the bottom plate 30 and the bottom contact wall 164 of the front and rear side plates 60 larger than the thickness h1 of the inner wall 131 of the bottom plate 30 and the inner wall 161 of the front and rear side plates 60. In this case, since the portions having the larger thickness are formed as a foam molded body, the sealability can be further improved when these portions are compressed. Further, in the present modified embodiment, heat is less likely to be transmitted as a result of forming the contact walls 134, 164 as a foam molded body and increasing the thickness h2.

Figure 39A:
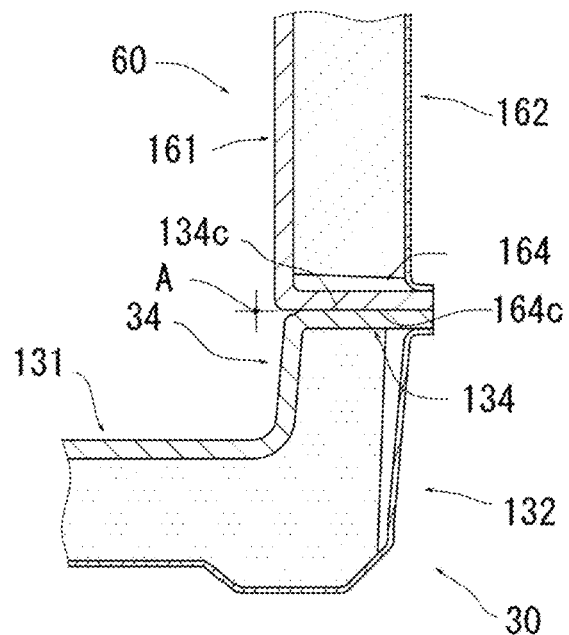
FIG. 39A and FIG. 39B are end views of the bottom plate 30 and the front and rear side plates 60 according to another modified embodiment of the present invention, corresponding to FIG. 32.
Figure 39B:
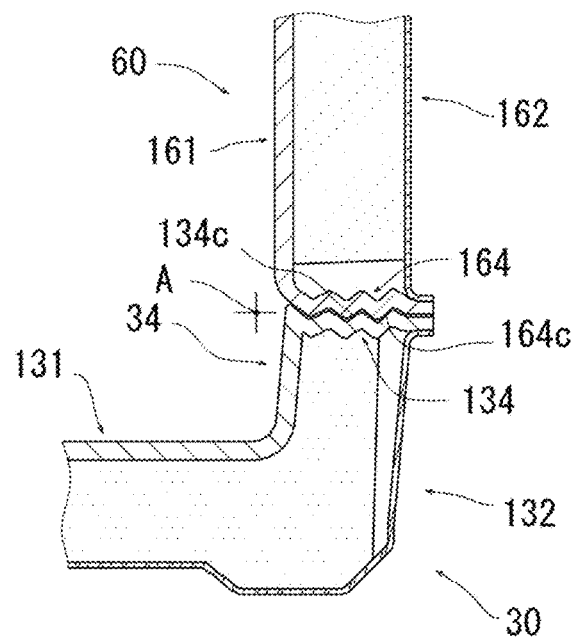

In the embodiment described above, the air flow is suppressed between the contact surface 164c of the bottom contact wall 164 of the front and rear side plates 60 and the contact surface 134c of the side-plate contact wall 134 of the bottom plate 30 by engaging the step 164c1 with the step 134c1 to provide the overlapping portion, as shown in FIG. 32. Alternatively, the contact surfaces can be formed flat, as shown in FIG. 39A. The air flow between the contact surfaces 164c, 134c can be suppressed also in such a case. Further, as shown in FIG. 39B, the contact surfaces 164c, 134c can be formed in a wave shape. Consequently, the contact area between contact surfaces 164c and 134c is increased, and the air flow can be further suppressed.

In the embodiment described above, the handle 80 is attached to the folding container 1a via the belt 90. Alternatively, the handle 80 may be directly welded to the outer wall 152 of the left and right side plates 50 and the like.

In the embodiment described above, the folding container 1a has a rectangular parallelepiped shape. The folding container 1a may have another shape, such as a cylindrical shape.

It is also possible to attach a component other than a handle to the outer walls 152, 162 of the left and right side plates 50 and the front and rear side plates 60.

In the embodiment described above, the entire region of the contact surface 164c of the bottom contact wall 164 of the front and rear side plates 60 is formed of a foam molded body. Alternatively, a part of the region of the contact surface 164c can be integrally molded with the outer wall 162, using a non-foamed molded body or a molded body having a low expansion ratio by changing the parting lines of the molds 221, 231 for molding. Here, in order to ensure the sealability, it is preferable to configure such that the expansion ratio of a portion corresponding to a region of 60% or more of the entire region of the contact surface 164c is higher than the expansion ratio of the outer wall 162. Further, it is preferable to configure such that the expansion ratio of a portion corresponding to a region of 80% or more is higher than the expansion ratio of the outer wall 162. In this regard, this applies not only to the contact surface 164c of the bottom contact wall 164 of the front and rear side plates 60, but also to all contact surfaces.

In the embodiment described above, the inner walls 111, 131, 151, 161 of the lid 10, the bottom plate 30, the left and right side plates 50, and the front and rear side plates 60 are formed of a foam molded body. Alternatively, all of the members may be made of a non-foamed molded body. Even in this case, the contact area between the members can be increased to improve the sealability by providing a step with each of the contact walls and by arranging the rotation axis of the side wall on an inner side than the inner wall inside the container.

Figure 42:
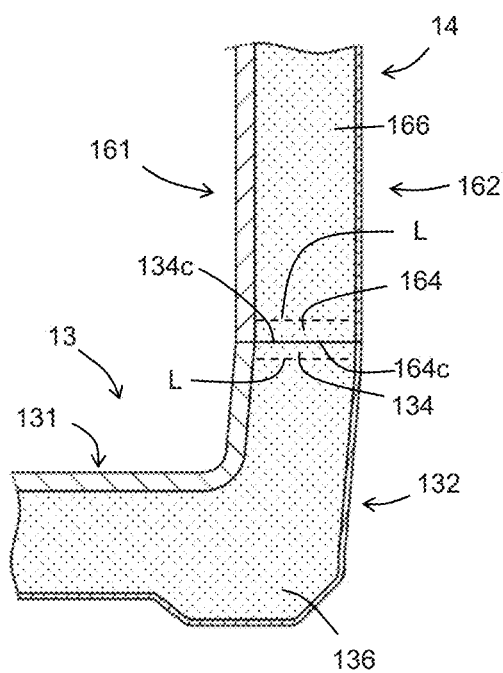
FIG. 42 is an end view of the bottom plate 30 and the front and rear side plates 60 according to another modified embodiment of the present invention, corresponding to FIG. 32.
Figure 43:
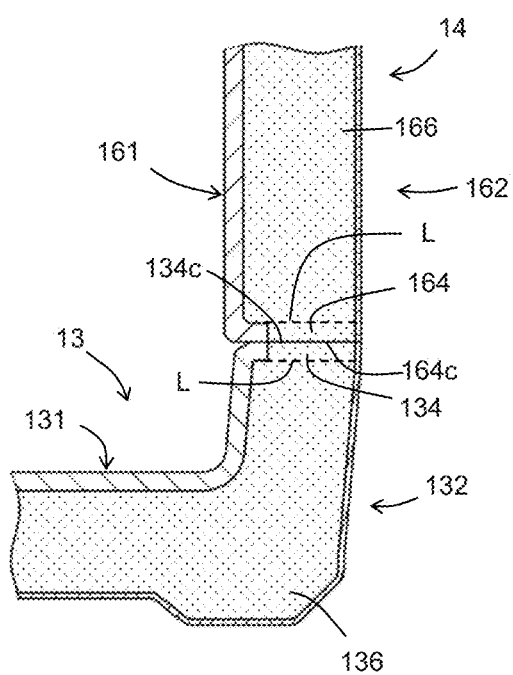
FIG. 43 is an end view of the bottom plate 30 and the front and rear side plates 60 according to another modified embodiment of the present invention, corresponding to FIG. 32.
Figure 44:
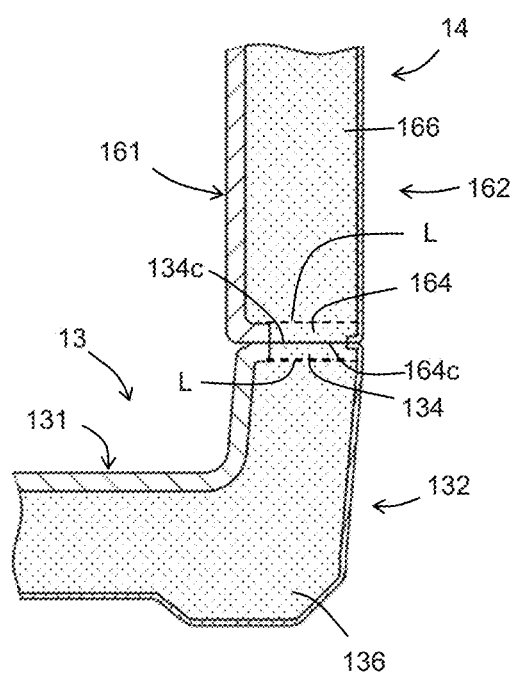
FIG. 44 is an end view of the bottom plate 30 and the front and rear side plates 60 according to another modified embodiment of the present invention, corresponding to FIG. 32.

In the embodiment described above, the contact walls 134, 164 are composed of the resin sheet 223. Alternatively, as shown in FIG. 42 to FIG. 44, the heat insulating materials 136, 166 may be arranged between the inner walls 131, 161 and the outer walls 132, 162, so that at least a part of the contact walls 134, 164 is composed of the heat insulating materials 136, 166. In this case, at least a part of the contact surfaces 134c, 164c is composed of the heat insulating materials 136, 166. The heat insulating materials 136, 166 are usually arranged over substantially the entire space between the inner walls 131, 161 and the outer walls 132, 162. Therefore, portions near the contact surfaces 134c, 164c (the portion whose distance from the contact surfaces 134c, 164c is equal to or less than the thickness of the inner walls 131, 161) of the heat insulating materials 136, 166 are respectively defined as the contact walls 134, 164, as shown in FIG. 42 to FIG. 44 with a dotted line L.

Since the thermal conductivity of the heat insulating materials 136, 166 is generally lower than the resin sheet 223, the heat retention performance of the container can be enhanced by forming at least a portion of the contact walls 134, 164 using the heat insulating materials 136, 166. The heat insulating materials 136, 166 are preferably a foam, and the expansion ratio of the foam is preferably higher than the expansion ratio of the inner walls 131, 161 in order to achieve a further improved heat retention performance and sealability.

In the embodiment of FIG. 42, the inner walls 131, 161 and the outer walls 132, 162 are not bent at the ends thereof, and the inner wall 131 and the inner wall 161, and the outer wall 132 and the outer wall 162 are respectively in contact only at end surfaces. In the embodiment of FIG. 43, the inner walls 131, 161 are bent at the ends, while the outer walls 132, 162 are not bent at the ends. In the embodiment of FIG. 44, both of the inner walls 131, 161 and the outer walls 132, 162 are bent at the ends. The proportion of the heat insulating materials 136, 166 in the contact surfaces 134c, 164c decreases in the order of FIG. 42, FIG. 43, and FIG. 44, and the heat retention performance decreases in this order. On the other hand, the strength of the heat insulating materials 136, 166 is generally lower than the inner walls 131, 161 and the outer walls 132, 162, and thus the strength of the container increases in the order of FIG. 42, FIG. 43, and FIG. 44.

In this regard, the configuration shown in FIG. 42 to FIG. 44 may be employed for one of the bottom wall 13 and the side wall 14, and the configuration of the embodiment described above or the modified embodiment may be employed for the other.

Figure 45:
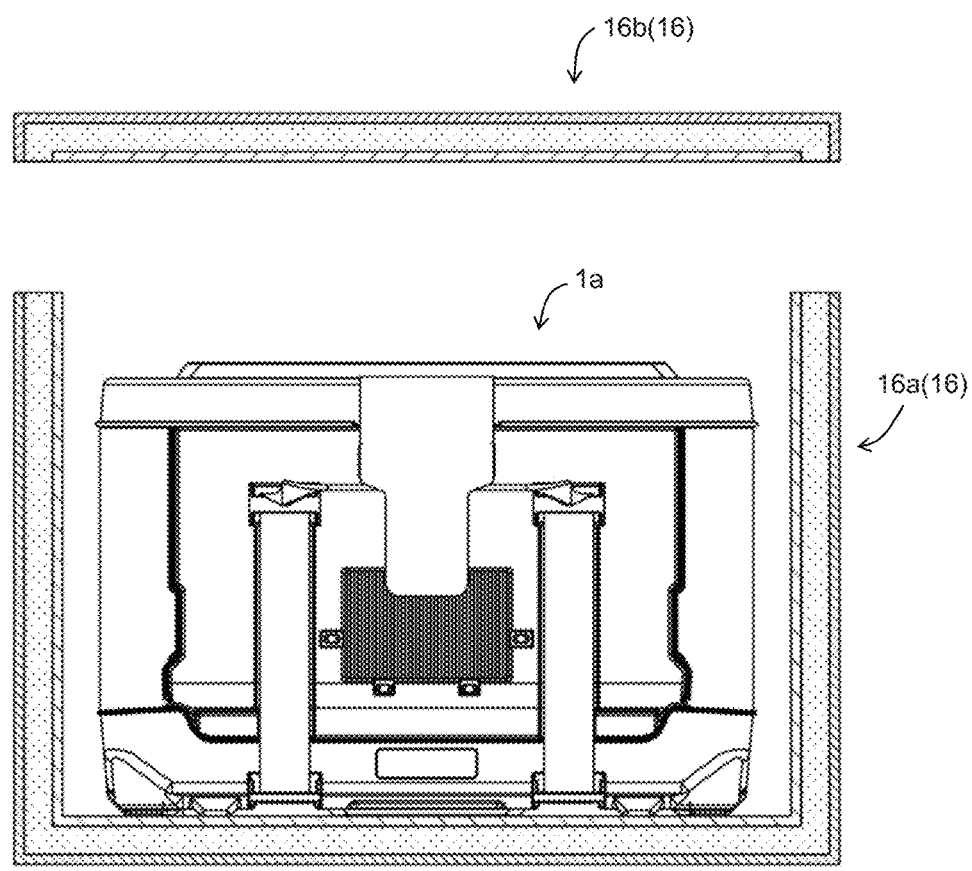
FIG. 45 is a front view showing the folding container 1a accommodated in the external container 16.

As shown in FIG. 45, the folding container 1a may be accommodated in the external container 16. The external container 16 comprises first and second members 16a, 16b, and an enclosed space capable of accommodating the folding container 1a is formed when the first and second members 16a, 16b are assembled. The first member 16a is shaped as a container capable of accommodating the container 1a, and the second member 16b is shaped as a lid in FIG. 45. Alternatively, for example, both of the first and second members 16a, 16b may be shaped as a container.

The first and second members 16a, 16b are each formed as one component and have no seams. The external container 16 composed of the first and second members 16a, 16b is excellent in sealability and heat retention performance. Therefore, in applications where particularly higher sealability and heat retention performance are required for the folding container 1a, the deterioration of the contents can be suppressed by carrying the folding container 1a in a state accommodated in the external container 16.

A manufacturing method, layer configuration of the first and second members 16a, 16b and the configuration of a contact surface thereof are not particularly limited, and similar one described for the folding container 1a may be applied.

REFERENCE SIGNS LIST (Reference Sign in Embodiment of First to Third Viewpoints)
1: container,
2: bottom member,
2a: lower surface,
2b: concave portion,
2c: deepest portion,
2d: step,
2e: groove,
2f: shaft receiving hole,
2g: concave line, 2h: inclined groove,
2i: peripheral wall,
2j: accommodating concave portion,
2k: inclined surface,
2l: lower surface,
2m: engagement hole,
2n: engagement hole,
2o: wall surface,
2p: ridge,
2r: concave portion,
2s: concave portion,
3: long side wall,
3a: main body,
3b: engagement fitting,
3b1: engagement protrusion,
3c: engagement projection,
3d: accommodating concave portion,
3e: shaft receiving hole,
3f: wall surface,
3g: arc surface,
3h: ridge,
3i: ridge,
3j: accommodating concave portion,
3j1: lower surface,
3k: shaft receiving hole,
3l: wall surface,
3m: arc surface,
3o: outer surface,
3p: concave portion,
4: short side wall,
4a: main body,
4b: ridge,
4c: projecting shaft,
4d: ridge,
4e: ridge,
4p: concave portion,
5: first upper wall,
5a: distal end surface,
5b: inclined surface,
5c: upper surface,
5d: lower surface,
5f: accommodating concave portion,
5g: distal end surface,
5h: overlapping portion,
5i: adjacent portion,
5j: shaft receiving hole,
5k: concave portion,
5r: convex portion,
5s: convex portion
6: second upper wall,
6a: distal end surface,
6b: inclined surface,
6c: groove,
6d: lower surface,
6e: groove,
6g: distal end surface,
6h: overlapping portion,
6i: adjacent portion,
6k: concave portion,
6r: convex portion,
6s: convex portion
7: lower hinge member,
7a: case,
7a1: main body,
7a2: lid,
7a3: side surface,
7a4: lower surface,
7a5: inclined surface,
7a6: lower projecting portion,
7a7: guide wall,
7a8: ridge,
7b: side wall locking member,
7b1: projecting shaft,
7b2: urging portion,
7c: bottom member locking member,
7c1: projecting portion,
7c2: urging portion,
7c3: distal end surface,
7c4: lower surface,
7c5: distal end,
7d: arc surface,
7e: concave portion,
8: upper hinge member,
8a: case,
8a1: main body,
8a2: lid,
8a3: rotation restricting portion,
8b: upper wall locking member,
8b1: projecting shaft,
8b2: urging portion,
8c: side wall locking member,
8c1: projecting shaft,
8c2: urging portion,
8d: arc surface,
9: connecting mechanism,
11: latch structure,
11a: main body fitting,
11a1: accommodating concave portion,
11a2: engaging concave portion,
11a3: locking wall,
11b: urging member,
11c: projecting member,
11c1: projection
(Reference Sign in Embodiment of Fourth Viewpoint)
1a: folding container,
10: lid,
10a: annular convex portion,
12: fastening member,
13: bottom wall,
14: side wall,
16: external container,
16a: first member,
16b: second member,
15: lower convex portion,
20: container body,
30: bottom plate,
31: bottom wall portion,
33: left- and right-side peripheral wall portion,
33a: locking portion,
34: front and rear side peripheral wall portion,
35a: convex portion,
35b: corner projection,
35c: central convex portion,
36: groove,
36a: notch,
37: holding portion,
38: concave portion,
40: connecting member,
41: connecting member,
50: left and right-side plates,
53: groove,
54: concave portion,
55: holding portion,
56: locking portion, 57: concave portion,
57a: lower surface,
59: locking mechanism,
60: front and rear side plate,
63: overhanging portion,
67: convex portion,
80: handle,
90: belt,
100: foam molding machine,
111: inner wall,
111c: contact surface,
112: outer wall,
130: resin sheet forming device,
131: inner wall,
132: outer wall,
133: side plate contact wall,
133c: contact surface,
134: side plate contact wall,
134c: contact surface,
134c1: step,
136: heat insulating material,
151: inner wall,
152: outer wall,
153: lid-side contact wall,
153c: contact surface,
153c1: step,
154: bottom contact wall,
155: contact wall,
155c: contact surface,
155c1: step,
160: inside wall,
161: inner wall,
161c: contact surface,
161c1: step,
162: outer wall,
163: lid-side contact wall,
163c: contact surface,
163c1: step,
164: bottom contact wall,
164c: contact surface,
164c1: step,
166: heat insulating material,
211: raw resin,
212: hopper,
213: extruder,
213a: cylinder,
216: injector,
217: accumulator,
217a: cylinder,
217b: piston,
218: T-die,
220: resin sheet forming device,
221,231: split mold,
221a: cavity,
221b: pinch-off portion,
223,233: resin sheet,
225,227: connecting tube,
230: resin sheet forming device,
S: accommodation space

The invention claimed is:

1. A container comprising:
a side wall, an upper hinge member, and an upper wall,
wherein the side wall has a first concave portion,
the upper wall has a second concave portion,
the upper hinge member is located across the first concave portion and the second concave portion,
the upper hinge member has a case, a first projecting shaft, and a second projecting shaft, the upper hinge member and the side wall are connected rotatably around the first projecting shaft,
the upper hinge member and the upper wall are connected rotatably around the second projecting shaft, and
the first and second projecting shafts are parallel, wherein
when the container is in an upright orientation, such that the side wall is disposed parallel to an up-down axis, the container is configured such that the second projecting shaft is always arranged further in an up direction, along the up-down axis, than the projecting shaft,
wherein the case of the upper hinge member comprises a rotation restricting portion configured to restrict rotation of the upper hinge member,
the rotation restricting portion is configured to abut against a lower surface of the first concave portion, so that when the container is in an upright orientation, such that the side wall is disposed parallel to the up-down axis, the second projecting shaft is not arranged further in a down direction, along the up-down axis, than the first projecting shaft,
the case of the upper hinge member comprises a first arc surface having a center that is the first projecting shaft,
the first concave portion is provided with a second arc surface, and
the upper hinge member is configured to maintain contact between the first and second arc surfaces throughout an entire range of rotation of the upper hinge member with respect to the side wall of the container.

2. The container of claim 1,
wherein an angle of a plane passing through the first and second projecting shafts with respect to an outer surface of the side wall is 91 to 135 degrees.

3. The container of claim 1,
wherein the first projecting shaft is arranged in the first concave portion, which is provided on an outer surface side of the side wall, and
the first concave portion is configured not to penetrate the side wall.

4. The container of claim 1, comprising second to fourth side walls, a second upper wall, and a bottom member,
wherein the side wall is regarded as a first side wall, while the upper wall is regarded as a first upper wall,
the first and second side walls face each other,
the third and fourth side walls face each other and are provided between the first and second side walls,
the first to fourth side walls are configured to be rotatable with respect to the bottom member, and
the second upper wall is configured to be rotatable with respect to the second side wall.

* * * * *